United States Patent
Gryaznov et al.

(10) Patent No.: US 12,503,698 B2
(45) Date of Patent: Dec. 23, 2025

(54) GALNAC DERIVATIVES

(71) Applicant: Janssen BioPharma, Inc., South San Francisco, CA (US)

(72) Inventors: Sergei Gryaznov, San Mateo, CA (US); Jin Hong, Pacifica, CA (US); Rajendra K. Pandey, Foster City, CA (US); Vivek Kumar Rajwanshi, Cupertino, CA (US); Leonid Beigelman, San Mateo, CA (US)

(73) Assignee: Janssen Pharmaceuticals, Inc., Titusville, NJ (US)

( * ) Notice: Subject to any disclaimer, the term of this patent is extended or adjusted under 35 U.S.C. 154(b) by 166 days.

(21) Appl. No.: 16/647,377

(22) PCT Filed: Sep. 14, 2018

(86) PCT No.: PCT/IB2018/057082
§ 371 (c)(1),
(2) Date: Mar. 13, 2020

(87) PCT Pub. No.: WO2019/053661
PCT Pub. Date: Mar. 21, 2019

(65) Prior Publication Data
US 2020/0270611 A1   Aug. 27, 2020

Related U.S. Application Data

(60) Provisional application No. 62/558,773, filed on Sep. 14, 2017.

(51) Int. Cl.
*C12N 15/113* (2010.01)
*C07H 15/04* (2006.01)
*C07H 15/18* (2006.01)
*C07H 15/26* (2006.01)

(52) U.S. Cl.
CPC ......... *C12N 15/1131* (2013.01); *C07H 15/04* (2013.01); *C07H 15/18* (2013.01); *C07H 15/26* (2013.01); *C12N 2310/11* (2013.01); *C12N 2310/314* (2013.01); *C12N 2310/351* (2013.01); *C12N 2310/3515* (2013.01); *C12N 2310/352* (2013.01)

(58) Field of Classification Search
CPC ............ C12N 2310/351; C12N 15/113; C12N 2310/14; A61K 47/549; A61K 31/7088; A61K 31/7015; A61K 31/711; A61K 31/7115; A61K 31/712; A61K 31/7125; A61K 31/713

See application file for complete search history.

(56) References Cited

U.S. PATENT DOCUMENTS

| | | | | |
|---|---|---|---|---|
| 9,181,551 B2 * | 11/2015 | McSwiggen | ....... | C12N 15/1131 |
| 11,549,110 B2 * | 1/2023 | Beigelman | .............. | A61P 31/20 |
| 2015/0018540 A1 * | 1/2015 | Prakash | ................ | C12N 15/111 |
| | | | | 536/24.5 |
| 2016/0076032 A1 * | 3/2016 | Prakash | ................ | A61K 47/59 |
| | | | | 536/24.5 |
| 2022/0160748 A1 * | 5/2022 | Beigelman | ........... | A61K 47/542 |

FOREIGN PATENT DOCUMENTS

| | | | | |
|---|---|---|---|---|
| JP | 2011-505425 | | 2/2011 | |
| JP | A-2016-522683 | | 8/2016 | |
| JP | A-2016-529230 | | 9/2016 | |
| WO | 2009073809 A2 | | 6/2009 | |
| WO | 2014179620 A1 | | 11/2014 | |
| WO | WO 2014/205451 A2 | | 12/2014 | |
| WO | WO-2015006740 A2 * | 1/2015 | ........... | A61K 47/549 |
| WO | 2015042447 A1 | | 3/2015 | |
| WO | WO-2015105083 A1 * | 7/2015 | ......... | C12N 15/1137 |
| WO | 2015173208 A2 | | 11/2015 | |
| WO | 2016077321 A1 | | 5/2016 | |
| WO | WO-2017015109 A1 * | 1/2017 | ........... | A61K 47/549 |
| WO | 2017084987 A1 | | 5/2017 | |
| WO | WO-2018035380 A1 * | 2/2018 | ........... | C07F 9/2408 |
| WO | 2018053185 A1 | | 3/2018 | |
| WO | 2018089914 A1 | | 5/2018 | |
| WO | WO-2018223081 A1 * | 12/2018 | .............. | A61K 45/06 |
| WO | WO 2019/053661 | | 3/2019 | |
| WO | WO-2019128611 A1 * | 7/2019 | ......... | A61K 31/7088 |

OTHER PUBLICATIONS

Winkler et al., "Oligonucleotide conjugates for therapeutic applications" Ther Deliv vol. 4 No. 7 pp. 791-809 (Year: 2013).*
Cedillo, et al., "Synthesis of 5-GalNAc-Conjugated Oligonucleotides: A Comparison of Solid and Solution-Phase Conjugation Strategies", Molecules, vol. 22( 8): pp. 1-12 (Aug. 15, 2017).
Migwa et al., "A convenient synthesis of 5-triantennary N-acetylgalactosamine CrogsMark clusters based on nitromethanetrispropionic acid", Bioorganic & Medicinal Chemistry Letters, vol. 26 (9): pp. 2194-2197 (Mar. 17, 2016).
Ostergaard, et al., "Efficient Synthesis and Biological Evaluation of 5-GalNAc Conjugated Antisense Oligonucleotides", Bioconjugate Chemistry, vol. 26 (8):pp. 1451-1455 ( Aug. 19, 2015).
Prakash, et al., "Comprehensive Structure—Activity Relationship of Triantennary N-Acetylgalactosamine Conjugated Antisense Oligonucleotides for Targeted Delivery to Hepatocytes", Journal of Medicinal Chemistry, vol. 59 (6): pp. 2178-2733 (Mar. 24, 2016).
Prakash, et al., "Targeted delivery of antisense Oligonucleotides to hepatocytes using triantennary N-acetyl galactosamine improves potency 10-fold in mice", Nucleic Acids Research, vol. 42 (13): pp. 8796-8807 (Jul. 3, 2014).
International Search Report and Written Opinion mailed on Apr. 4, 2019 for PCT Application No. PCT/IB2018/057082.

(Continued)

*Primary Examiner* — Eric Olson
(74) *Attorney, Agent, or Firm* — Arnold & Porter Kaye Scholer LLP

(57) ABSTRACT

Modified oligonucleotides comprising a GalNAc moiety of the present disclosure along with methods of making and use, e.g., against HBV are disclosed.

10 Claims, No Drawings
Specification includes a Sequence Listing.

(56) References Cited

OTHER PUBLICATIONS

Pon et al., "Derivatization of controlled pore glass beads for solid phase oligonucleotide synthesis," Biotechniques, vol. 6(8), pp. 768-775 (1988).
Search Report dated Feb. 23, 2023 issued in Chinese Appln. CN2018800735856 (with translation).

* cited by examiner

GALNAC DERIVATIVES

CROSS-REFERENCE TO RELATED APPLICATIONS

The present application is a U.S. National Stage application under 35 U.S.C. § 371 of International Patent Application No. PCT/IB2018/057082, filed Sep. 14, 2018, which claims the benefit of priority to U.S. Provisional Application No. 62/558,773, filed Sep. 14, 2017 and now expired, the entireties of each of which are hereby incorporated by reference in their entireties.

SEQUENCE LISTING

The instant application contains a Sequence Listing which has been submitted electronically in ASCII format and is hereby incorporated by reference in its entirety. Said ASCII copy, created on Mar. 12, 2020, is named ALP0055USPCT1 SequenceListing.txt and is 20,669 bytes in size.

BACKGROUND

Antisense oligonucleotide therapies have been considered for treatment or prevention of various diseases and conditions such as viral diseases, neurological diseases, neurodegenerative diseases, fibrotic diseases, hyperproliferative diseases.

Certain viral diseases such as hepatitis B virus (HBV) remain elusive from conventional therapies while continuing to infect an estimated 240 million people (defined as HBV surface antigen positive for at least 6 months) and contributing to the deaths of more than 686,000 people every year. Conventional therapies including oral anti-viral nucleotide analog treatments, such as tenofovir or entecavir, only suppresses the replication of the virus and do not cure the HBV infection. Therefore, even those treated with current HBV therapies must continue their treatment for life.

Oligonucleotides can bind a complimentary RNA or DNA sequence. This feature enables oligonucleotides to bind specific nucleic acid targets involved in certain aspects of cellular processes, such as metabolism, differentiation, proliferation, and replication as well as viral replication such as replication of HBV.

N-Acetylgalactosamine (GalNAc) is conjugated to oligonucleotides either directly or via a linker to assist in directing the oligonucleotide to its intended cellular target and improving its uptake into the cell.

There is a need in the art to discover and develop new therapies having improved specificity and efficiency in their administration.

SUMMARY

The present disclosure relates to GalNAc moieties, methods of making and methods of use in targeting oligonucleotides to which they are conjugated to cells such as hepatocytes.

The present disclosure relates to a construct comprising at least one oligonucleotide strand having at least one GalNAc moiety attached to said strand, wherein each GalNAc moiety is independently selected from GalNAc 1 to GalNAc 13. In some embodiments, the GalNAc moiety is GalNAc-2. In some embodiments, the GalNAc moiety is GalNAc-6. In some embodiments, at least one GalNAc moiety is conjugated to at least one of the oligonucleotide strands through a linker. In some embodiments, the linker is a C6-NH2 linker. In some embodiments, the oligonucleotide sequence has an affinity for or is substantially complementary to an HBV RNA transcript. In some embodiments, said construct comprises a single oligonucleotide strand. In some embodiments, said construct comprises a double oligonucleotide strand. In some embodiments, the GalNAc moiety is chemically attached to the 3' and 5' ends of the oligonucleotide strand.

The present disclosure also relates to a compound having the structure of Formula (I) or (II):

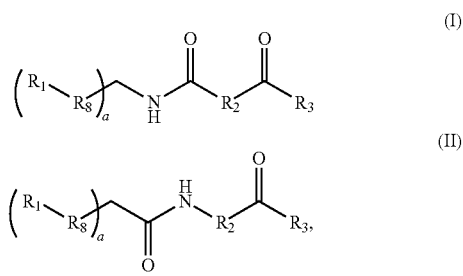

wherein $R_1$ is

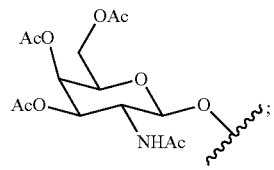 [SMILES: *OC1OC(COC(C)=O)C(OC(C)=O)C(OC(C)=O)C1NC(C)=O]

$R_8$ is a $C_3$-$C_{10}$ alkyl moiety, a $C_3$-$C_{10}$ alkyloxide moiety having 1-5 oxygen atoms or

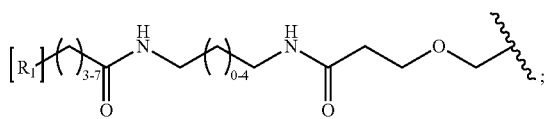

$R_2$ is a $C_3$-$C_{10}$ alkyl moiety or a $C_3$-$C_{10}$ alkyloxide moiety having 1-5 oxygen atoms; $R_3$ is H, PG',

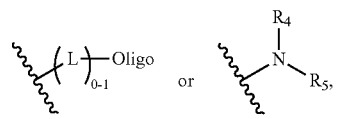

wherein PG' is a protecting group; $R_4$ is H; $R_5$ is

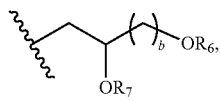

where $R_6$ is a protecting group or a linkage to an oligonucleotide through an optional linker and/or a phosphoramidate or phosphodiester linkage; $R_7$ is H, solid-support linker (e.g., a succinate), or —PH(O)CH$_2$CH$_2$CN; or $R_4$ and $R_5$ together form a 5- or 6-memberred ring, optionally substituted by CH₂OPG; PG is an alcohol protecting group; L is a linker moiety; a is an integer of 1-3; and b is an integer of 1-4. In some embodiments, $R_2$ is a C3, C4, C5, C6, C7, C8, C9 or C10 alkyl. In some embodiments, $R_8$ is a $C_3$-$C_{10}$ alkyloxide moiety that comprises 2-5 ethyleneoxide moieties. In some embodiments, the linker is a C6-NH₂ linker. In some embodiments, a is 1. In some embodiments, a is 3. In some embodiments, b is 2 or 3. In some embodiments, PG is DMTr. In some embodiments, the compound is a compound of Formula (I). In some embodiments, the compound is a compound of Formula (II). In some embodiments, $R_8$ is:

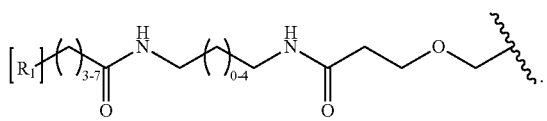

In some embodiments, PG is selected from tert-Butyldimethylsilyl ether (TBMDS), tert-Butyldiphenylsilyl (TBDPS), Triisopropylsilyl ether (TIPS), monomethoxytrityl (MMTr), 4,4'-dimethoxytrityl (DMTr) or tritolyl. In some embodiments, R6 is a linkage to an oligonucleotide through a linker and/or a phosphoramidate or phosphodiester linkage. In some embodiments, R6 includes a phosphoramidate linkage. In some embodiments, R6 includes a phosphodiester linkage.

DETAILED DESCRIPTION

The present disclosure is directed to one or more GalNAc moieties conjugated to an oligonucleotide. The present disclosure is further directed to methods of using and preparing the GalNAc moieties and their conjugation to oligonucleotides.

Some embodiments of the GalNAc moiety include a compound of formula (I) or (II):

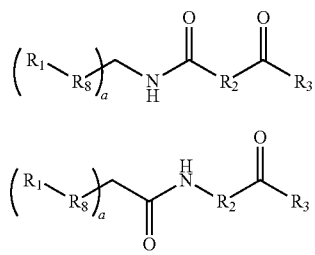

wherein
R₁ is

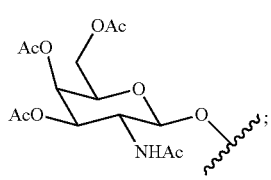 [SMILES: *OC1OC(COC(C)=O)C(OC(C)=O)C(OC(C)=O)C1NC(C)=O]

$R_8$ is a $C_2$-$C_{10}$ alkyl moiety, a $C_3$-$C_{10}$ alkyloxide moiety having 1-5 oxygen atoms,

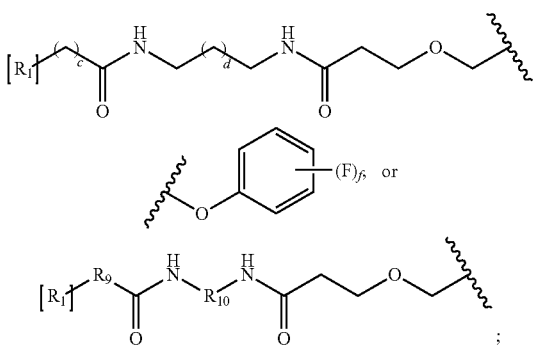

$R_2$ is a $C2$-$C_{10}$ alkyl moiety or a $C_3$-$C_{10}$ alkyloxide moiety having 1-5 oxygen atoms;
$R_3$ is H, PG',

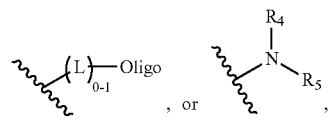

$R_4$ is H;
$R_5$ is

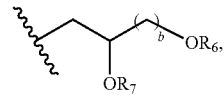

where
$R_6$ is a protecting group or a linkage to an oligonucleotide through an optional linker and/or a phosphoramidate or phosphodiester linkage;
$R_7$ is H, a solid-support linker (e.g., a succinate), or —PH(O)CH₂CH₂CN;
$R_9$ is a $C_2$-$C_{10}$ alkyl moiety or a $C_3$-$C_{10}$ alkyloxide moiety having 1-5 oxygen atoms;
$R_{10}$ is a $C_2$-$C_{10}$ alkyl moiety or a $C_3$-$C_{10}$ alkyloxide moiety having 1-5 oxygen atoms;
or $R_4$ and $R_5$ together form a 5- or 6-memberred ring, optionally substituted by CH₂OPG;
PG is an alcohol-protecting group;
PG' is a protecting group;
L is a linker moiety;
a is an integer of 1-3;
b is an integer of 1-4;
c is an integer of 3-7; and
d is an integer of 0-4.

In some embodiments, $R_2$, $R_9$ and/or $R_{10}$ is a $C_2$, $C_3$, $C_4$, $C_5$, $C_6$, $C_7$, $C_8$, $C_9$ or $C_{10}$ alkyl. In some embodiments, the $C_3$-$C_{10}$ alkyloxide moiety comprises 2-5 ethyleneoxide moieties. For example, the $C_3$-$C_{10}$ alkyloxide moiety can comprise the following repeat moiety:

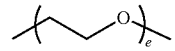

and optionally additional alkylene moieties, where e is 1-5. In some embodiments e is 1, 2,3 ,4 or 5. In some embodiments, $R_8$ is a $C_2$, $C_3$, $C_4$, $C_5$, $C_6$, $C_7$, $C_8$, $C_9$ or $C_{10}$ alkyl. In some embodiments, the $C_3$-$C_{10}$ alkyloxide moiety comprises 2-5 ethyleneoxide moieties. For example, the $C_3$-$C_{10}$ alkyloxide moiety can comprise the following repeat moiety:

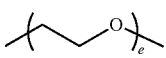

and optionally additional alkylene moieties, where e is 1-5. In some embodiments, a is 1. In some embodiments, a is 3. In some embodiments, b is 2 or 3. In some embodiments e is 1, 2, 3, 4 or 5.

In some embodiments, $R_8$ is:

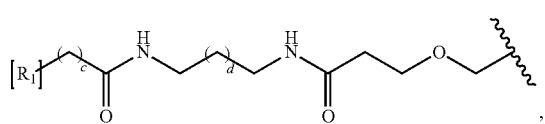

where the alkylene chains contain the following number of carbon atoms (c,d): (3,0), (3,1), (3,2), (3,3), (3,4), (4,0), (4,1), (4,2), (4,3), (4,4), (5,0), (5,1), (5,2), (5,3), (5,4), (6,0), (6,1), (6,2), (6,3), (6,4), (7,0), (7,1), (7,2), (7,3), or (7,4).

In some embodiments, PG may include an alcohol protecting group, such as a silyl protecting group (e.g., tert-Butyldimethylsilyl ether (TBMDS), tert-Butyldiphenylsilyl (TBDPS), Triisopropylsilyl ether (TIPS)) or monomethoxytrityl (MMTr) or 4,4'-dimethoxytrityl (DMTr) or tritolyl or any other suitable protecting groups such as those in Wuts, Peter GM, and Theodora W. Greene. *Greene's protective groups in organic synthesis*. John Wiley & Sons, 2006.

In some embodiments, PG' is a protecting group, for example in some instances PG' may include

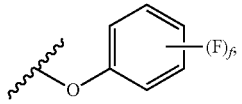

where f is an integer of 1-5. In some embodiments, f is 1, 2, 3, 4 or 5.

In some embodiments, $R_3$ is

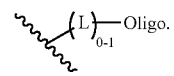

The oligo is not particularly limited, and may be any oligonucleotide, such as an antisense oligonucleotide or an siRNA oligonucleotide. In some embodiments, the optional linker is a $C_1$-$C_8$—$NH_2$ linker, e.g., a $C_6$—$NH_2$ linker.

In some embodiments, $R_6$ is a linkage to an oligonucleotide through a linker and/or a phosphoramidate or phosphodiester linkage. In some embodiments, $R_6$ includes a phosphoramidate linkage. In some embodiments, $R_6$ includes a phosphodiester linkage.

In some embodiments, the GalNAc moiety is one of the following, as would be understood, the squiggled line represents a final cleavage point after coupling with a nucleotide or oligonucleotide, and thus, the remaining portion of the compound would not be present in the final GalNAc-substituted oligonucleotide. This is illustrated in the working examples:

GalNAc-1

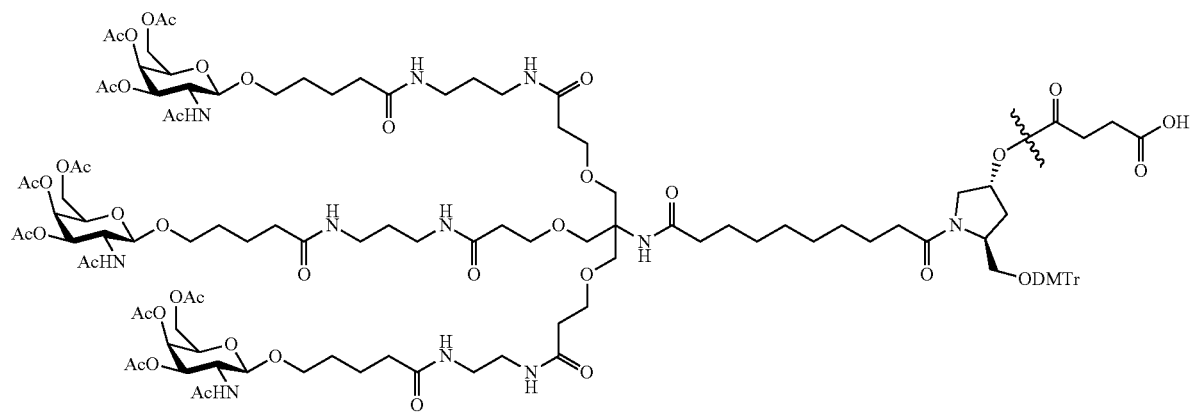

GalNAc-2-CPG
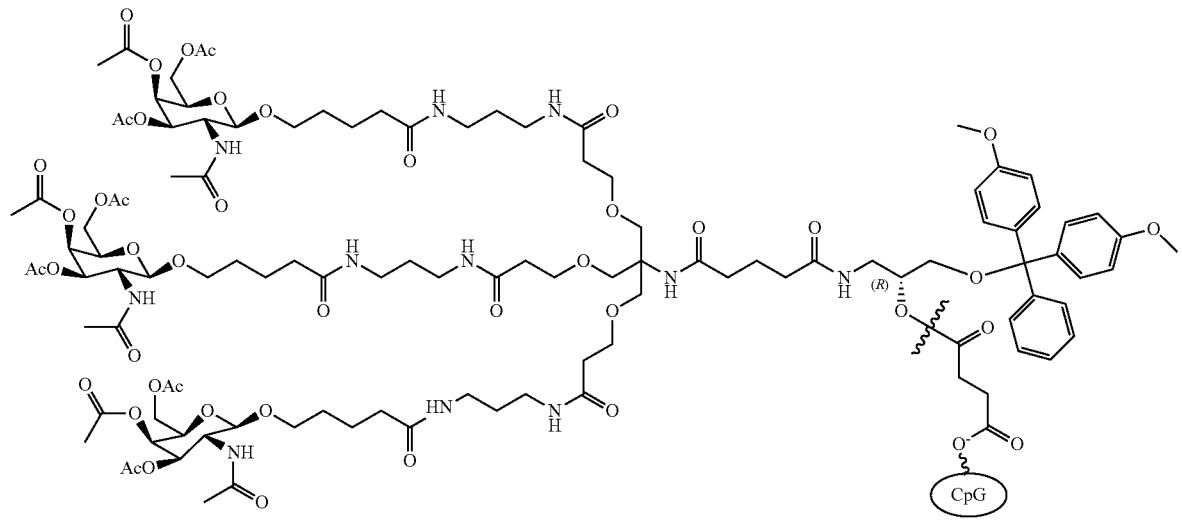
GalNAc-3
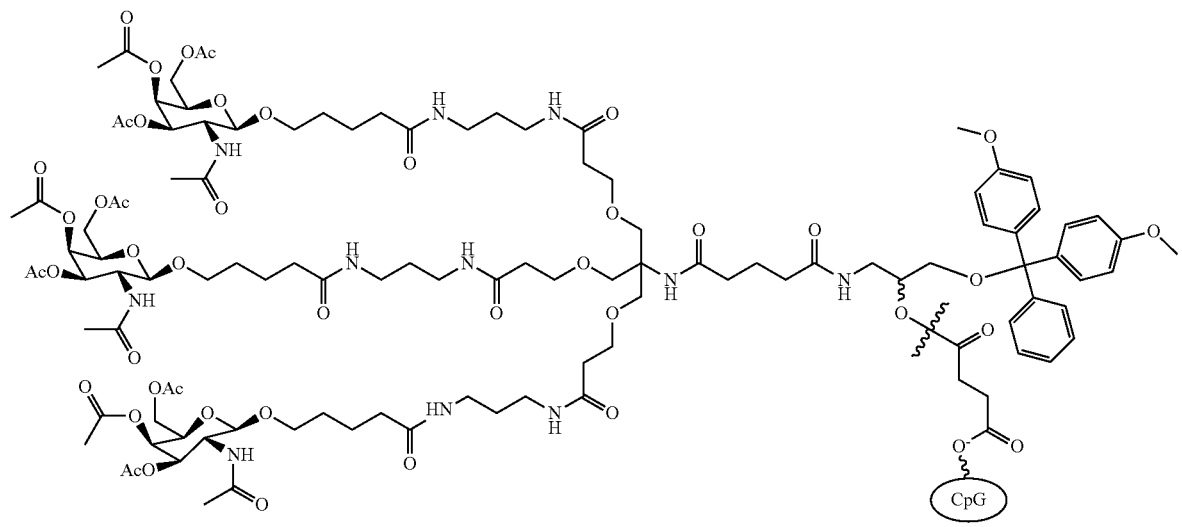
GalNac-4
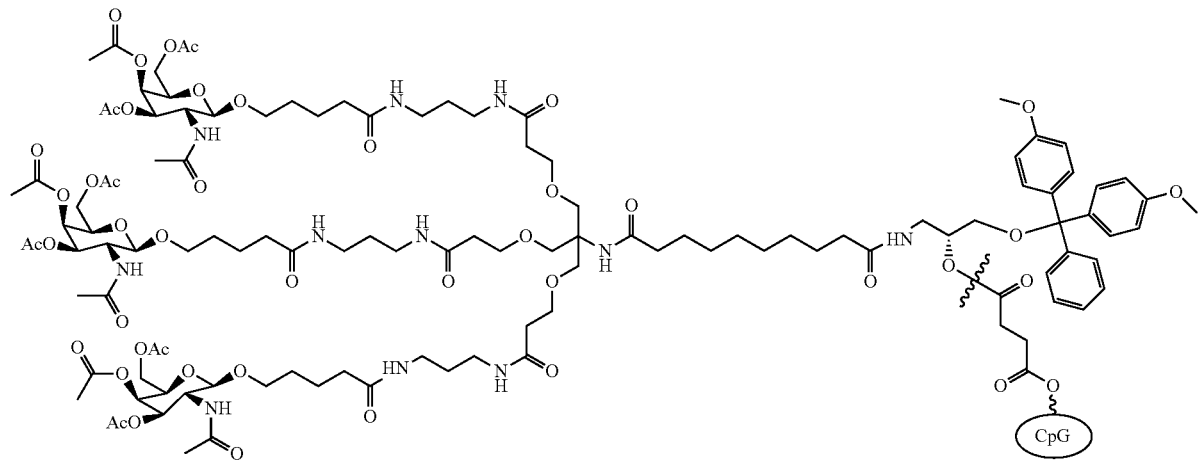

-continued
GalNac-5
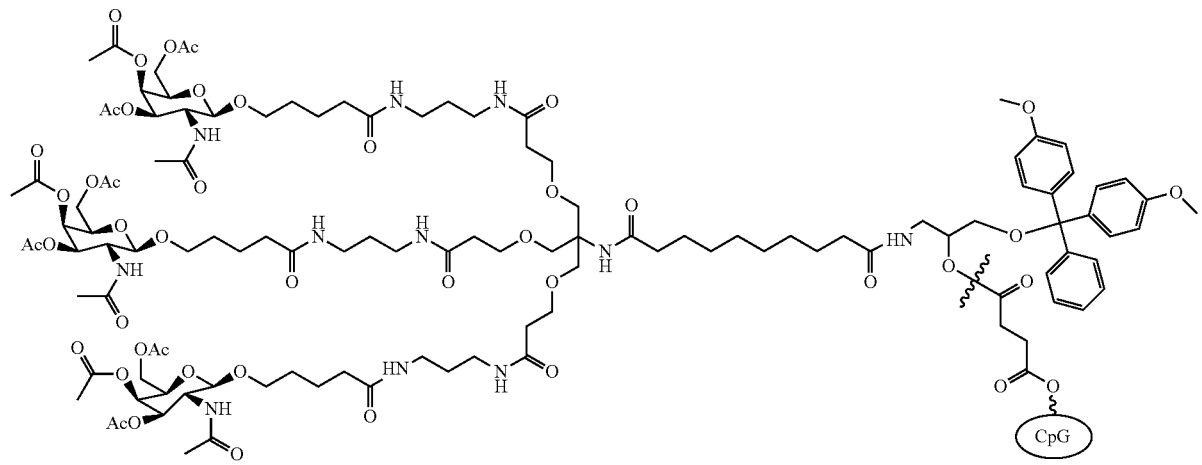
GalNAc-6
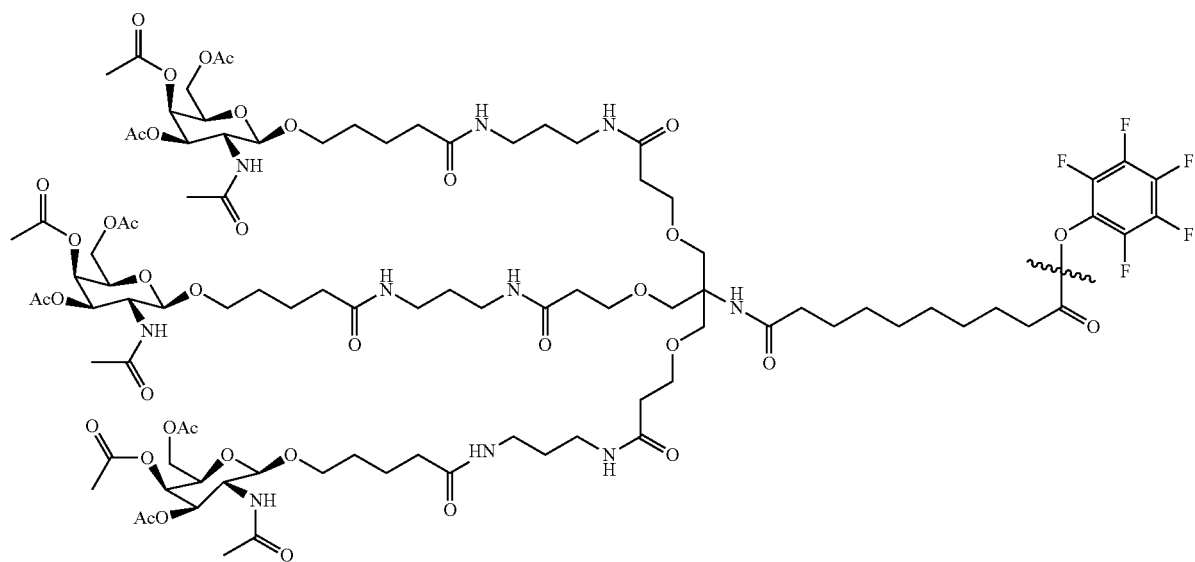
GalNac-7                    GalNAc-8
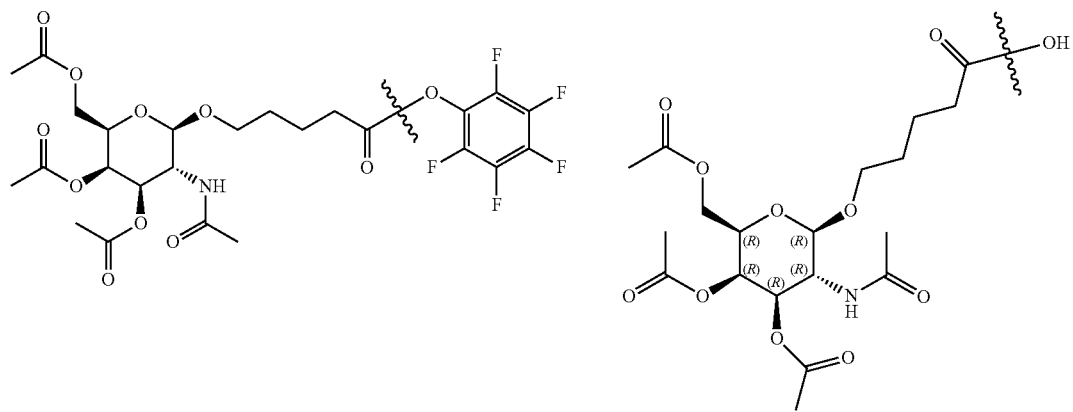

GalNac-9
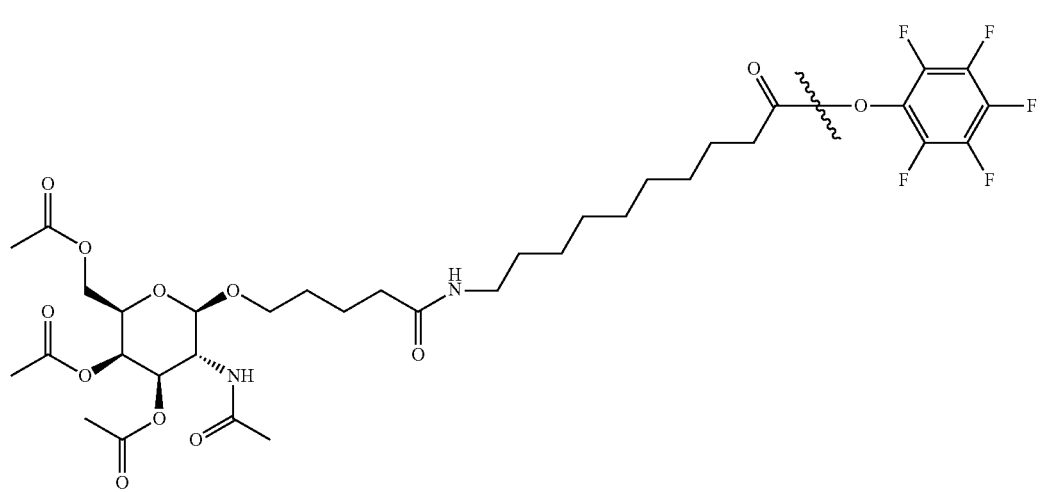
GalNAc-10
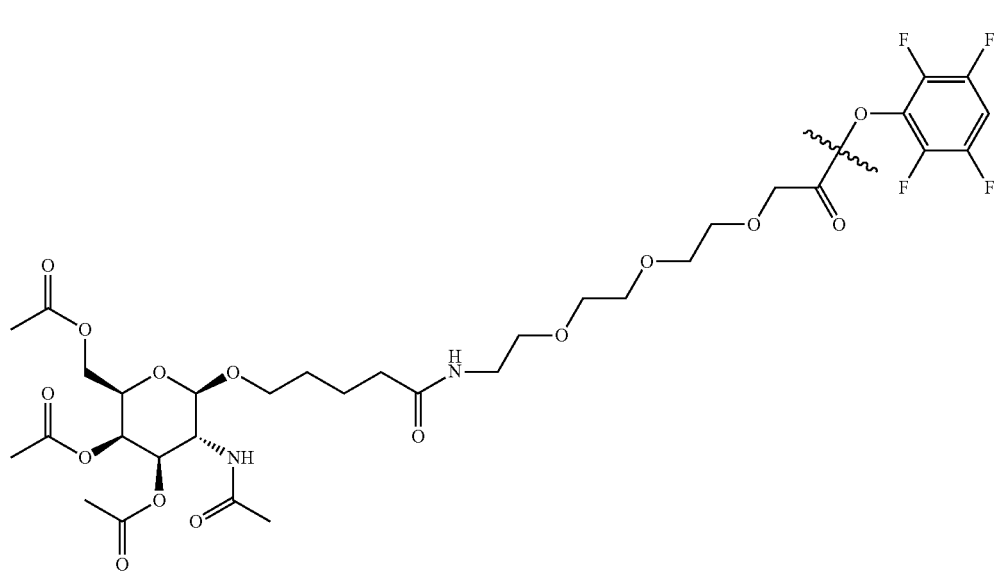
GalNAc-11
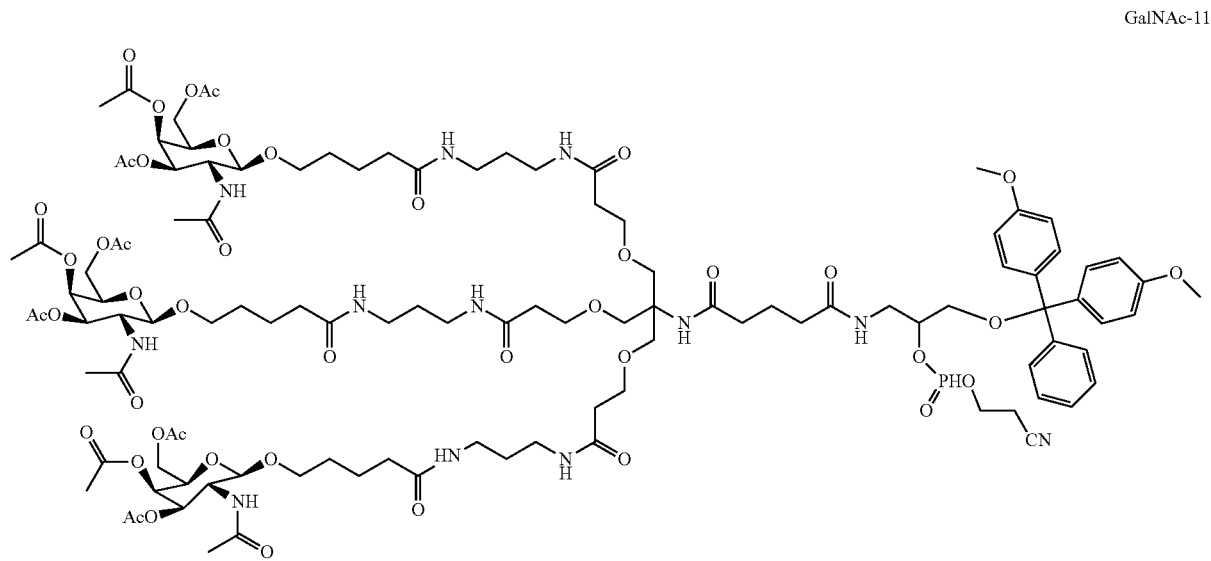

GalNAc-12

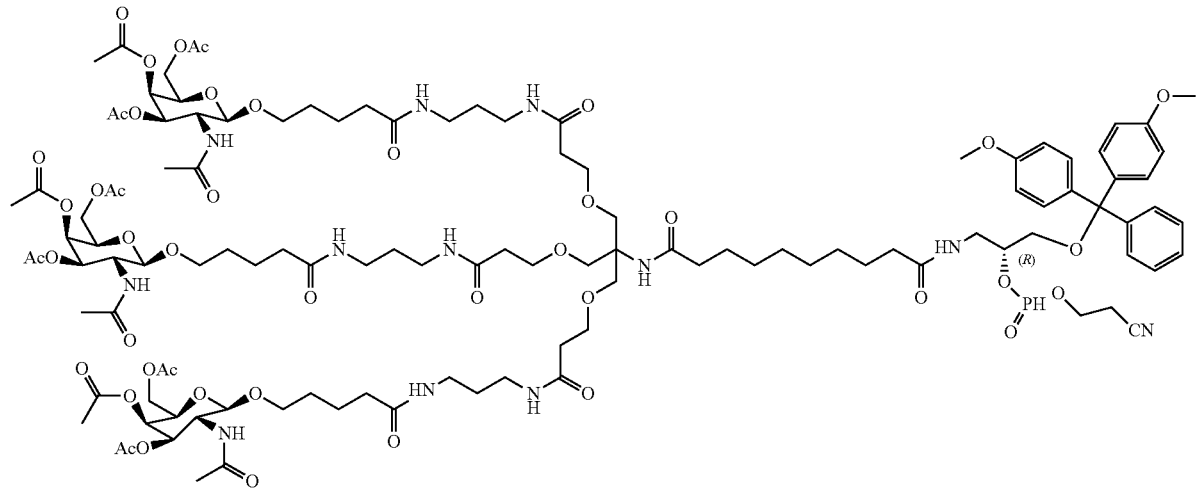

GalNAc-13

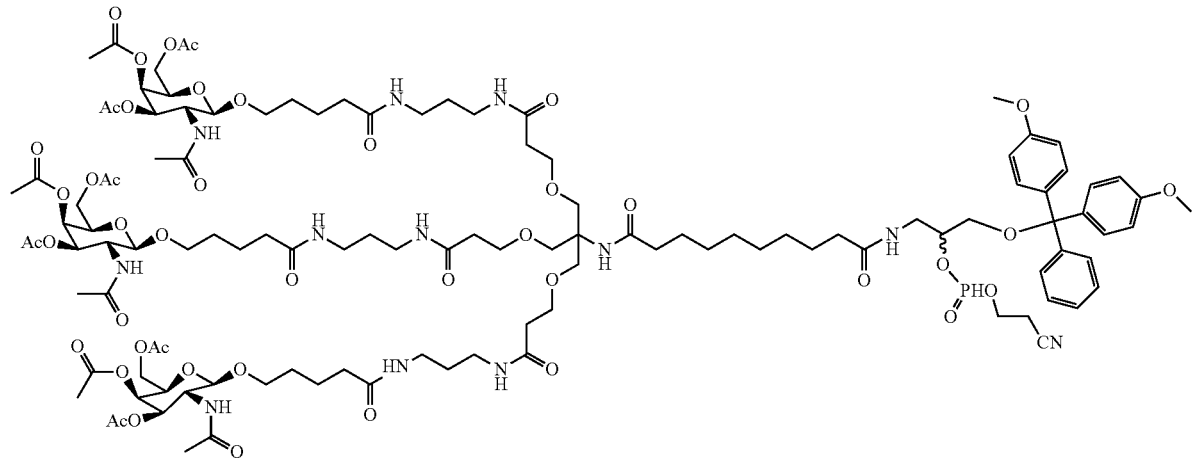

In some embodiments, the GalNAc moiety comprises a succinate moiety or a solid-support linker. In some embodiments, the GalNAc moiety comprises fluoro phenylester (e.g., a pentafluoro phenylester), where the 3' or 5' terminus of an oligonucleotide may be chemically attached. In some embodiments, the GalNAc moiety comprises H-phosphonate where the 3' or 5' terminus of an oligonucleotide may be chemically attached. Further elaboration on these moieties may be found in the working examples.

Conjugated GalNAc

In embodiments, the oligonucleotide is linked to the targeting moiety through a linker, such as an amino alkyl linker (e.g., C6-$NH_2$). For example, GalNAc1-13 or Formula (I) or (II) may be linked to the oligonucleotide through this type of linker. For example, in embodiments, the 3' end of the oligonucleotide is attached through a phosphoramidate or phosphodiester linkage to a $C_6$-amino linker further linked to GalNAc such as GalNAc-1-13 or Formula (I) or (II) as set forth in the following constructs:

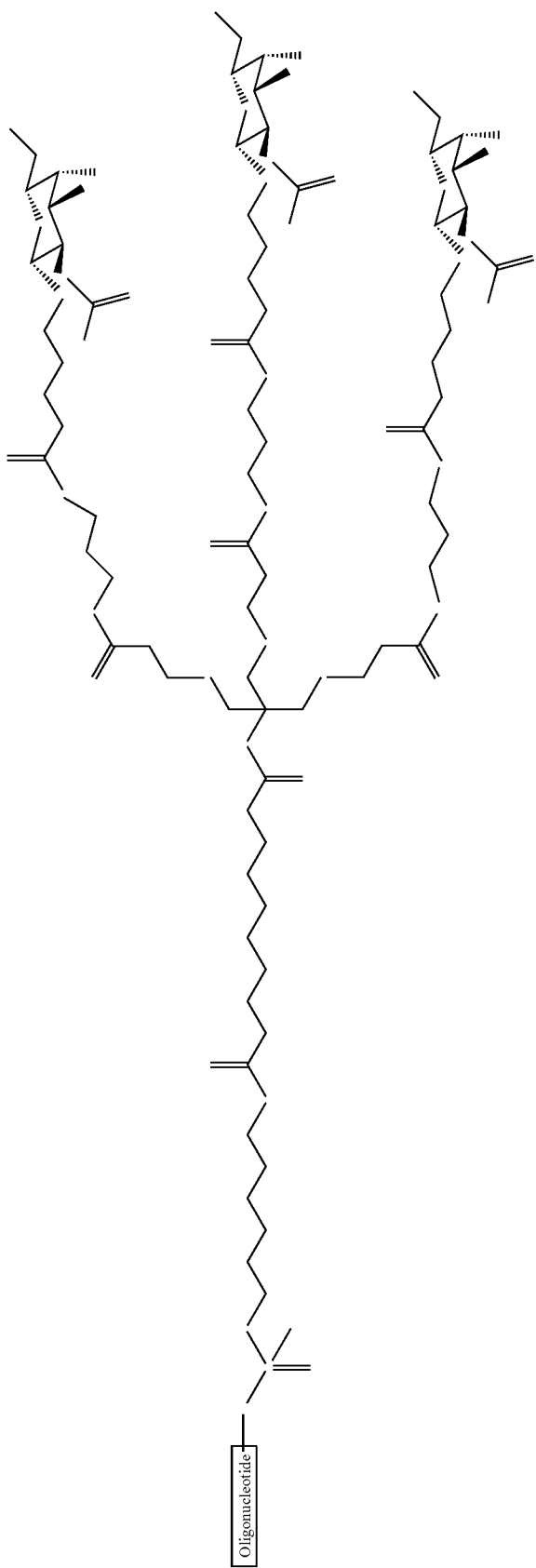

-continued
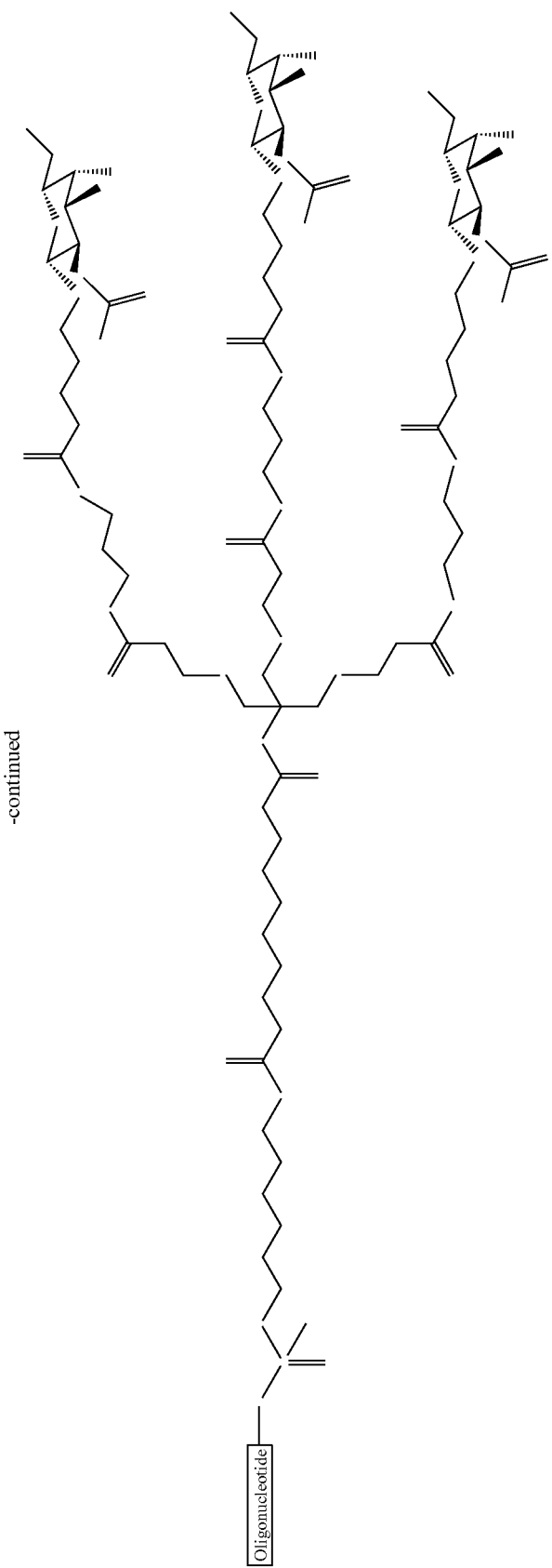

The oligonucleotides comprising a GalNAc moiety of the present disclosure may also include a modified or unmodified oligonucleotide sequence, such as those described in WO 2018/053185, which is incorporated by reference in its entirety.

Examplary oligonucleotides comprising a GalNAc moiety of the present disclosure include those listed in the examples.

In an aspect of the disclosure, the oligonucleotide sequences described herein are conjugated or modified at one or both ends by a GalNAc moiety of the present disclosure that is optionally attached through a linker moiety. In some embodiments, the oligonucleotide strand comprises a GalNAc moiety of the present disclosure conjugated at the 5' and/or 3' end through an optional linker. In some embodiments, the GalNAc moiety of the present disclosure is conjugated at the 3'-end of the oligonucleotide strand. Linking moieties of the present disclosure may also include an HEG linker or a C6 amino linker.

In some embodiments, the GalNAc moiety enhances the activity, cellular distribution, or cellular uptake of the oligonucleotide by a particular type of cell such as hepatocytes.

In certain embodiments of the compositions and methods of the invention, a ligand is one or more GalNAc derivatives attached such as two or three GalNAc derivatives attached to the oligonucleotide through a bivalent or trivalent-branched linker, respectively.

Compositions

The present disclosure also encompasses pharmaceutical compositions comprising GalNAc substituted oligonucleotides of the present disclosure. One embodiment is a pharmaceutical composition comprising an oligonucleotide of the present disclosure and a pharmaceutically acceptable diluent or carrier.

In some embodiments, the pharmaceutical composition containing the GalNAc substituted oligonucleotide of the present disclosure is formulated for systemic administration via parenteral delivery. Parenteral administration includes intravenous, intra-arterial, subcutaneous, intraperitoneal or intramuscular injection or infusion; also subdermal administration, e.g., via an implanted device. In a preferred embodiment, the pharmaceutical composition containing the oligonucleotide of the present disclosure is formulated for subcutaneous (SC) or intravenous (IV) delivery. Formulations for parenteral administration may include sterile aqueous solutions, which may also contain buffers, diluents and other pharmaceutically acceptable additives as understood by the skilled artisan. For intravenous use, the total concentration of solutes may be controlled to render the preparation isotonic.

The pharmaceutical compositions containing the GalNAc substituted oligonucleotide of the present disclosure are useful for treating a disease or disorder, e.g., associated with the expression or activity of an HBV gene.

Methods of Use

One aspect of the present technology includes methods for treating a subject diagnosed as having, suspected as having, or at risk of having an HBV infection and/or an HBV-associated disorder. In therapeutic applications, compositions comprising the GalNAc substituted oligonucleotides of the present technology are administered to a subject suspected of, or already suffering from such a disease (such as, e.g., presence of an such as HBV antigen surface and envelope antigens (e.g., HBsAg and/or HBeAg) in the serum and/or liver of the subject, or elevated HBV DNA or HBV viral load levels), in an amount sufficient to cure, or at least partially arrest, the symptoms of the disease, including its complications and intermediate pathological phenotypes in development of the disease.

In some embodiments the GalNAc substituted oligonucleotides of the present technology show affinity to at least one of the following regions or HBV RNA transcripts in Table A.

TABLE A

| Region | Targeted HBV RNA transcripts | HBV Proteins affected |
| --- | --- | --- |
| Pol/S | Pre-Core, Pg, Pre-S1, Pre-S2 | HBeAg, HBcAg, Polymerase, Large HBsAg, Middle HBsAg, Small HBsAg |
| Pol | Pre-Core, Pg, Pre-S1, Pre-S2 | HBeAg, HBcAg, Polymerase, Large HBsAg, Middle HBsAg, Small HBsAg |
| Pol/X | Pre-Core, Pg, Pre-S1, Pre-S2, X | HBeAg, HBcAg, Polymerase, Large HBsAg, Middle HBsAg, Small HBsAg, HBxAg |
| DR1 | Pre-Core, Pg, Pre-S1, Pre-S2, X | HBeAg, HBcAg, Polymerase, Large HBsAg, Middle HBsAg, Small HBsAg, HBxAg |
| DR2 | Pre-Core, Pg, Pre-S1, Pre-S2, X | HBeAg, HBcAg, Polymerase, Large HBsAg, Middle HBsAg, Small HBsAg, HBxAg |
| Pre-PolyA | Pre-Core, Pg, Pre-S1, Pre-S2, X | HBeAg, HBcAg, Polymerase, Large HBsAg, Middle HBsAg, Small HBsAg, HBxAg |

Subjects suffering from an HBV infection and/or an HBV-associated disorder can be identified by any or a combination of diagnostic or prognostic assays known in the art. For example, typical symptoms of HBV infection and/or an HBV-associated disorder include, but are not limited to the presence of serum and/or liver HBV antigen (e.g., HBsAg and/or HBeAg), elevated ALT, elevated AST, the absence or low level of anti-HBV antibodies, liver injury, cirrhosis, delta hepatitis, acute hepatitis B, acute fulminant hepatitis B, chronic hepatitis B, liver fibrosis, end-stage liver disease, hepatocellular carcinoma, serum sickness-like syndrome, anorexia, nausea, vomiting, low-grade fever, myalgia, fatigability, disordered gustatory acuity and smell sensations (aversion to food and cigarettes), right upper quadrant and epigastric pain (intermittent, mild to moderate), hepatic encephalopathy, somnolence, disturbances in sleep pattern, mental confusion, coma, ascites, gastrointestinal bleeding, coagulopathy, jaundice, hepatomegaly (mildly enlarged, soft liver), splenomegaly, palmar erythema, spider nevi, muscle wasting, spider angiomas, vasculitis, variceal bleeding, peripheral edema, gynecomastia, testicular atrophy, abdominal collateral veins (caput medusa), high levels of alanine aminotransferase (ALT) and aspartate aminotransferase (AST) (within a range of 1000-

2000 IU/mL), ALT levels higher than AST levels, elevated gamma-glutamyl transpeptidase (GGT) and/or alkaline phosphatase (ALP) levels, decreased albumin levels, elevated serum iron levels, leukopenia (i.e., granulocytopenia), lymphocytosis, increased erythrocyte sedimentation rate (ESR), shortened red blood cell survival, hemolysis, thrombocytopenia, a prolongation of the international normalized ratio (INR), the presence of serum HBV DNA, elevation of the aminotransferases (<5 times the ULN), increased bilirubin levels, prolonged prothrombin time (PT), hyperglobulinemia, the presence of tissue-nonspecific antibodies, such as anti-smooth muscle antibodies (ASMAs) or antinuclear antibodies (ANAs), the presence of tissue-specific antibodies, such as antibodies against the thyroid gland, elevated levels of rheumatoid factor (RF), hyperbilirubinemia, low platelet and white blood cell counts, AST levels higher than ALT levels, lobular inflammation accompanied by degenerative and regenerative hepatocellular changes, and predominantly centrilobular necrosis.

In some embodiments, subjects treated with the oligonucleotide composition of the present technology will show amelioration or elimination of one or more of the following conditions or symptoms: the presence of serum and/or liver HBV antigen (e.g., HBsAg and/or HBeAg), the absence or low level of anti-HBV antibodies, liver injury, cirrhosis, delta hepatitis, acute hepatitis B, acute fulminant hepatitis B, chronic hepatitis B, liver fibrosis, end-stage liver disease, hepatocellular carcinoma, serum sickness-like syndrome, anorexia, nausea, vomiting, low-grade fever, myalgia, fatigability, disordered gustatory acuity and smell sensations (aversion to food and cigarettes), right upper quadrant and epigastric pain (intermittent, mild to moderate), hepatic encephalopathy, somnolence, disturbances in sleep pattern, mental confusion, coma, ascites, gastrointestinal bleeding, coagulopathy, jaundice, hepatomegaly (mildly enlarged, soft liver), splenomegaly, palmar erythema, spider nevi, muscle wasting, spider angiomas, vasculitis, variceal bleeding, peripheral edema, gynecomastia, testicular atrophy, abdominal collateral veins (caput medusa), ALT levels higher than AST levels, leukopenia (i.e., granulocytopenia), decreased albumin levels, elevated serum iron levels, lymphocytosis, increased erythrocyte sedimentation rate (ESR), shortened red blood cell survival, hemolysis, thrombocytopenia, a prolongation of the international normalized ratio (INR), the presence of serum HBV DNA, prolonged prothrombin time (PT), hyperglobulinemia, the presence of tissue-nonspecific antibodies, such as anti-smooth muscle antibodies (ASMAs) or antinuclear antibodies (ANAs), the presence of tissue-specific antibodies, such as antibodies against the thyroid gland, hyperbilirubinemia, low platelet and white blood cell counts, AST levels higher than ALT levels, lobular inflammation accompanied by degenerative and regenerative hepatocellular changes, and predominantly centrilobular necrosis.

In some embodiments, subjects treated with the oligonucleotide composition of the present technology will show a reduction in the expression levels of one or more biomarkers selected from among alanine aminotransferase (ALT), aspartate aminotransferase (AST), gamma-glutamyl transpeptidase (GGT), alkaline phosphatase (ALP), bilirubin, and rheumatoid factor (RF), compared to untreated subjects suffering from an HBV infection and/or an HBV-associated disorder.

The present disclosure provides a method for treating a subject diagnosed as having, or suspected as having an HBV infection and/or an HBV-associated disorder comprising administering to the subject an effective amount of an oligonucleotide composition of the present technology.

The oligonucleotides and compositions of the present disclosure may be used in antisense therapy. For example, the oligonucleotide may contain a nucleobase sequence that is complementary or hybridizes to a target nucleic acid sequence of a known viral DNA or RNA sequence, for example, in HBV.

Some embodiments include a method of modulating expression of a target by contacting a target nucleic acid with an antisense compound comprising the oligonucleotide of the present disclosure. In some embodiments, the target nucleic acid is in a cell, for example, in an animal such as a human.

Some embodiments, include a method of inhibiting expression of a target RNA in an animal, comprising administering to the animal an antisense compound comprising the oligonucleotide of the present disclosure. The oligonucleotide may be complementary or hybridize to a portion of the target RNA.

Some embodiments include a method for reducing the viral load of a virus in a subject infected with the virus comprising administering a therapeutically effective amount of a oligonucleotide or a composition of the present disclosure to the subject in need thereof thereby reducing the viral load of the virus in the subject. The oligonucleotide may be complementary or hybridize to a portion of the target RNA in the virus.

Some embodiments include a method for inhibition of viral gene expression in a cell or subject comprising contacting the cell with a oligonucleotide or a composition of the present disclosure, or administering a therapeutically effective amount of a oligonucleotide or a composition of the present disclosure to a subject in need thereof. The oligonucleotide may be complementary or hybridize to a portion of the target RNA in the virus.

Other embodiments include a method of reducing the level of a virus antigen in a subject infected with the virus, comprising administering a therapeutically effective amount of a oligonucleotide or composition of the present disclosure to the subject in need thereof thereby reducing the level of the virus antigen in the subject. The oligonucleotide may be complementary or hybridize to a portion of the target RNA in the virus.

The oligonucleotides and compositions of the present disclosure may be used, e.g., to inhibit or reduce Hepatitis B virus (HBV) gene expression or inhibit replication of a HBV virus or for treatment of a subject having HBV or for reducing the viral load of Hepatitis B virus (HBV) in a subject infected with HBV. In embodiments, the disclosed chimeric oligonucleotides are used to induce RNase H activity at a target gene.

The oligonucleotides and compositions of the present disclosure may be used, e.g., to compete for a micro-RNA binding site to HCV RNA thereby inhibiting replication.

The present disclosure is also directed to methods of stabilizing an oligonucleotide for delivery to a subject. Stabilization of an oligonucleotide is characterized [quantified] herein as increasing the melting point or temperature, $T_m$, of an oligonucleotide.

The disclosed oligonucleotide constructs may be administered alone or in combination with one or more additional treatments for the targeted ailment. The disclosed oligonucleotide constructs may be administered alone or in combination with one or more additional treatments for HBV infection. In combination therapies, it is understood that the oligonucleotide constructs and one or more additional treatments for HBV infection may be administered simultaneously in the same or separate compositions, or administered separately, at the same time or sequentially.

In some embodiments, the disclosed oligonucleotide constructs are administered in combination with HBV replication inhibitors or immune modulator agents or in regimens that combine anti-HBV oligonucleotide agents with both HBV replication inhibitors and immune modulation agents. In embodiments, the disclosed oligonucleotide constructs are administered in combination with standard of care treatment for HBV infection. Standard of care treatment for HBV infection can include inhibitors of viral polymerase such as nucleotide/nucleotide analogs (e.g., Lamivudine, Telbivudine, Entecavir, Adefovir, Tenofovir, and Clevudine, Tenofovir alafenamide (TAF), CMX157, and AGX-1009) and Interferons (e.g., Peg-IFN-2a and IFN-a-2b, Interferon lambda). In embodiments, the disclosed oligonucleotide constructs are administered in combination with one or more oligonucleotides after either simultaneous (co-administration) or sequential dosing. Oligonucleotides can include siRNA such as ALN-HBV, ARB-1467, ARC-520 and ARC-521, antisense oligonucleotides such as RG6004 (LNA HBV), Ionis-HBV$_{Rx}$ and Ionis-HBV-L$_{Rx}$, miRNA mimics or inhibitors, aptamers, steric blockers, saRNA, shRNA, immunomodulatory and/or HBsAg release inhibiting such as REP 2139 and REP 2165 oligonucleotides. In embodiments, the disclosed oligonucleotide constructs are administered in combination with one or more antiviral agents such as viral replication inhibitors. In embodiments, the disclosed oligonucleotide constructs are administered in combination with HBV Capsid inhibitors. HBV capsid inhibitors can include NVR 3-778, AB-423, GLS-4, Bayer 41-4109, HAP-1, and AT-1. In embodiments, the disclosed oligonucleotide constructs are administered in combination with one or more immunomodulators such as TLR agonists. TLR agonists can include GS-9620, ARB-1598, ANA975, RG7795(ANA773), MEDI9197, PF-3512676, and IMO-2055. In embodiments, the disclosed oligonucleotide constructs are administered in combination with HBV vaccines. HBV vaccines can include Heplislav, ABX203, and INO-1800. In embodiments, the disclosed oligonucleotide constructs are administered in combination Some embodiments include inhibition of HBV gene expression in a cell or subject comprising contacting the cell with an oligonucleotide or composition of the present disclosure, or administering a therapeutically effective amount of a oligonucleotide or composition of the present disclosure to a subject in need thereof.

Some embodiments include the treatment of a disease or disorder associated with the expression or activity of a HBV gene comprising administering a therapeutically effective amount of an oligonucleotide or composition of the present disclosure to a subject in need thereof.

Some embodiments include a method for reducing the viral load of Hepatitis B virus (HBV) in a subject infected with HBV comprising administering a therapeutically effective amount of an oligonucleotide or composition of the present disclosure to the subject in need thereof thereby reducing the viral load of HBV in the subject. Some embodiments also provide methods of reducing the viral load of Hepatitis D virus (HDV) in a subject infected with HDV.

Other embodiments include a method of reducing the level of a Hepatitis B virus (HBV) antigen in a subject infected with HBV comprising administering a therapeutically effective amount of an oligonucleotide or composition of the present disclosure to the subject in need thereof thereby reducing the level of the HBV antigen in the subject.

Some embodiments also provide methods of reducing the level of a Hepatitis D virus (HDV) antigen in a subject infected with HDV. In some embodiments, the HBV antigen is HBsAg or HBeAg.

In one embodiment, an oligonucleotide or composition of the present disclosure targeting HBV is administered to a subject having an HBV infection or both and HBV and an HDV infection, and/or an HBV-associated disease such that the expression of one or more HBV genes, HBV ccc DNA levels, HBV antigen levels, HBV viral load levels, ALT, and/or AST, e.g., in a cell, tissue, blood or other tissue or fluid of the subject are reduced by at least about 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 62%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or at least about 99% or more, or values between two of these numbers, upon administration to the subject of the oligonucleotide or composition of the present disclosure. In some embodiments, the HBV antigen levels are decreased by the previously recited amount. In some embodiments the antigen is HBsAg or HBeAg. In some embodiments, the HBV viral load levels are decreased by the previously recited amount.

In one embodiment, a oligonucleotide or composition of the present disclosure targeting HBV is administered to a subject having an HBV infection or both and HBV and an HDV infection, and/or an HBV-associated disease such that the level of anti-HBV antibodies, e.g., in a cell, tissue, blood or other tissue or fluid of the subject are increased by at least about 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 62%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or at least about 99% or more, or values between two of these numbers, when the an oligonucleotide or composition of the present disclosure is administered to the subject.

Administration of the oligonucleotide or composition of the present disclosure according to the methods and uses of the disclosure may result in a reduction of the severity, signs, symptoms, and/or markers of such diseases or disorders in a patient with an HBV infection or both and HBV and an HDV infection, and/or HBV-associated disease. By "reduction" in this context is meant a statistically significant decrease in such level. The reduction can be, for example, at least about 5%, 10%, 15%, 20%, 25%, 30%, 35%, 40%, 45%, 50%, 55%, 60%, 65%, 70%, 75%, 80%, 85%, 90%, 95%, or about 100%, or values between two of these numbers.

The amount of an oligonucleotide or composition of the present disclosure may be determined by a medical professional. The daily dosage of the products may be varied over a wide range from 0.001 to 1,000 mg per adult human per day, or any range therein. For oral administration, the compositions are preferably provided in the form of tablets containing, 0.01, 0.05, 0.1, 0.5, 1.0, 2.5, 5.0, 10.0, 15.0, 25.0, 50.0, 100, 150, 200, 250, and 500 milligrams of the active ingredient for the symptomatic adjustment of the dosage to the patient to be treated. An effective amount of the drug is ordinarily supplied at a dosage level of from about 0.01 mg/kg to about 100 mg/kg of body weight per day, or any range therein. Preferably, the range is from about 0.01 to about 50.0 mg/kg of body weight per day, or any range therein. More preferably, from about 0.01 to about 10.0 mg/kg of body weight per day, or any range therein. More preferably, from about 0.01 to about 1.0 mg/kg of body weight per day, or any range therein. The oligonucleotides may be administered on a regimen of 1 to 4 times per day. For example, the oligonucleotides of the present disclosure may be administered at one or more doses of from about 0.1 mg/kg to about 100 mg/kg. For example, the disclosed oligonucleotides may be administered at a dose of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 31, 32, 33, 34, 34, 35, 36, 37, 38, 39, 40, 41, 42, 43, 44, 45, 46, 47, 48, 49, 50, 55, 60, 65, 70, 75, 80, 85, 90, 95 or about 100 mg/kg. Values and ranges intermediate to the recited values are also intended to be part of this disclosure. These values may apply to intravenous infusion and/or subcutaneous delivery. Other forms of delivery described herein may also be administered at these doses. The dosages may be varied depending upon the requirement of the patients, the severity of the condition being treated and the oligonucleotides being employed. The use of either daily administration or post-periodic dosing may be employed.

The oligonucleotides of the present disclosure can be administered by intravenous infusion over a period of time, such as over a 5, 6, 7, 8, 9, 10, 11, 12, 13, 14, 15, 16, 17, 18, 19, 20, 21, 22, 23, 24, or about a 25 minute period. The administration may be repeated, for example, on a regular basis, such as weekly, biweekly (i.e., every two weeks) for one month, two months, three months, four months, or longer. After an initial treatment regimen, the treatments can be administered on a less frequent basis. For example, after administration weekly or biweekly for three months, administration can be repeated once per month, for six months or a year or longer.

The oligonucleotides of the present disclosure also can be administered by subcutaneous delivery. The administration may be repeated, for example, on a regular basis, such as weekly, biweekly (i.e., every two weeks) for one month, two months, three months, four months, or longer. After an initial treatment regimen, the treatments can be administered on a less frequent basis. For example, after administration weekly or biweekly for three months, administration can be repeated once per month, for six months or a year or longer.

Efficacy of treatment or prevention of disease can be assessed, for example by measuring disease progression, disease remission, symptom severity, reduction in pain, quality of life, dose of a medication required to sustain a treatment effect, level of a disease marker or any other measurable parameter appropriate for a given disease being treated or targeted for prevention. It is well within the ability of one skilled in the art to monitor efficacy of treatment or prevention by measuring any one of such parameters, or any combination of parameters. For example, efficacy of treatment of CHB may be assessed, for example, by periodic monitoring of viral load and transaminase levels. Comparison of the later readings with the initial readings provides an indication of whether the treatment is effective.

Definitions

It is to be understood that the terminology used herein is for the purpose of describing particular embodiments only and is not intended to limit the scope of the present invention. The following definitions shall apply unless otherwise indicated.

The terms "complementary" or "complementarity" as used herein with reference to polynucleotides (i.e., a sequence of nucleotides such as an oligonucleotide or a target nucleic acid) refer to the base-pairing rules. The complement of a nucleic acid sequence as used herein refers to an oligonucleotide which, when aligned with the nucleic acid sequence such that the 5' end of one sequence is paired with the 3' end of the other, is in "antiparallel association." For example, the sequence "5'-A-G-T-3'" is complementary to the sequence "3'-T-C-A-5'." Certain bases not commonly found in naturally occurring nucleic acids may be included in the nucleic acids described herein. These include, for example, inosine, 7-deazaguanine, Locked Nucleic Acids (LNA), and Peptide Nucleic Acids (PNA). Complementarity need not be perfect; stable duplexes may contain mismatched base pairs, degenerative, or unmatched bases. Those skilled in the art of nucleic acid technology can determine duplex stability empirically considering a number of variables including, for example, the length of the oligonucleotide, base composition, and sequence of the oligonucleotide, ionic strength, and incidence of mismatched base pairs. A complement sequence can also be an RNA sequence complementary to the DNA sequence or its complement sequence, and can also be a cDNA.

The term "hybridize" as used herein refers to a process where two substantially complementary nucleic acid strands (at least about 65% complementary over a stretch of at least 14 to 25 nucleotides, at least about 75%, or at least about 90% complementary) anneal to each other under appropriately stringent conditions to form a duplex or heteroduplex through formation of hydrogen bonds between complementary base pairs. Hybridizations are typically, and preferably, conducted with probe-length nucleic acid molecules, preferably 15-100 nucleotides in length, more preferably 18-50 nucleotides in length. Nucleic acid hybridization techniques are well known in the art. See, e.g., Sambrook, et al., 1989, *Molecular Cloning: A Laboratory Manual*, Second Edition, Cold Spring Harbor Press, Plainview, N.Y. Hybridization and the strength of hybridization (i.e., the strength of the association between the nucleic acids) is influenced by such factors as the degree of complementarity between the nucleic acids, stringency of the conditions involved, and the thermal melting point ($T_m$) of the formed hybrid. Those skilled in the art understand how to estimate and adjust the stringency of hybridization conditions such that sequences having at least a desired level of complementarity will stably hybridize, while those having lower complementarity will not. For examples of hybridization conditions and parameters, see, e.g., Sambrook, et al., 1989, *Molecular Cloning: A Laboratory Manual*, Second Edition, Cold Spring Harbor Press, Plainview, N.Y.; Ausubel, F. M. et al. 1994, *Current Protocols in Molecular Biology*, John Wiley & Sons, Secaucus, N.J. In some embodiments, specific hybridization occurs under stringent hybridization conditions. An oligonucleotide or polynucleotide (e.g., a probe or a primer) that is specific for a target nucleic acid will "hybridize" to the target nucleic acid under suitable conditions.

The term "stringent hybridization conditions" as used herein refers to hybridization conditions at least as stringent as the following: hybridization in 50% formamide, 5× SSC, 50 mM NaH2PO4, pH 6.8, 0.5% SDS, 0.1 mg/mL sonicated salmon sperm DNA, and 5× Denhart's solution at 42° C. overnight; washing with 2× SSC, 0.1% SDS at 45° C.; and washing with 0.2× SSC, 0.1% SDS at 45° C. In another example, stringent hybridization conditions should not allow for hybridization of two nucleic acids, which differ over a stretch of 20 contiguous nucleotides by more than two bases.

The term "substantially complementary" as used herein means that two sequences hybridize under stringent hybridization conditions. The skilled artisan will understand that substantially complementary sequences need not hybridize along their entire length. In particular, substantially complementary sequences may comprise a contiguous sequence of bases that do not hybridize to a target sequence, positioned 3' or 5' to a contiguous sequence of bases that hybridize under stringent hybridization conditions to a target sequence.

"Pharmaceutically acceptable" refers to a material that is not biologically or otherwise undesirable, i.e., the material may be incorporated into a pharmaceutical composition administered to a patient without causing any undesirable biological effects or interacting in a deleterious manner with any of the other components of the composition in which it is contained. When the term "pharmaceutically acceptable" is used to refer to a pharmaceutical carrier or excipient, it is implied that the carrier or excipient has met the required standards of toxicological and manufacturing testing or that it is included on the Inactive Ingredient Guide prepared by the U.S. and Drug administration.

"Constructs" of the oligonucleotides can refer to an oligonucleotide of the present disclosure and, e.g., (1) a conjugated moiety, such as those described herein (such as targeting moieties) or (2) domains of modified/unmodified nucleotides, such as in some chimeric oligonucleotides.

"Chimeric oligonucleotide" refers to an oligonucleotide having more than one domain, for example, as exemplified by Formulae (VI) and (VII). The chimeric oligonucleotide may include additional components, e.g., a ligand-targeting group or a pharmacophore or additional nucleotides, linkers, etc.

"Modified nucleoside" refers to a nucleoside having, independently, a modified sugar moiety and/or modified nucleobase. It is understood that nucleosides can be linked through intersubunit linkages, such as phosphodiester intersubunit linkages, thiophosphate intersubunit linkages, phosphoramidate intersubunit linkages, and thiophosphoramidate intersubunit linkages "Modified nucleotides" may refer to a nucleoside and intersubunit linkage together.

"Unmodified" or "natural" nucleobases include the purine bases adenine (A) and guanine (G), and the pyrimidine bases thymine (T), cytosine (C) and uracil (U). "Modified nucleobases" include other synthetic and natural nucleobases such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl (—C≡C—CH$_3$) uracil and cytosine and other alkynyl derivatives of pyrimidine bases, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluorometltyl and other 5-substituted uracils and cytosines, 7-methylguanine and 7-methyladenine, 2-F-adenine, 2-amino-adenine, 8-azaguanine and 8-azaadenine, 7-deazaguanine and 7-deazaadenine and 3-deazaguanine and 3-deazaadenine. Further modified nucleobases include tricyclic pyrimidines such as phenoxazine cytidine(1H-pyrimido[5,4-b][1,4]benzoxazin-2(3H)-one), phenothiazine cytidine (1H-pyrimido[5,4-b][1,4]benzothiazin-2(3H)-one), G-clamps such as a substituted phenoxazine cytidine (e.g. 9-(2-am-oelhoxy)-H-pyrimido[5,4-b][1,4]benzoxazin-2 (3H)-one), carbazole cytidine (2H-pyrimido[4,5-b]indo1-2-one), pyridoindole cytidine (H-pyrido[3,2 ,5]pyrrolo[2,3-d]pyrimidin-2-one). Modified nucleobases may also include those in which the purine or pyrimidine base is replaced with other heterocycles, for example 7-deaza-adenine, 7-deazaguanosine, 2-aminopyridine, and 2-pyridone.

In some embodiments, the modified nucleobase is selected from the group consisting of 5-methylcytosine, 2,6-diaminopurine, 5-methyluracil, and a g-clamp. In some embodiments, the g-clamp is

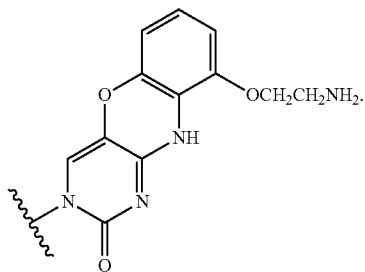

"Ligand targeting group" refers to a moiety that promotes delivery of the oligonucleotide to HBV infected hepatocytes through receptor binding. These groups include "receptor targeting ligands," such as GalNAc, which target cell surface receptor ASGPR and LDL receptor on cell surfaces, respectively. Other receptor targeting ligands that target these receptors on cell surfaces are also within the scope of this term.

"Pharmacophore" refers to an oligonucleotide drug sequence that interacts HBV DNA or RNA molecules within HBV/HDV or HBV-infected cells and triggers antiviral responses.

"Conformationally restricted nucleoside" refers to nucleosides having a bridged or bicyclic sugar structure wherein the conformation of the nucleoside may be fixed in a particular configuration. For example, conformationally restricted nucleosides include those with fixed C3'-endo sugar puckering. Exemplary embodiments include bridged nucleic acids (BNAs), e.g., 2', 4'-BNA nucleosides such as a-L-Methyleneoxy (4'-CH$_2$-O-2') LNA, P-D-Methyleneoxy (4'-CH$_2$-O-2') LNA, Ethyleneoxy (4'-(CH$_2$)$_2$-O-2') ENA, 2',4'-BNA$^{NC}$[NH], 2',4'-BNA$^{NC}$[NMe], 2',4'-BNA$^{NC}$[NBn], aminooxy (4'-CH2-O—N(R)-2') BNA, and oxyamino (4'-CH$_2$—N(R)—O-2') BNA. Other exemplary BNA structures include but are not limited to, oligonucleotides having at least one bridge between the 4' and the 2' position of the sugar wherein each of the bridges independently comprises 1 or from 2 to 4 linked groups independently selected from —[C(R$_1$)(R$_2$)]$_n$—, —C(R$_1$)=C(R$_2$)—, —C(R$_1$)=N—, —C(=NR$_1$)—, —C(=O)—, —C(=S)—, —O—, —Si(R$_1$)$_2$—, —S(=O)$_x$— and —N(R$_1$)—; wherein: x is 0, 1, or 2; n is 1, 2, 3, or 4; each R$_1$ and R$_2$ is, independently, H, a protecting group, hydroxyl, C$_1$-C$_{12}$ alkyl, substituted C$_1$-C$_{12}$ alkyl, C$_2$-C$_{12}$alkenyl, substituted C$_2$-C$_{12}$ alkenyl, C$_2$-C$_{12}$ alkynyl, substituted C$_2$-C$_{12}$ alkynyl, C$_5$-C$_{20}$aryl, substituted $C_5$-$C_{20}$aryl, a heterocycle radical, a substituted heterocycle radical, heteroaryl, substituted heteroaryl, $C_5$-$C_7$ alicyclic radical, substituted $C_5$-$C_7$ alicyclic radical, halogen, $OJ_1$, $NJ_1J_2$, $SJ_1$, $N_3$, $COOJ_1$, acyl (C(=O)—H), substituted acyl, CN, sulfonyl (S(=O)$_2$-$J_1$), or sulfoxyl (S(=O)-$J_1$); and each $J_1$ and $J_2$ is, independently, H, $C_1$-$C_{12}$ alkyl, substituted $C_1$-$C_{12}$ alkyl, $C_2$-$C_{12}$ alkenyl, substituted $C_2$-$C_{12}$alkenyl, $C_2$-$C_{12}$ alkynyl, substituted $C_2$-$C_{12}$ alkynyl, $C_5$-$C_{20}$aryl, substituted $C_5$-$C_{20}$aryl, acyl (C(=O)—H), substituted acyl, a heterocycle radical, a substituted heterocycle radical, $C_1$-$C_{12}$ aminoalkyl, substituted $C_1$-$C_{12}$aminoalkyl or a protecting group. Certain BNAs have been prepared and disclosed in the patent literature as well as in scientific literature (see for example: issued U.S. Pat. Nos. 7,053,207; 6,268,490; 6,770,748; 6,794,499; 7,034,133; 6,525,191; 7,696,345; 7,569,575; 7,314,923; 7,217,805; and 7,084,125, hereby incorporated by reference herein in their entirety. "Conformationally restricted nucleotide" refers to conformationally restricted nucleosides linked through an intersubunit linkage.

In some embodiments, the conformationally restricted nucleoside is selected from optionally substituted LNA or optionally substituted ENA. The optionally substituted LNA or ENA may be substituted by an alkyl moiety, for example a methyl or ethyl on one of the —CH$_2$-moieties.

"Inhibiting expression" refers to a reduction or blockade of the expression or activity and does not necessarily indicate a total elimination of expression or activity.

"Inhibiting replication of a virus" refers to reduction or blockade of the replication of a virus and does not necessarily indicate a total elimination of replication of the virus.

"Subject" refers to mammals and includes humans and non-human mammals. In some embodiments, the subject is a human, such as an adult human.

"Treating" or "treatment" of a disease in a subject refers to (1) preventing the disease from occurring in a subject that is predisposed or does not yet display symptoms of the disease; (2) inhibiting the disease or arresting its development; or (3) ameliorating or causing regression of the disease.

"Therapeutically effective amount" means an amount of a pharmaceutical agent that provides a therapeutic benefit to a subject.

"Pharmaceutically acceptable salt" means physiologically and pharmaceutically acceptable salts of the compounds of the present disclosure, i.e., salts that retain the desired biological activity of the parent oligonucleotide/compound and do not impart undesired toxicological effects thereto.

The following abbreviations are used in this disclosure. 2'-H (deoxyribose) nucleosides are referred to by an uppercase letter corresponding to the nucleobase, e.g., A, C, G, and T. 2'-OH (ribose) nucleosides are referred to by a lowercase r and an uppercase letter corresponding to the nucleobase, e.g., rA, rC, rG, and rU. 2'-O-Me nucleosides are referred to by a lowercase m and an uppercase letter corresponding to the nucleobase, e.g., mA, mC, mG and mU. 2'-MOE nucleosides are referred to by a lowercase "moe" and an uppercase letter corresponding to the nucleobase, e.g., moeA, moeC, moeG and moeU. 2'-ribo-F nucleosides are referred to by a lowercase "f" and an uppercase letter corresponding to the nucleobase, e.g., fA, fC, fG and fU. 2'-arabino-F nucleosides are referred to by a lowercase "af" and an uppercase letter corresponding to the nucleobase, e.g., afA, afC, afG and afU. mA* is 3'-amino-2'-OMe-2,6-Diaminopurine. A* is 3'-amino-2'-deoxy-2,6-Diaminopurine. fA* is 3' -amino-2'-F-2,6-Diaminopurine. LNA nucleosides are referred to by an "L" and an uppercase letter corresponding to the nucleobase, e.g., LA, LC, LG, LT.

For the backbone or intersubunit linkages of the nucleotides, phosphodiester intersubunit linkages are referred to as "PO" or are generally not included in sequence details; thiophosphate intersubunit linkages are abbreviated as lowercase "ps"; phosphoramidate intersubunit linkages are abbreviated as lowercase "np"; and thiophosphoramidate intersubunit linkages are abbreviated as lowercase "nps."

N3'→P5' refers to modified nucleotides having intersubunit linkages where the 3' moiety contains N (e.g., NH) and is linked through a P. For example, the following structure has a N3'→P5' linkage:

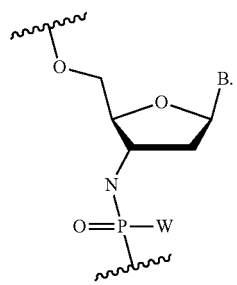

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

The term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term. Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

A "linker moiety" can include, e.g., a $C_2$-$C_{10}$ alkyl moiety or a $C_3$-$C_{10}$ alkyloxide moiety having 1-5 oxygen atoms. This linker also may include one or more amine moieties, either at the terminus of the linker, or internal linker, e.g. internal in the $C_2$-$C_{10}$ alkyl moiety or a $C_3$-$C_{10}$ alkyloxide moiety.

A "solid-support linker" will be understood by persons of ordinary skill in the art as a chemical moiety that links a compound to a solid support, such as a resin. The solid-support linker must be capable of being readily cleaved under specific conditions at the end of the synthesis. A common linker is a succinyl linker, which can be readily cleaved by treatment with concentrated ammonium hydroxide. The term solid-support linker includes embodiments where the chemical is attached to the solid support, and embodiments where the solid-support linker does not include the solid support.

It is also to be appreciated that the various modes of treatment or prevention of the diseases or conditions described herein are intended to mean "substantial," which includes total but also less than total treatment or prevention, and wherein some biologically or medically relevant result is achieved. The treatment may be a continuous prolonged treatment for a chronic disease or a single, or few time administrations for the treatment of an acute condition.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

This disclosure is not limited to particular embodiments described, as such may vary. It is also to be understood that the terminology used herein is for the purpose of describing particular embodiments only, and is not intended to be limiting, since the scope of the present invention will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates that may need to be independently confirmed.

EXAMPLES

The following examples illustrate certain embodiments of the present disclosure to aid the skilled person in practicing the disclosure. Accordingly, the examples are in no way considered to limit the scope of the disclosure.

Methods of Making

All the monomers were dried in vacuum desiccator with desiccants (KOH and $P_2O_5$, RT 24h). Synthesis solid supports (CPG) attached to the first 5' residue were obtained from commercially available sources. All other synthesis reagents and solvents were obtained from commercially available sources and used as such. The chemicals and solvents for post synthesis workflow were purchased from commercially available sources and used without any purification or treatment. Solvent (Acetonitrile) and solutions (amidite and activator) were stored over molecular sieves during synthesis.

The control, nuclease stabilized, 3'-GalNAc conjugated antisense oligonucleotides used in this study are shown, e.g., in the Tables. The antisense oligonucleotides were synthesized on an ABI-394 synthesizer using the standard 93-step cycle written by the manufacturer. The solid support was controlled pore glass and the monomers contained standard protecting groups. Each oligonucleotide was individually synthesized using commercially available 5'-O-(4,4'-dimethoxytrityl)-3'-O-(2-cyanoethyl-N,N-diisopropyl) DNA and or 2'-O-Me phosphoramidite monomers of 6-N-benzoyladenosine ($A^{Bz}$), 4-N-acetylcytidine ($C^{Ac}$), 2-N-isobutyrylguanosine ($G^{iBu}$), and Thymidine (T), according to standard solid phase oligonucleotide synthesis protocols. The phosphoramidites were purchased from commercially available sources. The 2'-O-Me-2,6,diaminopurine phosphoramidite was purchased from commercially available sources. The DDTT ((dimethylamino-methylidene) amino)-3H-1,2,4-dithiazaoline-3-thione was used as the sulfur-transfer agent for the synthesis of oligoribonucleotide phosphorothioates. Modified oligonucleotides were obtained using an extended coupling of 0.1M solution of phosphoramidite in $CH_3CN$ in the presence of 5-(ethylthio)-1H-tetrazole activator to a solid bound oligonucleotide followed by standard capping, oxidation and deprotection. The stepwise coupling efficiency of all modified phosphoramidites was more than 98%. Oligonucleotide-bearing solid supports were heated with aqueous ammonia/ethanol (3:1) solution at 55° C. for 8 h to deprotect the base labile protecting groups.

The GalNAc conjugated ASOs were synthesized from a hydroxyprolinol-GalNAc solid support. GalNAc was tethered to trans-4-hydroxyprolinol via a 6-aminohexanoate linkage to obtain a hydroxyprolinol-GalNAc moiety that was subsequently attached to a functionalized control pore glass (CPG) to obtain the solid support.

The unconjugated and GalNAc modified oligonucleotides were purified by anion-exchange HPLC. The buffers were 20 mM sodium phosphate in 10% $CH_3CN$, pH 8.5 (buffer A) and 20 mM sodium phosphate in 10% $CH_3CN$, 1.8 M NaBr, pH 8.5 (buffer B). Fractions containing full-length oligonucleotides were pooled, desalted and lyophilized.

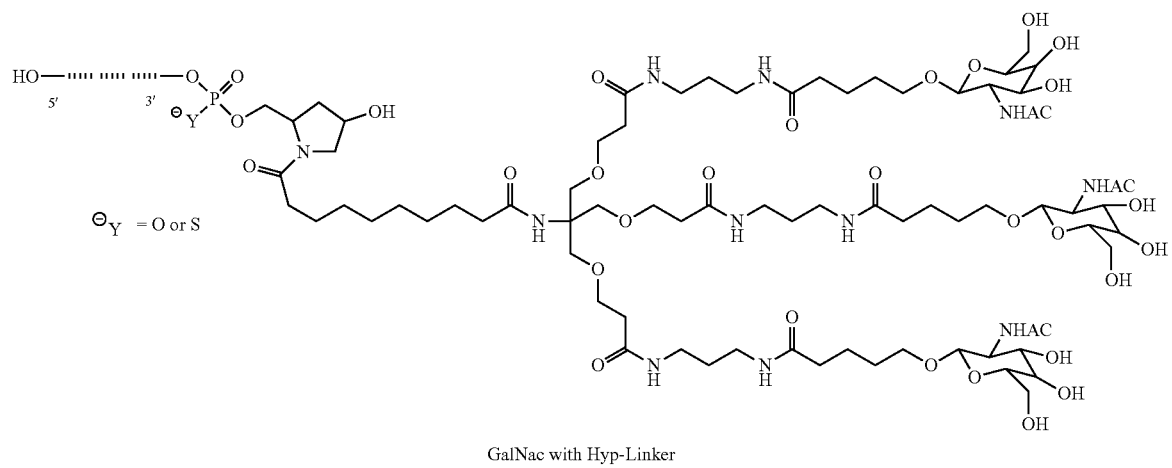

GalNac with Hyp-Linker

GalNAc Synthesis

Synthesis of G-1

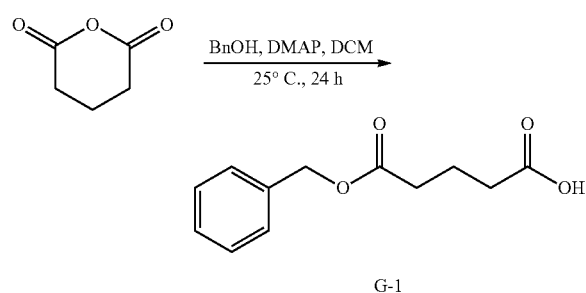

To a solution of oxane-2, 6-dione (1000 g, 8.76 mol, 1.00 equiv.), 4-dimethylaminopyridine (53.5 g, 437.9 mmol, 0.05 equiv.) in dichloromethane (10000 mL) with an inert atmosphere of nitrogen was added phenylmethanol (900 g, 8.32 mol, 0.95 equiv.) dropwise with stirring at room temperature. The resulting solution was stirred overnight at room temperature. The resulting mixture was washed with saturated sodium bicarbonate solution. The pH value of the aqueous layers was adjusted to 1 with 10% hydrochloric acid. The resulting solution was extracted with 3×2000 mL of ethyl acetate and the organic layers combined. The resulting mixture was washed with 2×3000 mL of saturated sodium chloride. The organic layer was dried over anhydrous sodium sulfate, filtered, and concentrated under reduced pressure. This resulted in 1240 g (64%) of G-1 as colorless oil. MS m/z [M+H]+(ESI): 223.

Synthesis of G-2

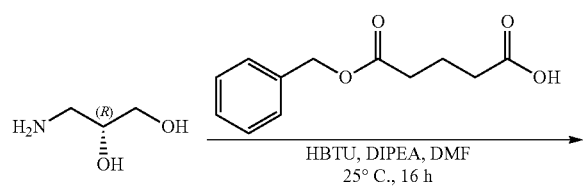

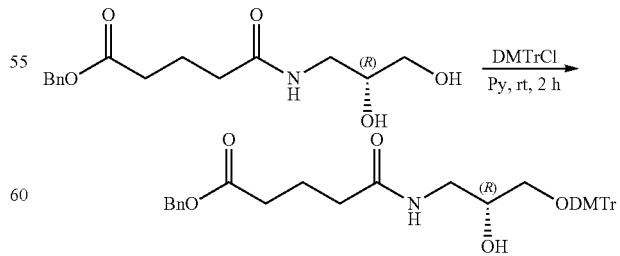

To a solution of G-1 (58.5 g, 263.23 mmol, 1.20 equiv.), N,N-diisopropylethylamine (34 g, 263.57 mmol, 1.20 equiv.) in N,N-dimethylformamide (600 mL) with an inert atmosphere of nitrogen was added O-Benzotriazole-N,N, N',N'-tetramethyl-uronium-hexafluorophosphate (100 g, 263.69 mmol, 1.20 equiv.) at room temperature. The resulting solution was stirred for 1 h at room temperature. This was followed addition of (2R)-3-aminopropane-1,2-diol (20 g, 219.52 mmol, 1.00 equiv.) at room temperature. The resulting solution was allowed to react, with stirring, overnight at room temperature. The resulting solution was diluted with 2000 mL of ethyl acetate. The resulting mixture was washed with 2×1000 mL of saturated sodium bicarbonate solution. The mixture was dried over anhydrous sodium sulfate and concentrated under reduced pressure. The residue was applied onto a silica gel column. This resulted in 38.7 g (60%) of G-2 as a light yellow solid. MS m/z [M+H]+(ESI): 296.

Synthesis of G-3

To a solution of G-2 (10 g, 33.86 mmol, 1.00 equiv.) in pyridine (100 mL) with an inert atmosphere of nitrogen was added 1-[chloro(4-methoxyphenyl)benzyl]-4-methoxybenzene (12.63 g, 37.28 mmol, 1.10 equiv.) at room temperature. The resulting solution was stirred overnight at room temperature. The reaction was then quenched by the addition of methanol (10 mL). The resulting mixture was concentrated under reduced pressure. The resulting solution was diluted with 1000 mL of ethyl acetate. The resulting mixture was washed with 2×500 mL of saturated sodium bicarbonate solution. The mixture was dried over anhydrous sodium sulfate and concentrated under reduced pressure. The residue was applied onto a silica gel column. This resulted in 10.2 g (50%) of G-3 as light yellow oil. MS m/z [M+Na]+ (ESI): 620.

Synthesis of G-4

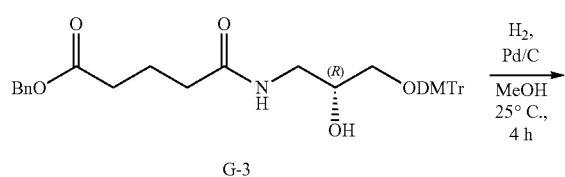

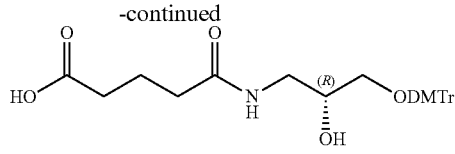

G-4

To a solution of G-3 (10 g, 16.73 mmol, 1.00 equiv.) in methanol (100 mL) was added 10% Palladium on activated carbon (1 g) at room temperature. The flask was evacuated and flushed five times with hydrogen. The resulting solution was stirred for 4 h at room temperature. The solids were filtered out. The resulting mixture was concentrated under reduced pressure. This resulted in 7.6 g (89%) of G-4 as a white solid. MS m/z [M+Na]+(ESI): 530.

Synthesis of G-5

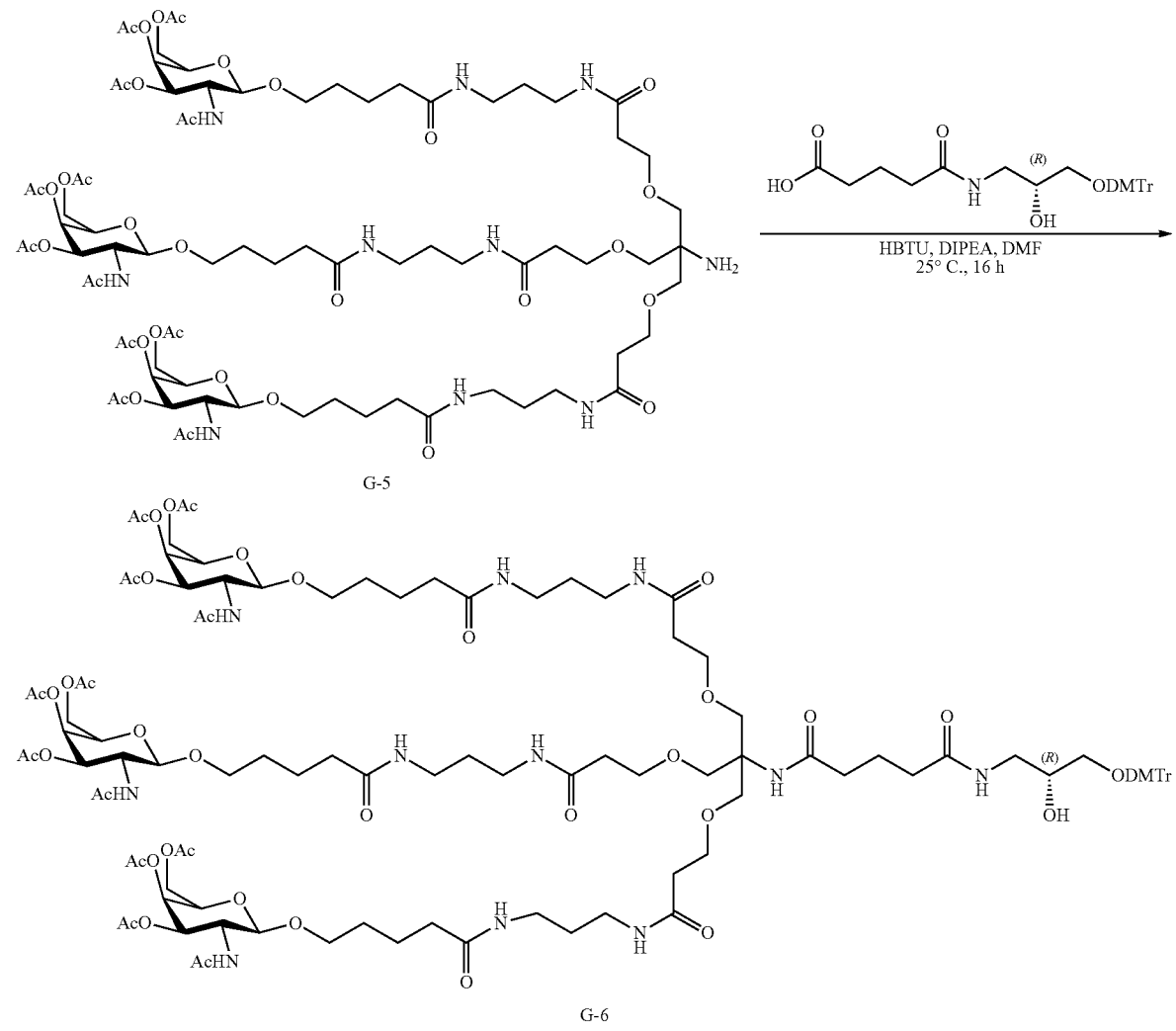

To a solution of G-4 (8.90 g, 17.53 mmol, 1.05 equiv.) in N,N-dimethylformamide (300 mL) with an inert atmosphere of nitrogen, was added N,N-diisopropylethylamine (6.47 g, 50.16 mmol, 3.00 equiv.) at room temperature. To this was added O-Benzotriazole-N,N,N-etramethyl-uronium-hexafluorophosphate (7.10 g, 18.73 mmol, 1.12 equiv.) at room temperature. The resulting solution was stirred for 15 min at room temperature. To the mixture was added G-5 Ref (*Nucleic Acids Research,* 2014, 42, (13) 8796-8807), (30 g, 16.72 mmol, 1.00 equiv.) at room temperature. The resulting solution was allowed to react, with stirring, overnight at room temperature. The resulting mixture was concentrated under reduced pressure. The crude product was purified by Flash-Prep-HPLC. This resulted in 20.1 g (53%) of G-6 as a white solid. MS m/z [M+H]⁺(ESI): 2283.

Synthesis of G-7

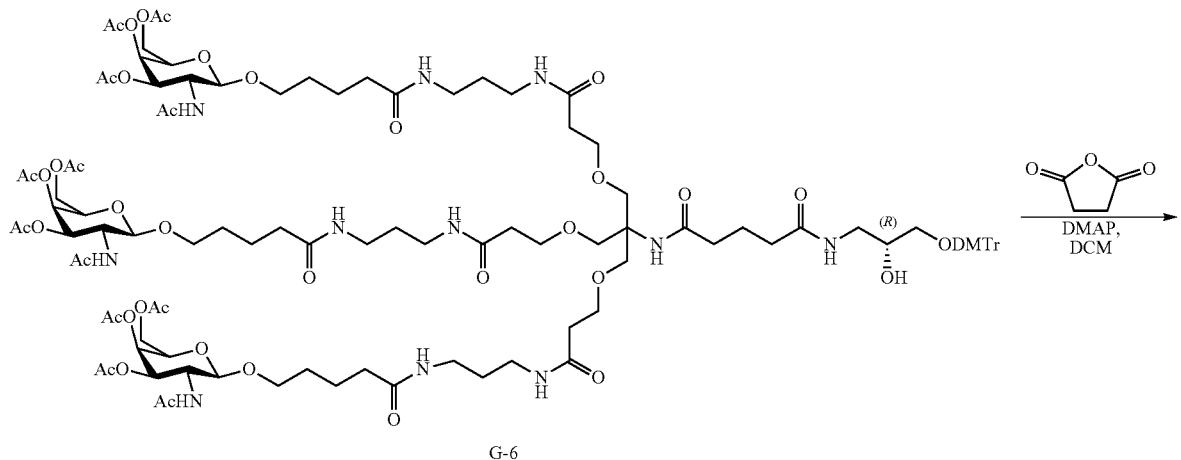

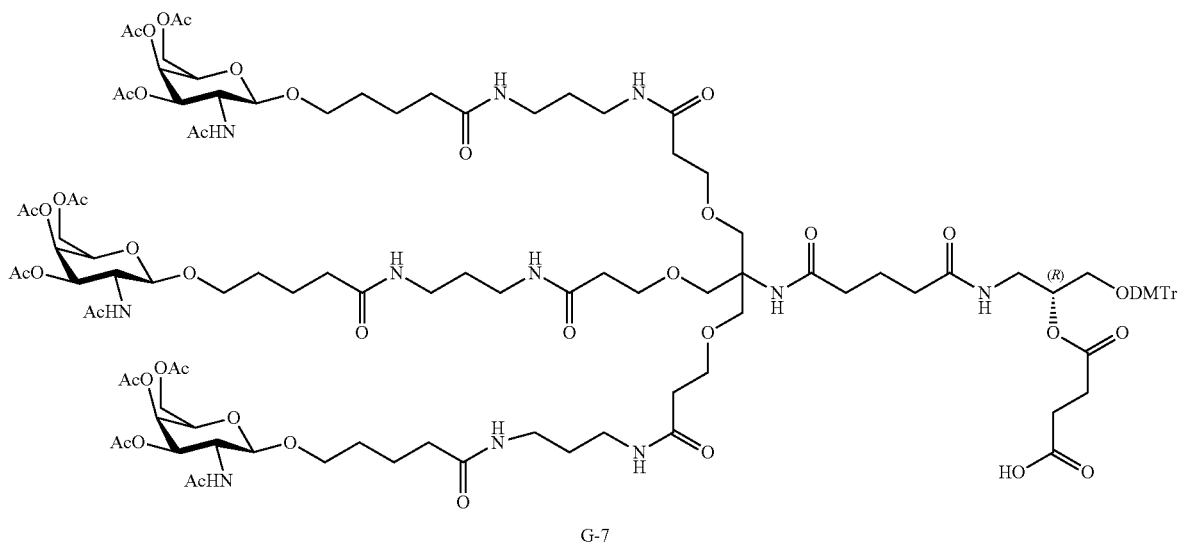

To a solution of G-6 (25 g, 10.96 mmol, 1.00 equiv.) in dichloromethane (750 mL) with an inert atmosphere of nitrogen, was added triethylamine (4.98 g, 49.21 mmol, 4.49 equiv.) at room temperature. To this was added 4-dimethylaminopyridine (1.33 g, 10.89 mmol, 0.99 equiv.) at room temperature. To the mixture was added oxolane-2,5-dione (3.29 g, 32.88 mmol, 3.00 equiv.) at room temperature. The resulting solution was stirred overnight at room temperature. The resulting mixture was concentrated under reduced pressure. The crude product was purified by Flash-Prep-HPLC. This resulted in 15.83 g (61%) of G-7 as a white solid as ammonium salt. MS m/z [M/2+NH4]+(ESI): 1210.

Synthesis of GalNAc-2-solid support-GPG

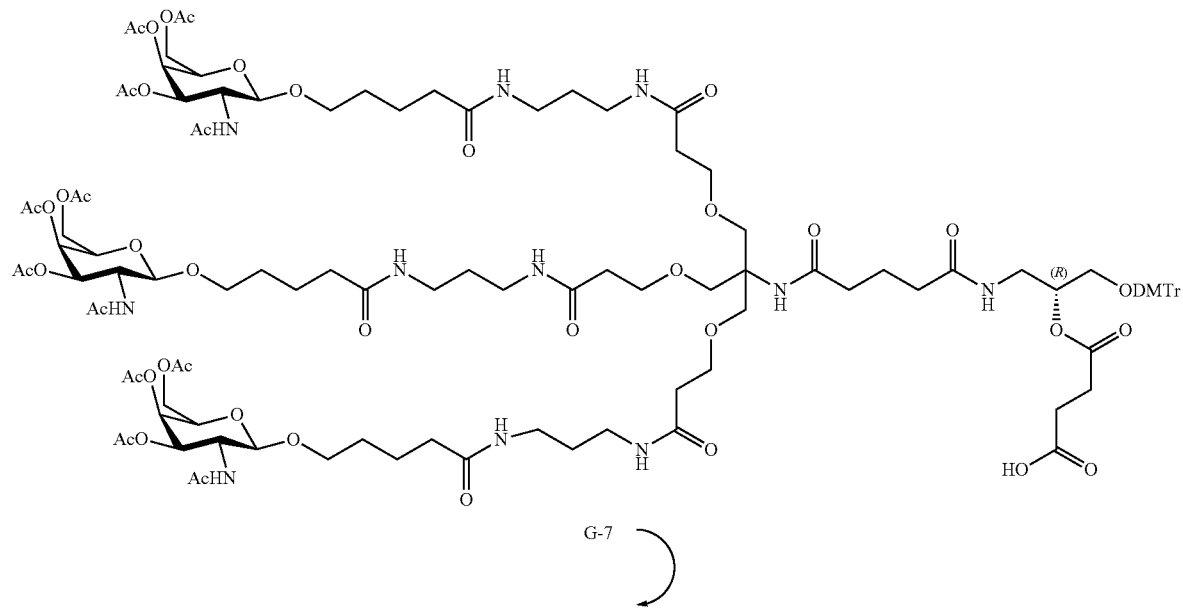

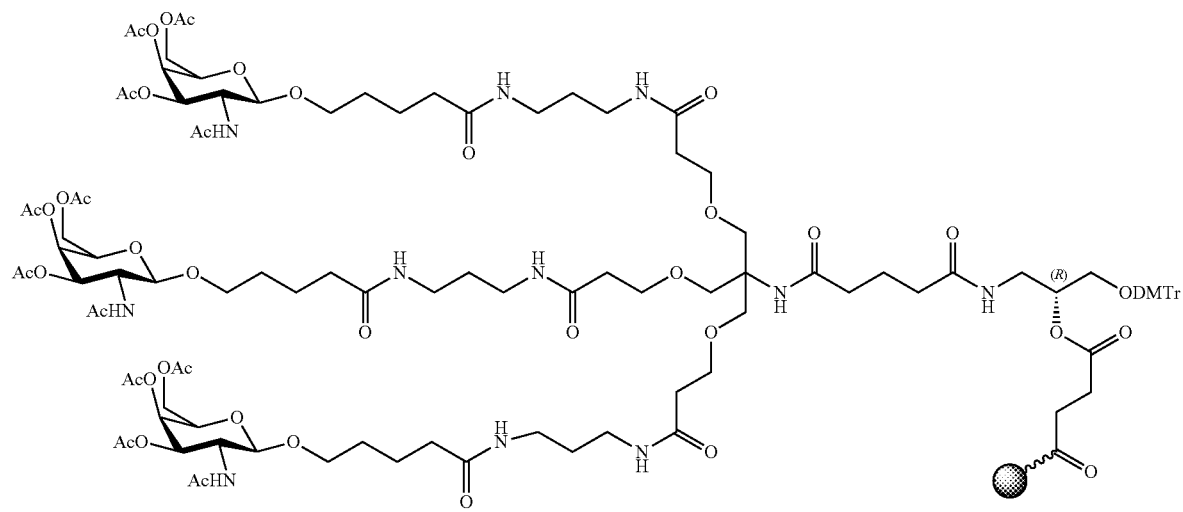

The G-7 was loaded onto the CPG by following the procedures described in Biotechniques.,1988 Sep;6(8):768-75 using HIBTU/rEA to give GalNAc-2- CPG (53 μmol/g).
Synthesis of GalNAc-3
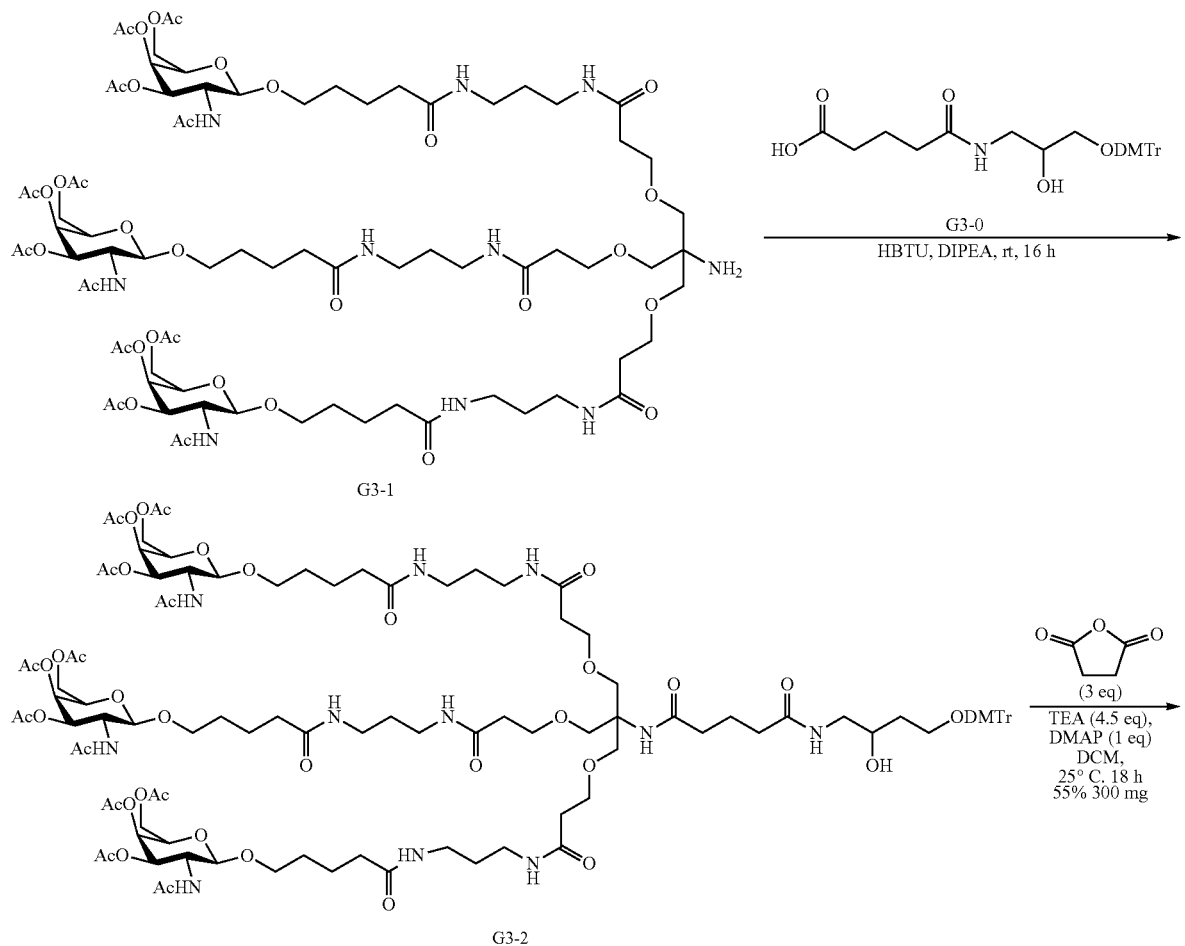
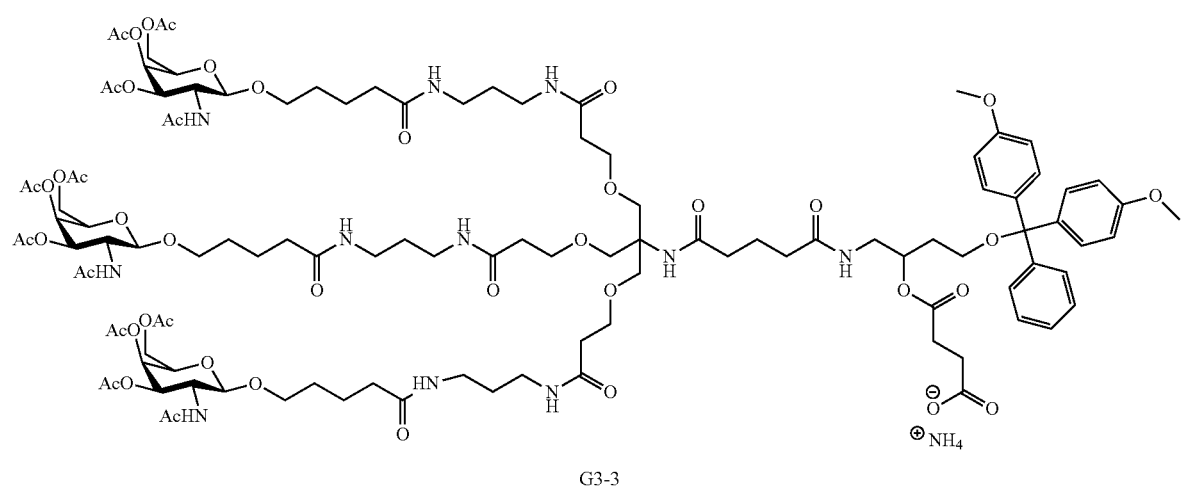

To a solution of G3-0 (12.8 g, 24.57 mmol, 1.00 equiv) in N,N-dimethylformamide (500 mL) was added N,N-diisopropylethylamine (9.0 g, 69.64 mmol, 3.00 equiv), O-Benzotriazole-N,N,N-etramethyl-uronium-hexafluorophosphate (9.9 g, 27.03 mmol, 1.10 equiv). The resulting solution was stirred for 2 h at room temperature. Then G3-1 (44 g, 24.57 mmol, 1.00 equiv) was added. The resulting solution was stirred for 16 h at room temperature. The resulting mixture was concentrated under reduced pressure. The crude product was purified by Flash-Prep-HPLC. This resulted in 22 g (41%) of G3-2 as a light yellow solid. MS m/z [M−H]⁻ (ESI): 2295. H-NMR (DMSO, 400 MHz): 7.79-7.83 (m, 6H), 7.70-7.73(m, 4H), 7.33-7.35(m, 2H), 7.26-7.30(m, 2H), 7.19-7.22(m, 5H), 7.01(s, 1H), 6.84-6.87(m, 4H), 5.19-5.20 (d, J=4.0 Hz, 3H), 4.93-4.97(m, 3H), 4.58-4.59(d, J=4.0 Hz, 1H), 4.46-4.48(d, J=8.0 Hz, 3H), 3.95-4.04(m, 9H), 3.82-3.89(m, 3H), 3.67-3.71(m, 9H), 3.45-3.61(m, 12H), 3.36-3.41(m, 3H), 2.94-3.09(m, 16H), 2.24-2.27(m, 6H), 2.00-2.08(m, 29H), 1.87(s, 9H), 1.75(s, 9H), 1.63-1.69(m, 3H), 1.41-1.51(m, 19H).

To a solution of G3-2 (22 g, 9.58 mmol, 1.00 equiv), TEA (4.4 g, 4.50 equiv), 4-dimethylaminopyridine (1.15 g, 1.00 equiv) in dichloromethane (220 mL) was added oxolane-2, 5-dione (2.87 g, 28.68 mmol, 3.00 equiv) at room temperature. The resulting solution was stirred for 18 h at room temperature. The resulting mixture was concentrated under vacuum. The crude product was purified by Flash-Prep-HPLC. This resulted in 15.01 g (65%) of G3-3 as a white solid. MS m/z [M−H]⁻(ESI): 2395. H-NMR (DMSO, 400 MHz): 7.96-8.16 (m, 10H), 7.28-7.36(m, 4H), 7.21-7.23(m, 6H), 6.86-6.89(m, 4H), 5.21-5.22(d, J=3.2 Hz, 3H), 4.97-5.03(m, 4H), 4.51-4.53(d, J=8 Hz, 3H), 4.03(m, 9H), 3.85-3.92(m, 3H), 3.69-3.74(m, 9H), 3.52-3.59(m, 12H), 3.38-3.44(m, 4H), 2.95-3.04(m, 15H), 2.23-2.29(m, 10H), 2.10 (s, 9H), 2.04-2.07(m, 9H), 2.00(s, 9H), 1.89(s, 9H), 1.78(s, 10H), 1.63-1.68(m, 3H), 1.45-1.54(m, 18H).

Synthesis of GalNAc-4

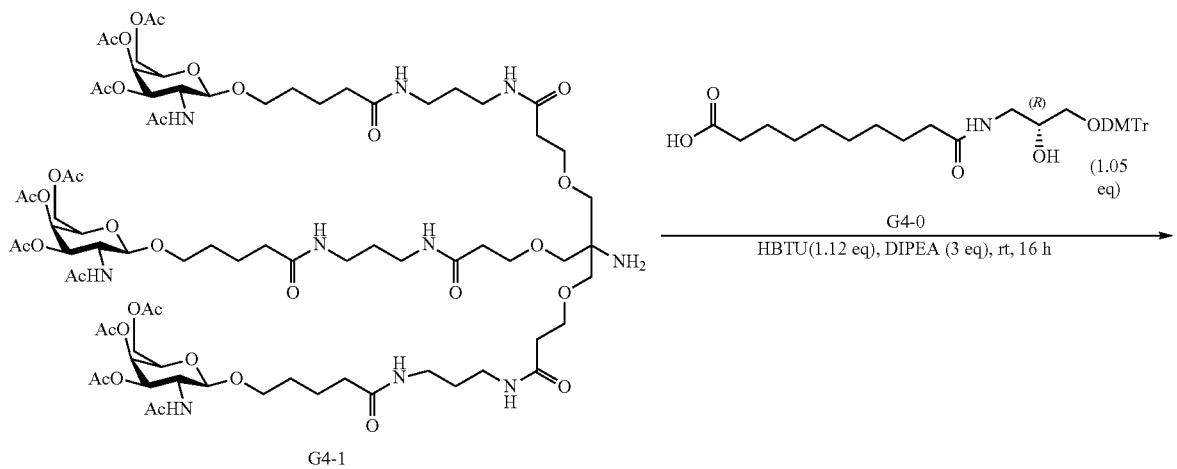

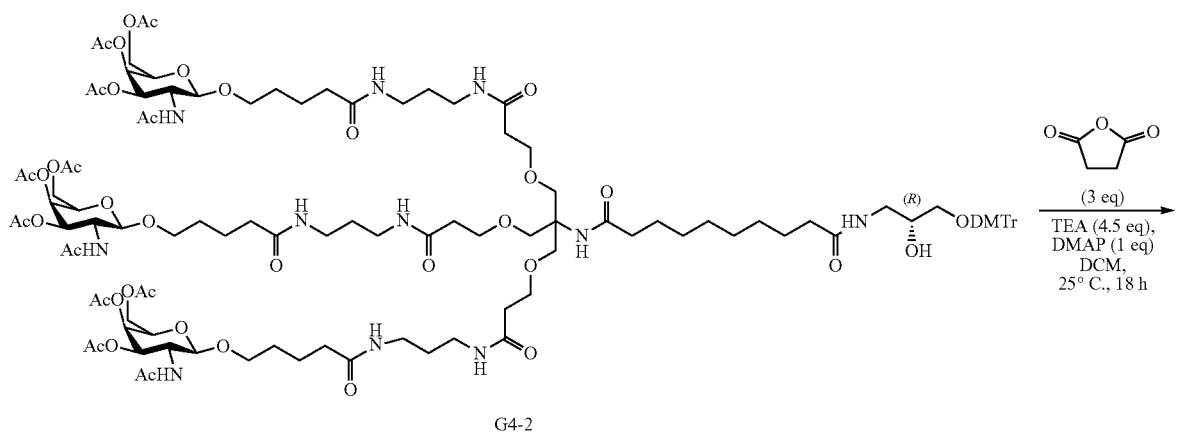

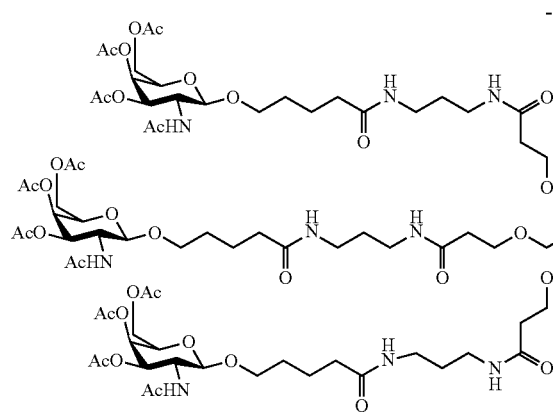
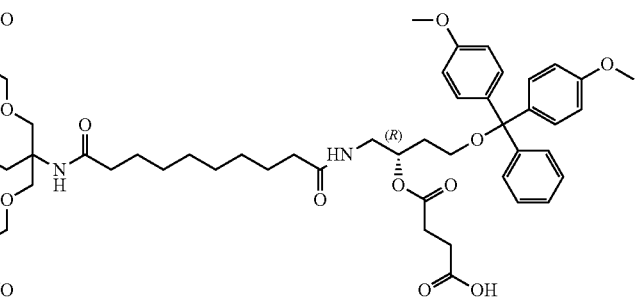

G4-3

To a solution of G4-0 (10.13 g, 17.53 mmol, 1.05 equiv) in N,N-dimethylformamide (300 mL) with an inert atmosphere of nitrogen, was added N,N-diisopropylethylamine (6.47 g, 50.06 mmol, 2.99 equiv) at room temperature. To this was added O-Benzotriazole-N,N,N-etramethyl-uronium-hexafluorophosphate (7.10 g, 18.72 mmol, 1.12 equiv) at room temperature. The resulting solution was stirred for 15 min at room temperature. To the mixture was added G4-1 (30 g, 16.72 mmol, 1.00 equiv) at room temperature. The resulting solution was allowed to react, with stirring, overnight at room temperature. The resulting mixture was concentrated under reduced pressure. The crude product (30 g) was purified by Flash-Prep-HPLC. This resulted in 22.3 g (57%) of G4-2 as a white solid.

To a solution of G4-2 (15 g, 6.38 mmol, 1.00 equiv) in dichloromethane (450 mL) with an inert atmosphere of nitrogen, was added Triethylamine (2.90 g, 28.66 mmol, 4.49 equiv) at room temperature. To this was added 4-dimethylaminopyridine (777 mg, 6.36 mmol, 1.00 equiv) at room temperature. To the mixture was added oxolane-2,5-dione (1.91 g, 19.09 mmol, 2.99 equiv) at room temperature. The resulting solution was stirred overnight at room temperature. The resulting mixture was concentrated under reduced pressure. The crude product (15 g) was purified by Flash-Prep-HPLC. This resulted in 10.8047 g (69%) of G4-3 as a light yellow solid. MS m/z [M+H]+(ESI): 2453. 1H NMR (DMSO-d$_6$, 400 Hz, ppm): 8.10-7.92 (m, 10H), 7.35-7.30 (m, 4H), 7.24-7.22 (m, 5H), 7.10-7.01 (m, 1H), 6.89-6.87 (m, 4H), 5.22-5.21 (d, J=3.2 Hz, 3H), 4.00-4.97 (m, 4H), .4.53-4.51 (m, 3H), 4.04-3.90 (m, 9H), 3.87-3.3.80 (m, 3H), 3.74-3.70 (m, 10H), 3.69-3.39 (m, 16H), 3.05-3.02 (m, 16H), 2.51-2.50 (m, 2H), 2.30-2.27 (m, 8H), 2.11-1.99 (m, 29H), 1.89 (s, 9H), 1.77 (s, 9H), 1.52-1.32 (m, 22H), 1.20 (s, 9H).

Synthesis of GalNAc-5

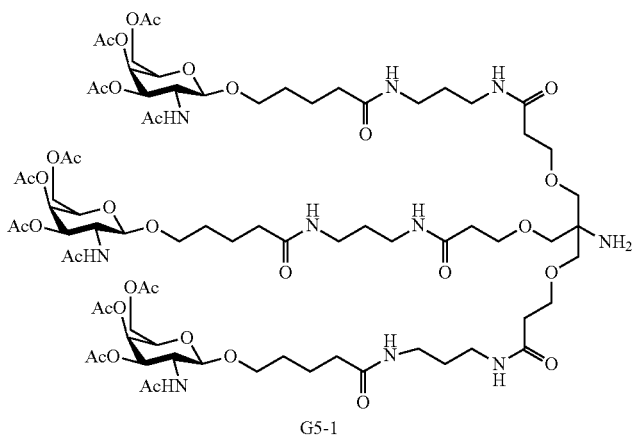
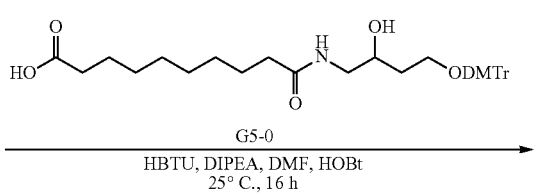

G5-1    G5-0
HBTU, DIPEA, DMF, HOBt
25° C., 16 h

-continued

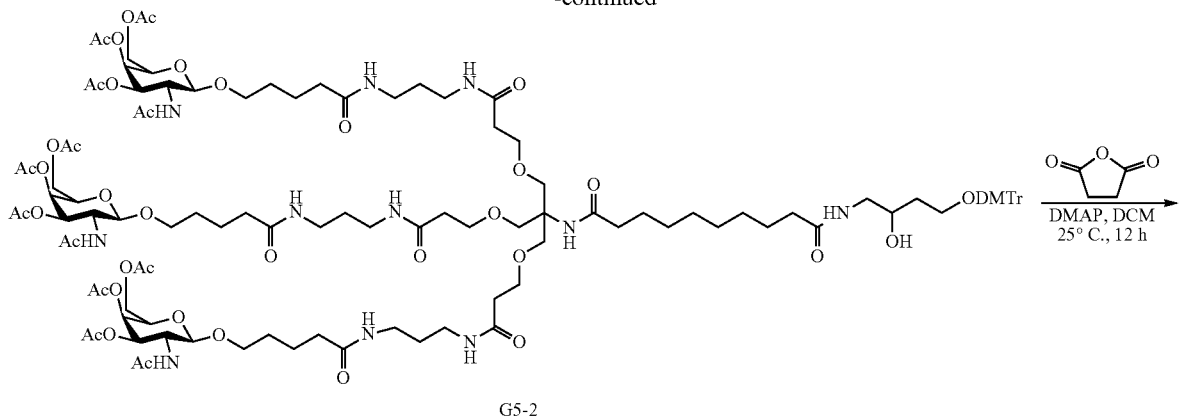

G5-2

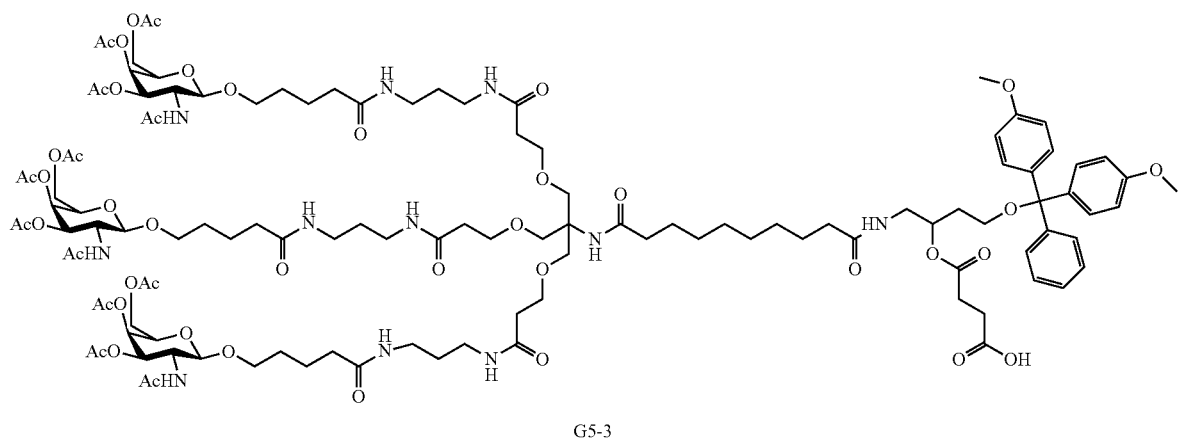

G5-3

To a solution of G5-0 (10 g, 16.90 mmol, 1.06 equiv) in N,N-dimethylformamide (300 mL) with an inert atmosphere of nitrogen was added N,N-diisopropylethylamine (6.18 g, 47.96 mmol, 3.0 equiv), O-Benzotriazole-N,N,N-etramethyl-uronium-hexafluorophosphate (6.84 g, 18.04 mmol, 1.13 equiv). The resulting solution was stirred for 5 min at room temperature. Then a solution of G5-1 (28.68 g, 15.99 mmol, 1.00 equiv) in N,N-dimethylformamide (300 mL) was added. The resulting solution was allowed to react, with stirring, overnight at room temperature. The resulting mixture was concentrated under reduced pressure. The crude product (20 g) was purified by Flash-Prep-HPLC. This resulted in 20.44 g (54%) of G5-2 as a white solid To a solution of G5-2 (12.5 g, 5.28 mmol, 1.00 equiv) in dichloromethane (375 mL) with an inert atmosphere of nitrogen, was added 4-dimethylaminopyridine (650 mg, 5.32 mmol, 1.01 equiv), Triethylamine (2.4 g, 23.76 mmol, 4.50 equiv) and oxolane-2, 5-dione (1.59 g, 15.89 mmol, 3.01 equiv) in order. The resulting solution was stirred overnight at room temperature. The resulting mixture was concentrated under reduced pressure. The crude product (15 g) was purified by Flash-Prep-HPLC. This resulted in 9.0 g (73%) of G5-3 as a white solid. MS m/z [M−H]−(ESI): 2465. 1H-NMR (DMSO-$d_6$, 300 Hz): 8.10-7.90 (m, 10H), 7.36-7.20 (m, 9H), 7.10 (s, 1H), 6.88-6.85 (m, 4H), 5.22-5.20(d, J=3.0 Hz, 3H), 4.99-4.95 (m, 4H), 4.52-4.49 (m, 3H), 4.02-3.89 (s, 9H), 3.85-3.73 (m, 3H), 3.70-68 (m, 9H), 3.65-3.52 (m, 12H), 3.52-3.38 (m, 6H), 3.02-2.94 (m, 15H), 2.30-2.25 (m, 10H), 2.09-1.99 (M, 29H), 1.88-(s, 9H), 1.77 (s, 11H), 1.52-1.45 (m, 22H), 1.23-1.19 (m, 9H).

Synthesis of GalNAc-6
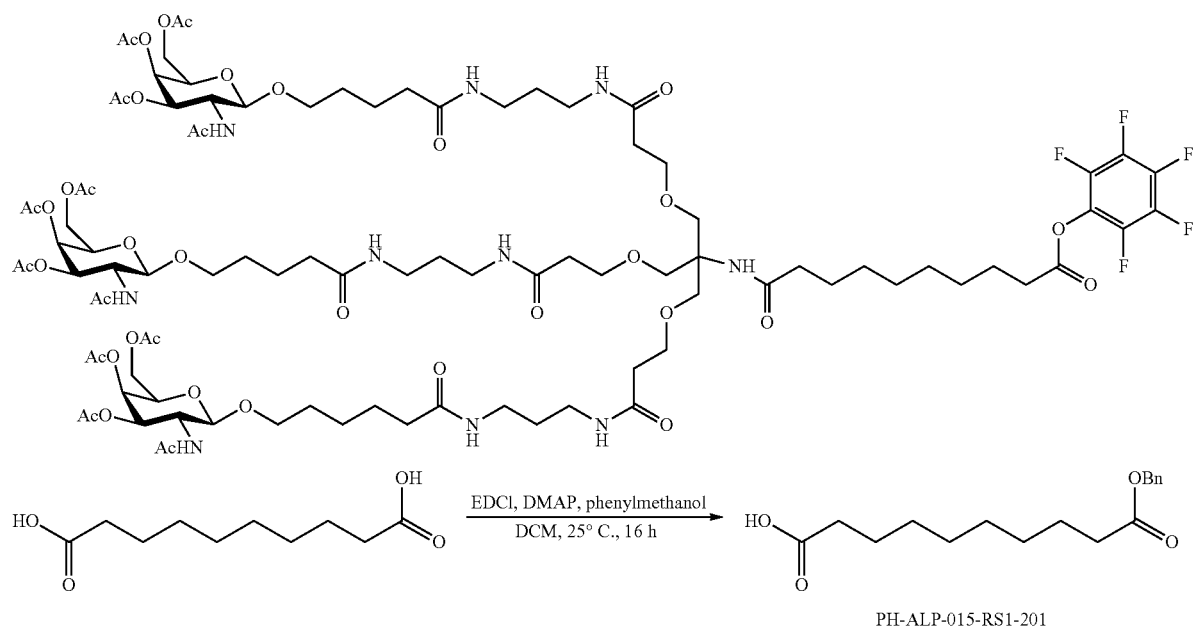
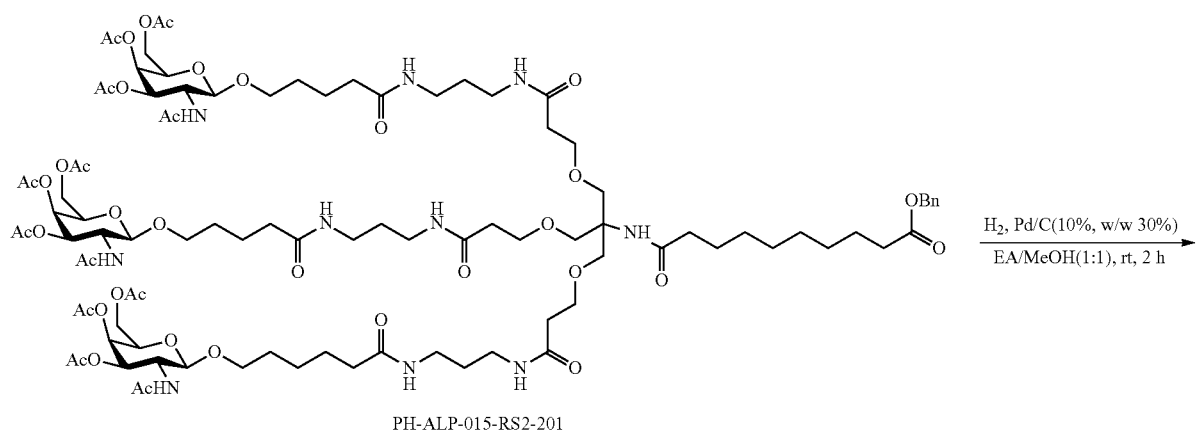
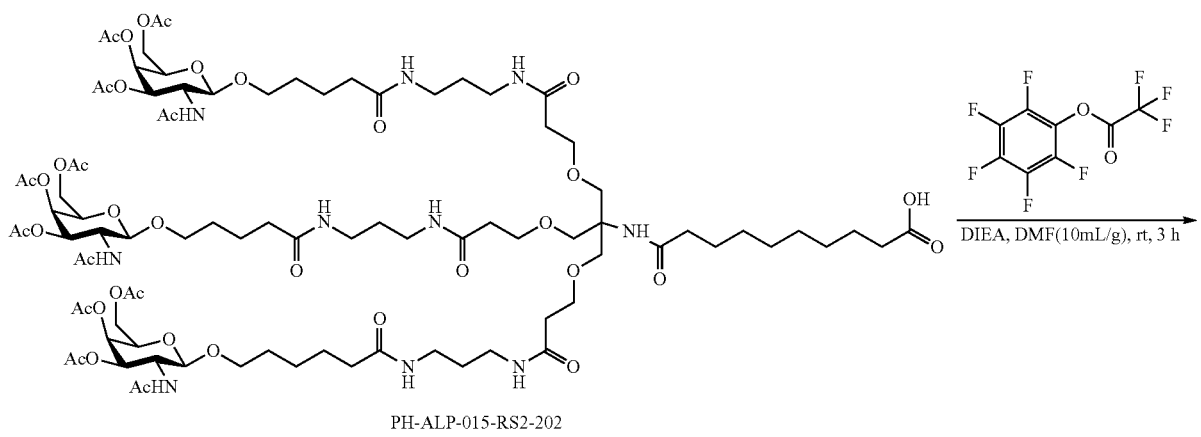

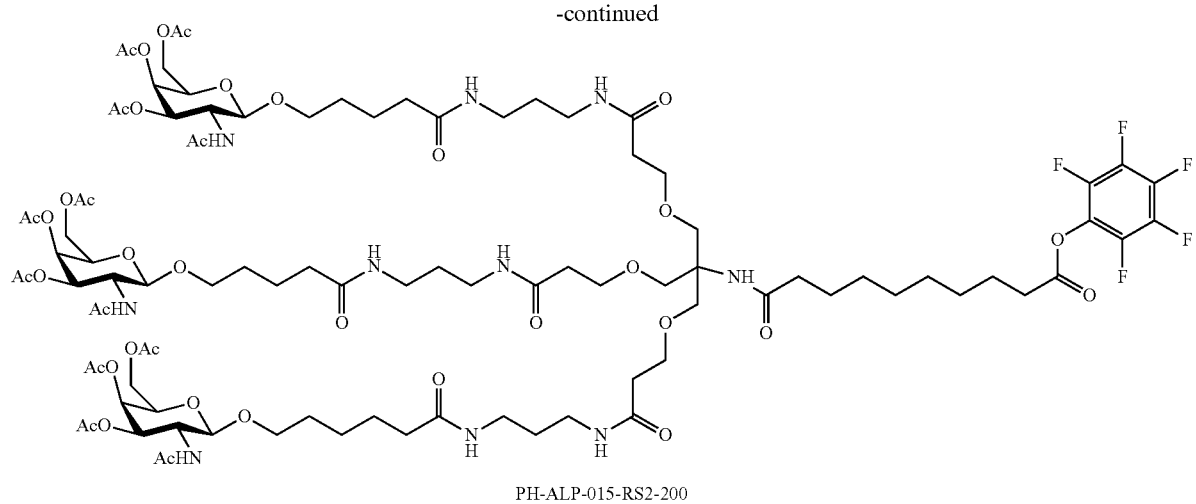

PH-ALP-015-RS2-200

Synthesis of G-8

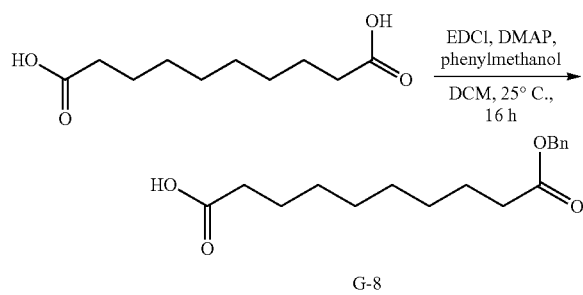

To a solution of decanedioic acid (100 g, 494.4 mmol, 1.00 equiv.) in dichloromethane (2000 mL), was added 4-dimethylaminopyridine (18.1 g, 148.2 mmol, 0.30 equiv.) at room temperature. To this was added N-(3-dimethylaminopropyl)-N'-ethylcarbodiimide hydrochloride (114 g, 594.7 mmol, 1.20 equiv.) at room temperature. The resulting solution was stirred for 1 h at room temperature. To the mixture was added Benzyl alcohol (64.1 g) dropwise with stirring at 0° C. The resulting solution was allowed to react, with stirring, overnight at room temperature. The resulting mixture was washed with saturated aqueous sodium chloride. The mixture was dried over anhydrous sodium sulfate and concentrated under reduced pressure. The crude product (100 g) was purified by Flash-Prep-HPLC. This resulted in 60.7 g (42%) of G-8 as a white solid. MS m/z [M+H]+(ESI): 293.

Synthesis of G-10

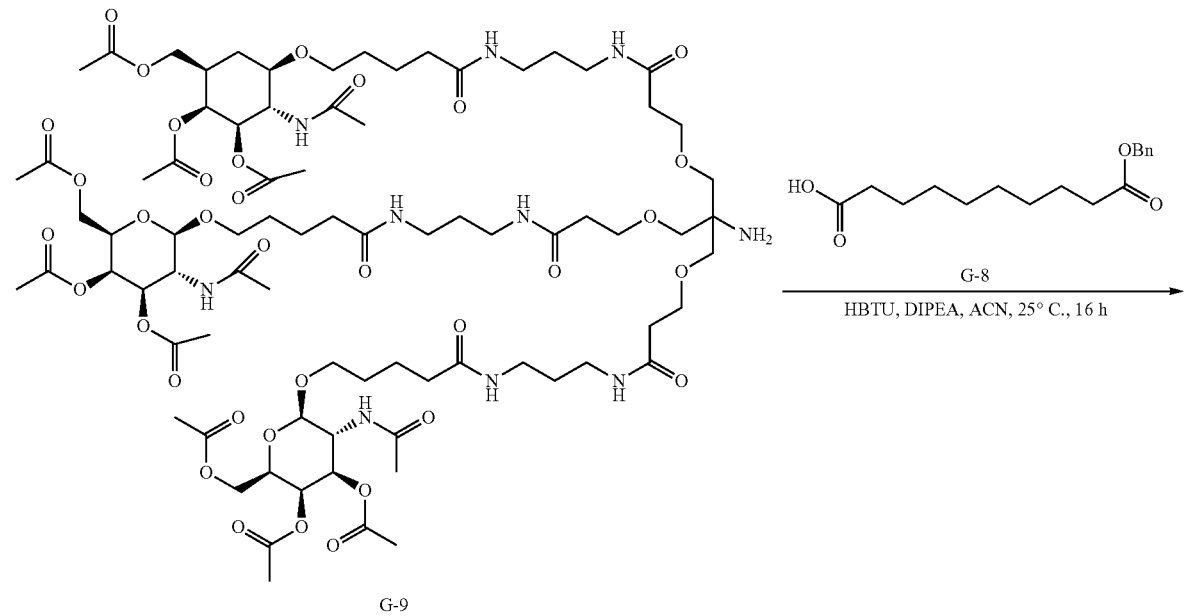

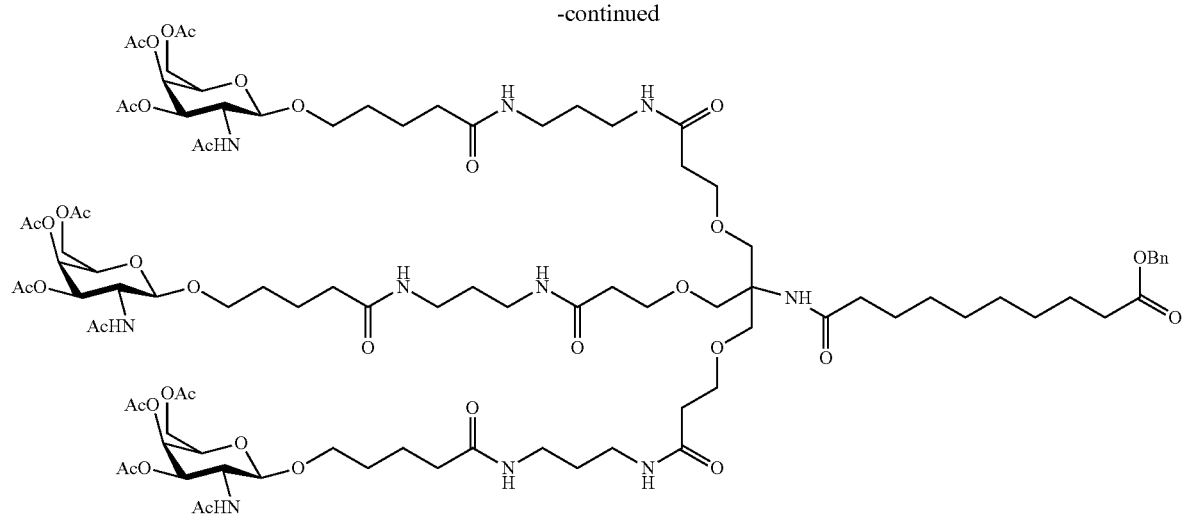

G-10

To a solution of G-8 (4.48 g, 15.32 mmol, 1.50 equiv.) in acetonitrile (320 mL) was added O-Benzotriazole-N,N,N-etramethyl-uronium-hexafluorophosphate (5.84 g, 15.40 mmol, 1.50 equiv.), N,N-Diisopropylethylamine (3.96 g, 30.64 mmol, 3.00 equiv.). The resulting solution was stirred for 1 h at 25° C. This was followed by the addition of G-9 (18.4 g, 10.26 mmol, 1.00 equiv.). The resulting solution was stirred for 16 h at 25° C., and then concentrated under vacuum. The crude product was purified by Flash. This resulted in 12 g (57%) of G-10 as a white solid. H-NMR (DMSO, 400 MHz, ppm): 7.74-7.83 (m, 9H), 7.31-7.37 (m, 5H), 6.97 (s, 1H), 5.21 (d, J=3.3 Hz, 3H), 5.07 (s, 2H), 4.98 (dd, J=11.2 Hz, 3.4 Hz, 3H), 4.49 (d, J=8.4 Hz, 3H), 4.04 (s, 9H), 3.83-3.99 (m, 3H), 3.67-3.72 (m, 3H), 3.52-3.55 (m, 12H), 3.37-3.43 (m, 3H), 2.99-3.05 (m, 12H), 2.25-2.35 (m, 8H), 2.12 (s, 9H), 1.99-2.11 (m, 17H), 1.92 (s, 9H), 1.77 (s, 9H), 1.40-1.53 (m, 22H), 1.19-1.25 (m, 8H).

Synthesis of G-11

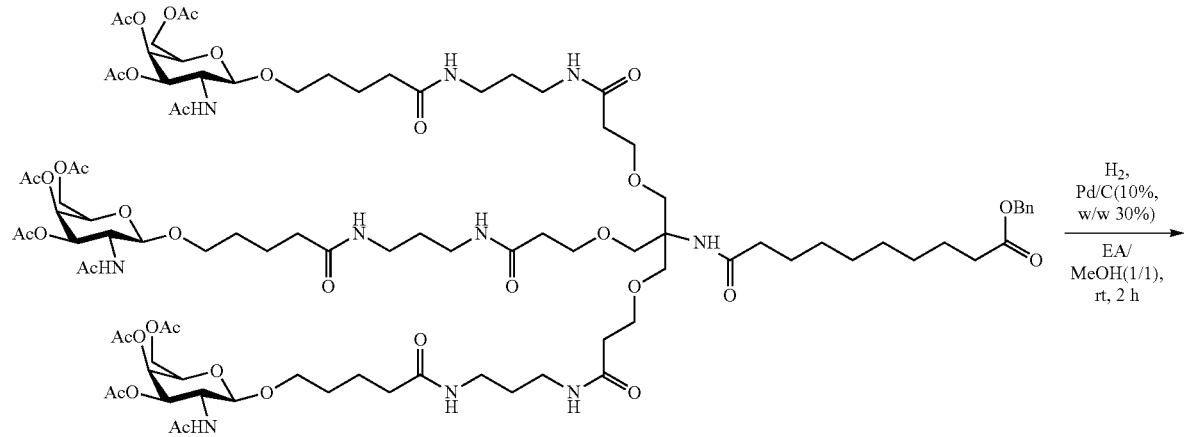

G-10

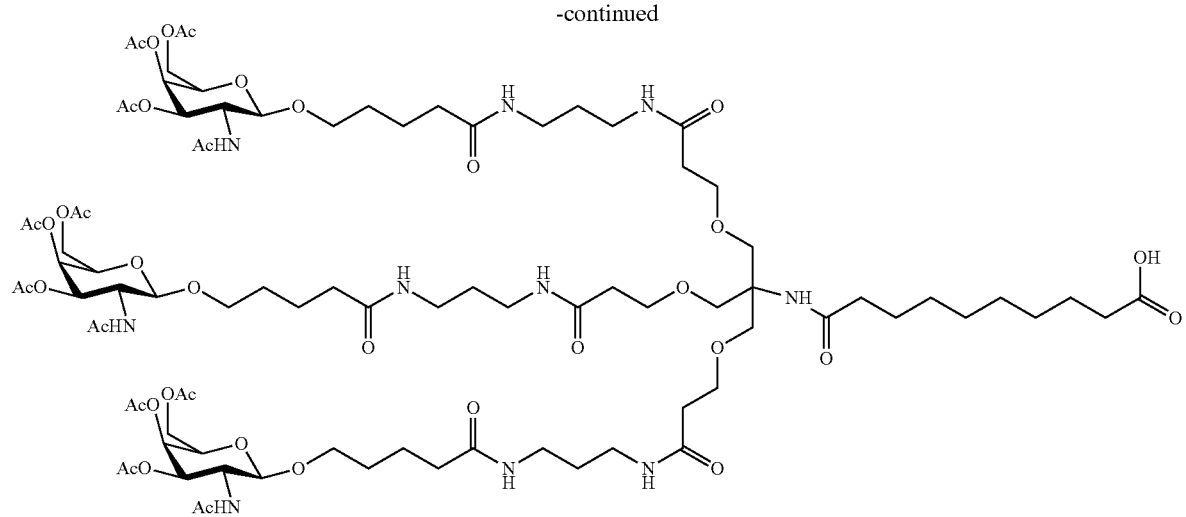

G-11

To a solution of G-10 (5 g, 2.45 mmol, 1.00 equiv.) in methanol/ ethyl acetate (100 mL, v/v=1:1) was added 10% palladium carbon (1.5 g, 10%). The flask was evacuated and flushed five times with hydrogen. The mixture was stirred 2 h at room temperature under an atmosphere of hydrogen. The solids were filtered out. The resulting mixture was concentrated under vacuum. This resulted in 4 g (82%) of G-11 as a white solid.

Synthesis of GalNAc-6

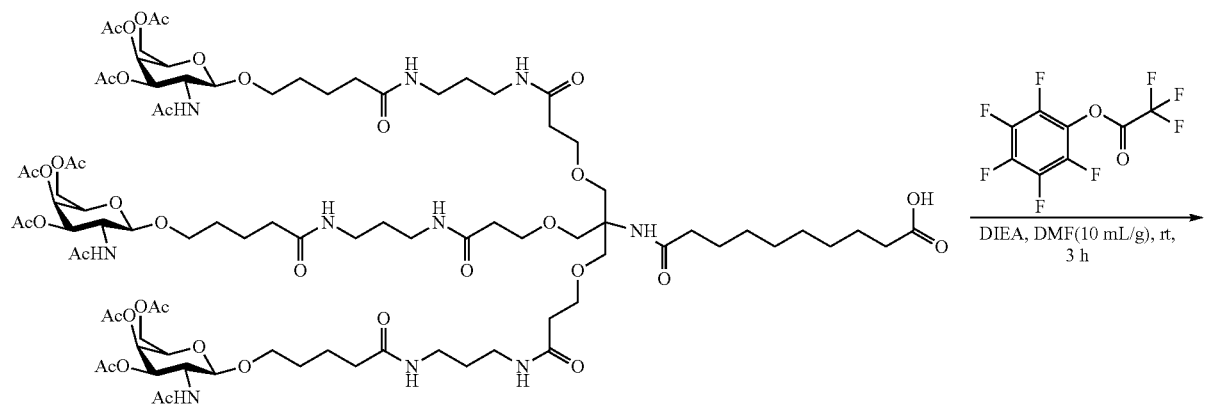

G-11

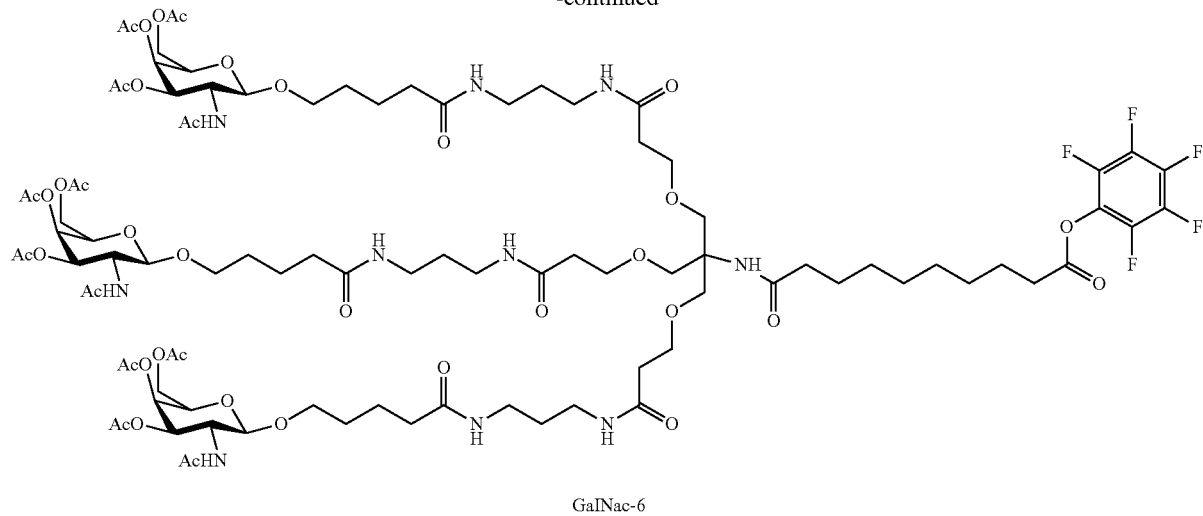

GalNac-6

To a solution of G-11 (6.3 g, 3.18 mmol, 1.00 equiv.) in N,N-dimethylformamide (63 mL) was added N,N-diisopropylethylamine (1.0 g, 7.95 mmol, 2.50 equiv.). This was followed by the addition of pentafluorophenyl 2,2,2-trifluoroacetate (1.33 g, 4.77 mmol, 1.50 equiv.) dropwise with stirring at 0° C. The resulting solution was stirred for 3 h at 25° C. The resulting mixture was concentrated under vacuum. The crude product was purified by Flash with the following conditions: C18 gel column, eluent A water, eluent B acetonitrile; gradient: 20% up to 80% within 15 min, 100% maintained 3 min; Detector, UV 210 nm. This resulted in 5 g (73%) of GalNAc-6 as a white solid. MS m/z [M/2+H]$^+$(ESI): 1073; H-NMR (DMSO, 300 MHz, ppm): 7.71-7.80 (m, 9H), 6.98 (s, 1H), 5.22 (d, J=3.3 Hz, 3H), 4.99 (dd, J=11.1 Hz, 3.3 Hz, 3H), 4.50 (d, J=8.4 Hz, 3H), 4.02 (s, 9H), 3.82-3.92 (m, 3H), 3.69-3.74 (m, 3H), 3.52-3.56 (m, 12H), 3.39-3.44 (m, 3H), 3.03 (s, 12H), 2.75-2.79 (m, 2H), 2.28 (t, J=6.3 Hz, 6H), 2.00-2.10 (m, 26H), 1.89 (s, 9H), 1.77 (s, 9H), 1.64-1.68 (m, 2H), 1.25-1.53 (m, 28H); F-NMR (DMSO, 162 MHz, ppm): -153.60, -153.67, -153.68, -153.69, -158.05, -158.14, -158.22, -162.53, -162.60, -162.62, -162.69, -162.70.

Synthesis of GalNAc-7

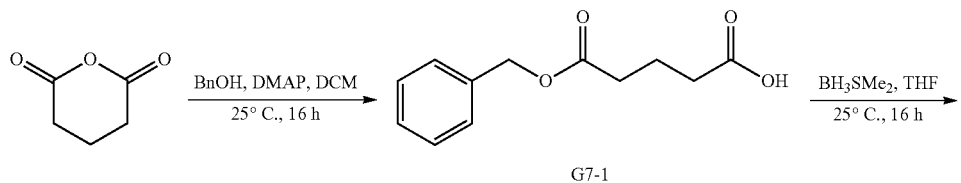

G7-1

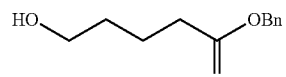

G7-2

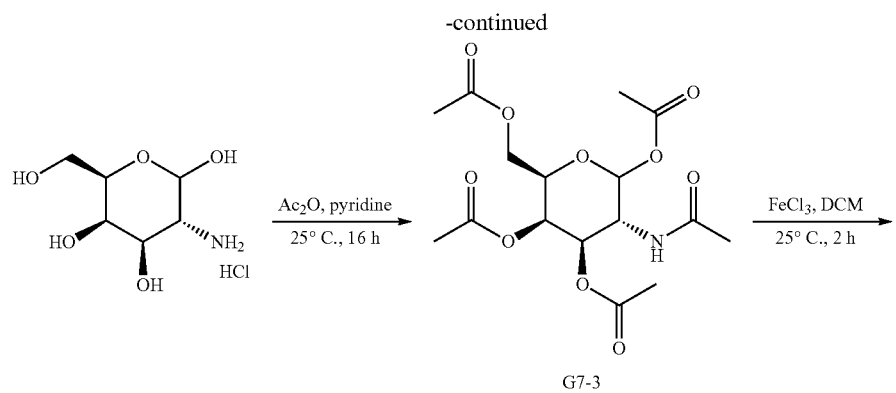
G7-3
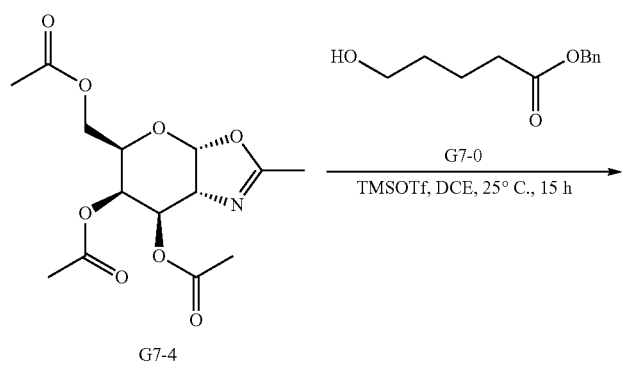
G7-4
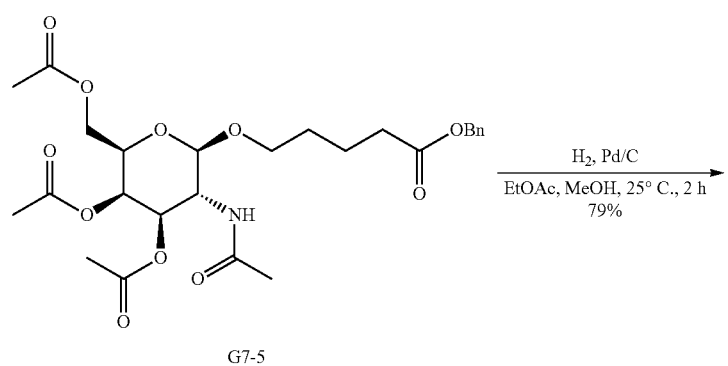
G7-5
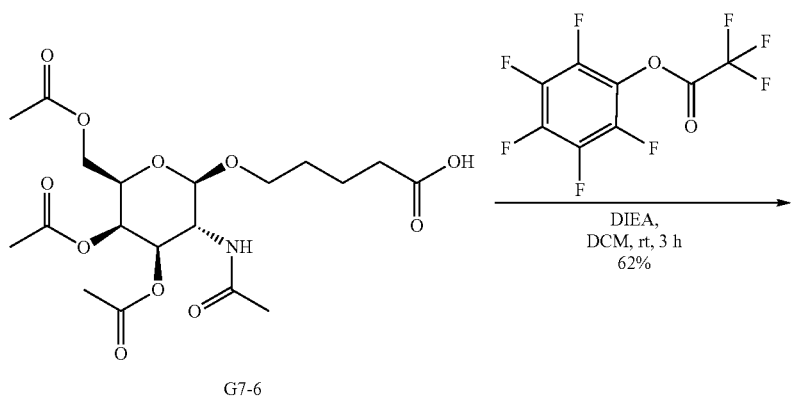
G7-6

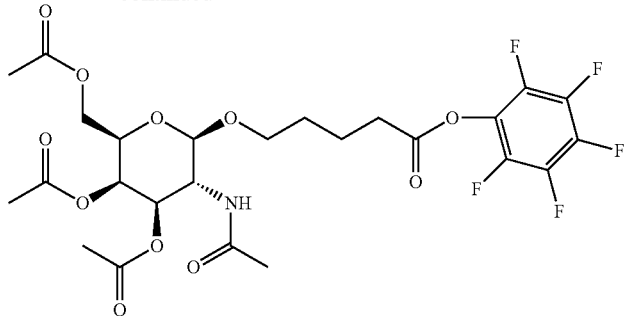

G7-8

Into a 5000-mL 4-necked round-bottom flask purged and maintained with an inert atmosphere of nitrogen, was placed a solution of oxane-2,6-dione (250 g, 2.19 mol, 1.00 equiv.) in dichloromethane (2.5 L), 4-dimethylaminopyridine (11.1 g, 90.91 mmol, 0.05 equiv.). This was followed by the addition of phenylmethanol (225 g, 2.08 mol, 0.95 equiv.) dropwise with stirring. The resulting solution was stirred for 16 h at 25° C. The resulting solution was extracted with saturated aqueous sodium bicarbonate and the aqueous layers were combined. The pH value of the solution was adjusted to 1 with hydrogen chloride (1 mol/L). The resulting solution was extracted with ethyl acetate. The organic layers were combined and dried over sodium sulfate, filtered, and concentrated under vacuum. This resulted in 230 g (47%) of G7-1.

Into a 5-L 3-necked round-bottom flask purged and maintained with an inert atmosphere of nitrogen, was placed a solution of G7-1 (100 g, 449.97 mmol, 1.00 equiv) in tetrahydrofuran (2.0 L). This was followed by the addition of (dimethyl-3-sulfanyl)boranuide (41 g, 539.69 mmol, 1.20 equiv) dropwise with stirring. The resulting solution was stirred for 3 h at 25° C. The reaction was then quenched by the addition of 200 mL of methanol and concentrated under vacuum. The crude product was purified by re-crystallization from hexane. This resulted in 58 g (62%) of G7-2.

Into a 10000-mL 4-round-bottom flask purged and maintained with an inert atmosphere of nitrogen, was placed a solution of (3R,4R,5R,6R)-3-amino-6-(hydroxymethyl) oxane-2,4,5-triol hydrochloride (350 g, 1.62 mol, 1.00 equiv.) in pyridine (3500 ml). This was followed by addition of acetic anhydride (1246 g, 12.2 mol, 7.52 equiv.) drop wise at 25° C. The resulting solution was stirred 16 h at 25° C. The resulting mixture was concentrated under vacuum. The crude product was purified by re-crystallization from water/ice. The solids were collected by filtration. This resulted in 507 g (80%) of G7-3.

Into a 50 L 3-necked round-bottom flask purged and maintained with an inert atmosphere of nitrogen, was placed a solution of G7-3 (220 g, 565 mmol, 1.00 equiv.) in dichloromethane (22 L). This was followed by the addition of ferric chloride (275 g), in portions at 25° C. The resulting solution was stirred for 2 h at 25° C. The reaction was then quenched by the addition of 17 L of water/ice. The resulting solution was washed with water and saturated aqueous sodium chloride. The mixture was dried over anhydrous sodium sulfate, filtered and concentrated under vacuum. This resulted in 121 g (65%) of G7-4.

Into a 2000-mL round-bottom flask purged and maintained with an inert atmosphere of nitrogen, was placed a solution of G7-4 (111 g, 337.1 mmol, 1.00 equiv.) and benzyl 5-hydroxypentanoate (70.2 g, 438.2 mmol, 1.3 equiv.) in 1,2-dichloroethane (1100 mL) and 22 g molecule sieves type 4A. The resulting solution was stirred 30 min at 25° C. This was followed by the addition of trimethylsilyl trifluoromethanesulfonate (22.48 g, 101.12 mmol, 0.3 equiv.) dropwise with stirring in 10 min. The resulting solution was stirred for 15 h at 25° C. The resulting solution was diluted with dichloromethane, washed with water, saturated aqueous sodium bicarbonate and saturated aqueous sodium chloride respectively. The organic layer was dried over anhydrous sodium sulfate, filtered and concentrated under vacuum. The residue was purified by Flash. This resulted in 110 g (57%) of G7-5.

Into a 5000-mL round-bottom flask, was placed a solution of G7-5 (330 g, 614 mmol, 1.00 equiv.) in ethyl acetate (3300 mL), 10% anhydrous palladium carbon (100 g) (30% w/w). The flask was evacuated and flushed five times with hydrogen. The mixture was stirred 3 h at room temperature under an atmosphere of hydrogen. The solids were filtered out and the filtrate was concentrated under vacuum. This resulted in 184 g (67%) of G7-6. MS m/z [M+H]$^+$(ESI): 448; H-NMR (CD3Cl, 300 Hz, ppm): δ 5.99 (d, J=8.7 Hz, 1H), 5.36 (d, J=3.0 Hz, 1H), 5.29 (dd, J=10.6, 3.0 Hz, 1H),4.69 (d, J=8.4 Hz, 1H), 3.91-4.21(m, 5H), 3.51-3.56 (m , 1H), 2.31-2.52 (m, 2H) , 1.91-2.21 (m, 12H), 1.71 (s, 4H).

Into a 100-mL 3-necked round-bottom flask purged and maintained with an inert atmosphere of nitrogen, was placed a solution of G7-6 (5 g, 11.17 mmol, 1.00 equiv.), dichloromethane (50 mL), DIEA (2.17 g, 16.79 mmol, 1.50 equiv.). This was followed by the addition of pentafluorophenyl 2,2,2-trifluoroacetate (4.69 g, 16.75 mmol, 1.50 equiv.) dropwise with stirring at 0° C. The resulting solution was stirred for 3 h at 25° C. The resulting mixture was concentrated under vacuum. The residue was applied onto a silica gel column. This resulted in 4 g (58%) of G7-8. MS m/z [M+H]$^+$(ESI): 614; H-NMR (DMSO, 400 Hz, ppm): δ 7.85 (d, J=9.2 Hz, 1H), 5.23 (d, J=3.2 Hz, 1H), 4.99 (dd, J=11.2, 3.2 Hz, 1H), 4.52 (d, J=8.4 Hz, 1H), 4.04 (s, 3H), 3.87-3.94 (m , 1H), 3.74.3.79 (m, 1H) , 3.45-3.51 (m, 1H), 2.78-2.81 (m, 2H), 2.11 (s, 3H), 2.06 (s, 3H), 1.90 (s, 3H), 1.84 (s, 3H), 1.66-1.77 (m, 4H); F-NMR (DMSO, 400 Hz, ppm): δ-153.61, -153.66, -158.04, -158.16, -162.58, -162.64, -162.71.

Synthesis of GalNAc-9
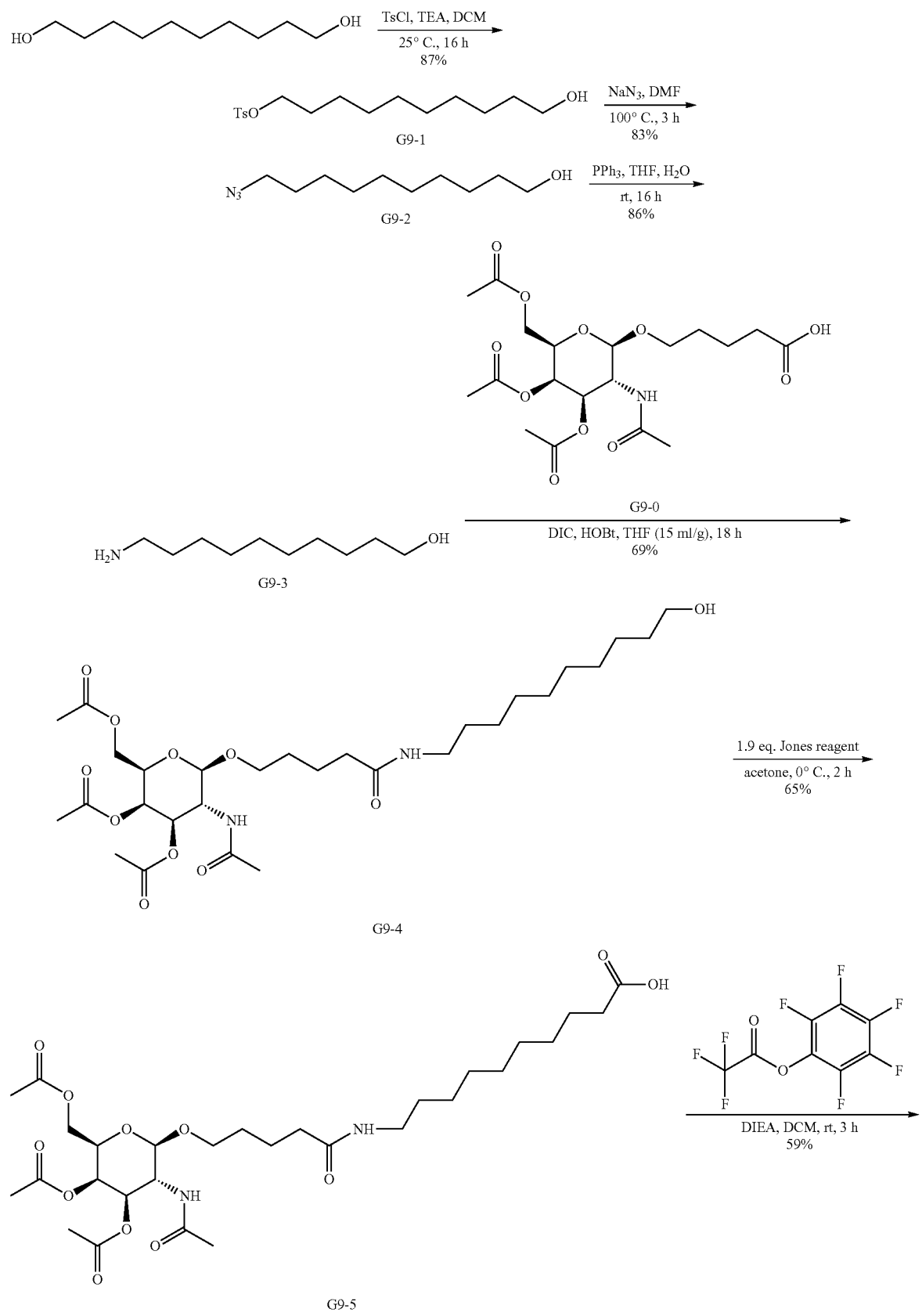

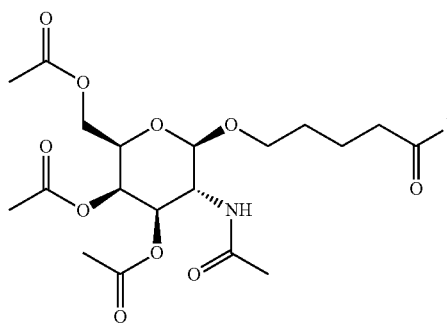

G9-6

To a solution of decane-1,10-diol (125 g, 717.23 mmol, 5.00 equiv.) in dichloromethane/N,N-dimethylformamide (250 mL/250 mL) was added triethylamine (21.8 g, 215.44 mmol, 1.50 equiv.). This was followed by the addition of 4-toluolsulfonyl chloride (27.3 g, 143.19 mmol, 1.00 equiv.) at 25° C. The resulting solution was stirred for 16 h at 25° C. The resulting mixture was concentrated under vacuum and diluted with 500 mL of dichloromethane. The solids were filtered out. The resulting solution washed with 3×500 mL of water and 3×500 mL of saturated sodium chloride. The organic layer was dried over anhydrous sodium sulfate, filtered and concentrated under vacuum. The residue was applied onto a silica gel column. This resulted in 41 g (87%) of G9-1 as colorless oil.

To a solution of G9-1 (32.8 g, 99.86 mmol, 1.00 equiv.) in N,N-dimethylformamide (150 mL) was added sodium azide (13.0 g, 199.97 mmol, 2.00 equiv.). The resulting solution was stirred for 3 h at 90° C. in an oil bath. The solids were filtered out. The resulting solution was diluted with 500 mL of ethyl acetate and washed with 3×500 mL of saturated sodium bicarbonate and 3×500 mL of saturated sodium chloride. The organic layer was dried over anhydrous sodium sulfate, filtered and concentrated under vacuum. The residue was applied onto a silica gel column. This resulted in 18 g (83%) of G9-2 as yellow oil.

To a solution of G9-2 (10 g, 50.18 mmol, 1.00 equiv.) in tetrahydrofuran (100 mL) was added triphenylphosphine (14.4 g, 54.90 mmol, 1.10 equiv.). The resulting solution was stirred for 16 h at 25° C. The resulting mixture was concentrated under vacuum. The resulting solution was diluted with 50 mL of water and washed with 3×50 mL of toluene. The aqueous was concentrated under vacuum and applied onto a silica gel column. This resulted in 8 g (86%) of G9-3 as a light yellow solid.

To a solution of G9-3 (9.9 g, 22.13 mmol, 1.00 equiv.) in tetrahydrofuran (100 mL), 1-hydroxybenzotriazole (3 g, 22.20 mmol, 1.00 equiv.) was added N,N-diisopropylcarbodiimide (5.6 g, 44.37 mmol, 2.00 equiv.). This was followed by the addition of 10-aminodecan-1-ol (5 g, 28.85 mmol, 1.30 equiv.) with stirring at 0° C. The resulting solution was stirred for 16 h at 25° C. The resulting mixture was concentrated under vacuum. The crude product was purified by Flash. This resulted in 9.3 g (69%) of G9-4 as a white solid. MS m/z [M+H]$^+$(ESI): 603, 1H NMR (DMSO, 400 Hz, ppm): δ 7.81 (d, J=9.2 Hz, 1H), 7.69 (t, J=5.6 Hz, 1H), 5.22 (s, 1H), 4.98 (dd, J=11.2 Hz, 3.2 Hz, 1H), 4.49 (d, J=8.4 Hz, 1H), 4.33 (t, J=5.2 Hz, 1H), 4.02 (s, 3H), 3.86-3.88 (m, 1H), 3.69-3.72 (m, 1H), 3.34-3.41 (m, 3H), 2.97-3.02 (m, 2H), 2.11 (s, 3H), 2.00-2.04 (m, 5H), 1.89 (s, 3H), 1.77 (s, 3H), 1.36-1.50 (m, 8H), 1.24 (s, 12H).

To a solution of G9-4 (3 g, 4.98 mmol, 1.00 equiv.) in acetone (30 mL) was added Jones reagent (3.6 mL, 1.87 equiv.) dropwise with stirring at 0° C. The resulting solution was stirred for 2 h at 0° C. The pH value of the solution was adjusted to 6 with saturated aqueous sodium bicarbonate. The solids were filtered out and the filtrate was washed 3×500 mL of saturated sodium chloride. The organic layer was dried over anhydrous sodium sulfate, filtered and concentrated under vacuum. The crude product was purified by Flash. This resulted in 2 g (65%) of G9-5 as a white solid.

To a solution of G9-5 (4 g, 6.49 mmol, 1.00 equiv.) in dichloromethane (40 mL), N,N-diisopropylethylamine (2.1 g, 16.25 mmol, 2.00 equiv.) was added pentafluorophenyl 2,2,2-trifluoroacetate (2.73 g, 9.75 mmol, 1.50 equiv.) dropwise with stirring at 0° C. The resulting solution was stirred for 3 h at 25° C. The resulting mixture was concentrated under vacuum. The crude product was purified by Flash. This resulted in 3 g (59%) of G9-6 as a white solid. MS m/z [M+H]$^+$(ESI): 783. 1H NMR (DMSO, 400 Hz, ppm) δ 7.81 (d, J=9.2 Hz, 1H), 7.68 (t, J=5.6 Hz, 1H), 5.21 (s, 1H), 4.98 (dd, J=11.2 Hz, 3.2 Hz, 1H), 4.49 (d, J=8.8 Hz, 1H), 4.02 (s, 3H), 3.83-3.90 (m, 1H), 3.67-3.73 (m, 1H), 3.37-3.43 (m, 1H), 2.97-3.02 (m, 2H), 2.75-2.79 (m, 2H), 2.10 (s, 3H), 1.99-2.04 (m, 5H), 1.89 (s, 3H), 1.77 (s, 3H), 1.62-1.69 (m, 2H), 1.25-1.50 (m, 16H); F NMR (DMSO, 400 Hz, ppm): δ-153.65, -153.66, -153.71, -158.09, -158.15, -158.21, -162.58, -162.63, -162.64, -162.70, -162.71.

Synthesis of GalNAc-10
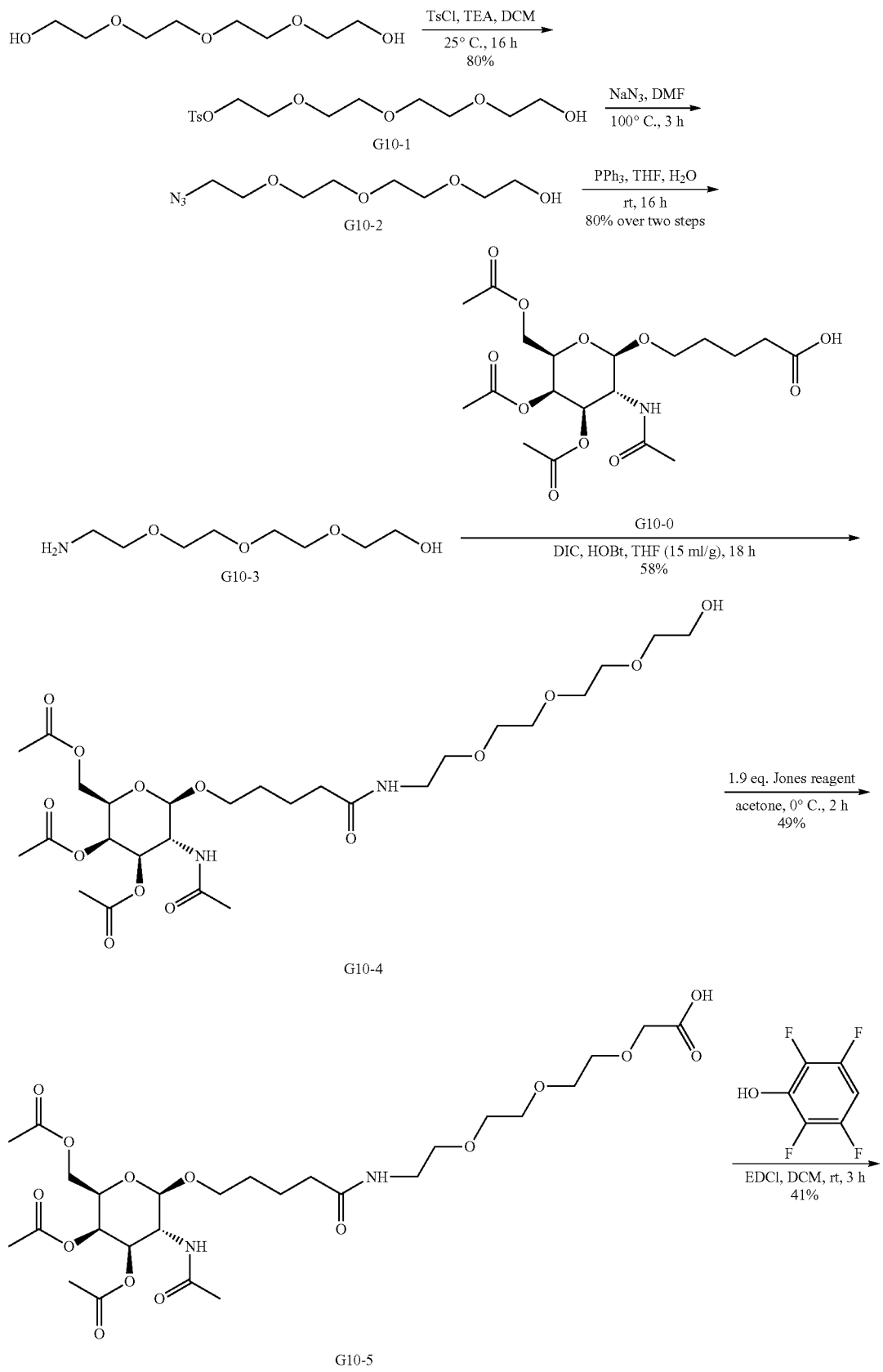

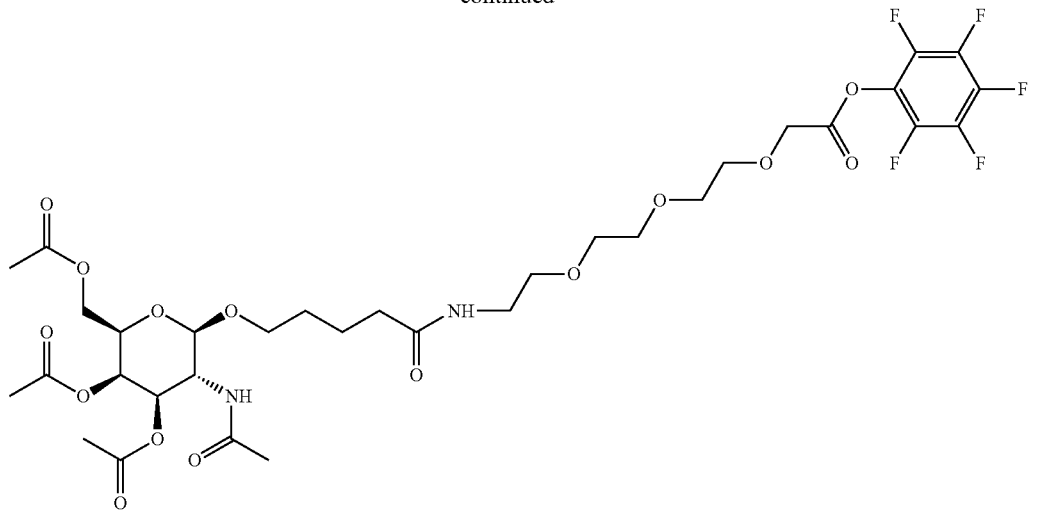

G10-6

To a solution of 2-[2-[2-(2-hydroxyethoxy)ethoxy]ethoxy]ethan-1-ol (194 g, 998.84 mmol, 10.00 equiv.) in dichloromethane (120 mL) was added triethylamine (15.15 g, 149.72 mmol, 1.50 equiv.). This was followed by the addition of 4-toluolsulfonyl chloride (19.1 g, 100.18 mmol, 1.00 equiv.) at 25° C. The resulting solution was stirred overnight at 16° C. The resulting solution was diluted with 100 mL of water. The resulting solution was extracted with 3×200 mL of dichloromethane and the organic layers were combined. The resulting mixture was washed with 3×100 mL of 5% aqueous citric acid. The organic layer was dried over sodium sulfate, filtered, and concentrated under vacuum. The residue was applied onto a silica gel column. This resulted in 35 g (93%) of G10-1 as a white solid.

To a solution of G10-1 (34.8 g, 99.88 mmol, 1.00 equiv.) in N,N-dimethylformamide (180 mL) was added sodium azide (13.0 g, 199.97 mmol, 2.00 equiv.). The resulting solution was stirred for 3 h at 90° C. in an oil bath. The solids were filtered out. The resulting solution was diluted with 500 mL of ethyl acetate and washed with 3×500 mL of saturated sodium bicarbonate and 3×500 mL of saturated sodium chloride. The organic layer was dried over anhydrous sodium sulfate, filtered and concentrated under vacuum. The residue was applied onto a silica gel column. This resulted in 17 g (71%) of G10-2 as light yellow oil.

To a solution of G10-2 (2.2 g, 10.03 mmol, 1.00 equiv.) in tetrahydrofuran (20 mL) was added triphenylphosphine (2.88 g, 10.98 mmol, 1.10 equiv.). The resulting solution was stirred for 12 h at 25° C. The resulting solution was diluted with 50 mL of water and washed with 3×50 mL of toluene. The aqueous was concentrated under vacuum. This resulted in 1.7 g (81%) of G10-3 as light yellow oil.

To a solution of G10-3 (10 g, 22.35 mmol, 1.00 equiv.) in tetrahydrofuran (100 mL) was added 1-hydroxybenzotriazole (3 g, 22.20 mmol, 1.00 equiv.), N,N-diisopropylcarbodiimide (5.62 g, 44.53 mmol, 2.00 equiv.). This was followed by the addition of 2-[2-[2-(2-aminoethoxy)ethoxy]ethoxy]ethan-1-ol (5.6 g, 28.98 mmol, 1.30 equiv.) with stirring at 0° C. The resulting solution was stirred for 16 h at 25° C. The resulting mixture was concentrated under vacuum. The residue was applied onto a silica gel column. The crude product was purified by Flash. This resulted in 8 g (58%) of G10-4 as light yellow oil. MS m/z [M+H]+(ESI): 623., 1H NMR (DMSO, 400 Hz, ppm): δ 7.82 (d, J=4.4 Hz, 2H), 5.22 (s, 1H), 4.98 (dd, J=11.2 Hz, 3.6 Hz, 1H), 4.58 (t, J=5.2 Hz, 1H), 4.49 (d, J=8.4 Hz, 1H), 4.01 (s, 3H), 3.83-3.91 (m, 1H), 3.67-3.73 (m, 1H), 3.48-3.51 (m, 10H), 3.37-3.42 (m, 5H), 3.19-3.20 (m, 2H), 2.11 (s, 3H), 2.08-2.10 (m, 2H), 2.08 (s, 3H), 1.89 (s, 3H), 1.77 (s, 3H), 1.40-1.60 (m, 4H).

To a solution of G10-4 (6 g, 9.64 mmol, 1.00 equiv.) in acetone (60 mL) was added Jones reagent (6.7 mL) dropwise with stirring at 0° C. The resulting solution was stirred for 3 h at 0° C. The pH value of the solution was adjusted to 5 with saturated aqueous solution of sodium bicarbonate. The solids were filtered out and the filtrate was washed 3×500 mL of saturated sodium chloride. The organic layer was dried over anhydrous sodium sulfate, filtered and concentrated under vacuum. The crude product was purified by Flash. This resulted in 3 g (49%) of G10-5 as a solid.

To a solution of G10-5 (1 g, 1.57 mmol, 1.00 equiv.) in dichloromethane (10 mL), 1-(3-Dimethylaminopropyl)-3-ethylcarbodiimide hydrochloride (360 mg, 1.88 mmol, 1.20 equiv.), 2,3,5,6-tetrafluorophenol (310 mg, 1.87 mmol, 1.20 equiv.). The resulting solution was stirred for 3 h at 25° C. The resulting mixture was concentrated under vacuum. The crude product was purified by Flash. The resulting solution was extracted chloroform and the organic layers were combined. The organic layer was dried over sodium sulfate, filtered, and concentrated under vacuum. This resulted in 0.5 g (41%) and other batches product were combined to furnish 5.0422 g of G10-6 as light yellow oil. MS m/z [M+H]+(ESI): 785., 1H NMR (CD3CN, 400 Hz, ppm): δ 7.30-7.40 (m, 1H), 6.48-6.60 (m, 2H), 5.30 (s, 1H), 5.04 (dd, J=11.2 Hz, 3.6 Hz, 1H), 4.52-4.59 (m, 3H), 4.08-4.13 (m, 2H), 3.95-3.99 (m, 2H), 3.76-3.78 (m, 3H), 3.60-3.67 (m, 6H), 3.48-3.59 (m, 3H), 3.30-3.48 (m, 2H), 2.14-2.16 (m, 5H), 2.12 (s, 3H), 1.93 (s, 3H), 1.88 (s, 3H), 1.50-1.60 (m, 4H). F NMR (CD3CN, 400 Hz, ppm): 6 -140.76, -140.79, -140.82, -140.84, -154.52, -154.54, -154.57, -154.60.

Synthesis of GalNAc-11
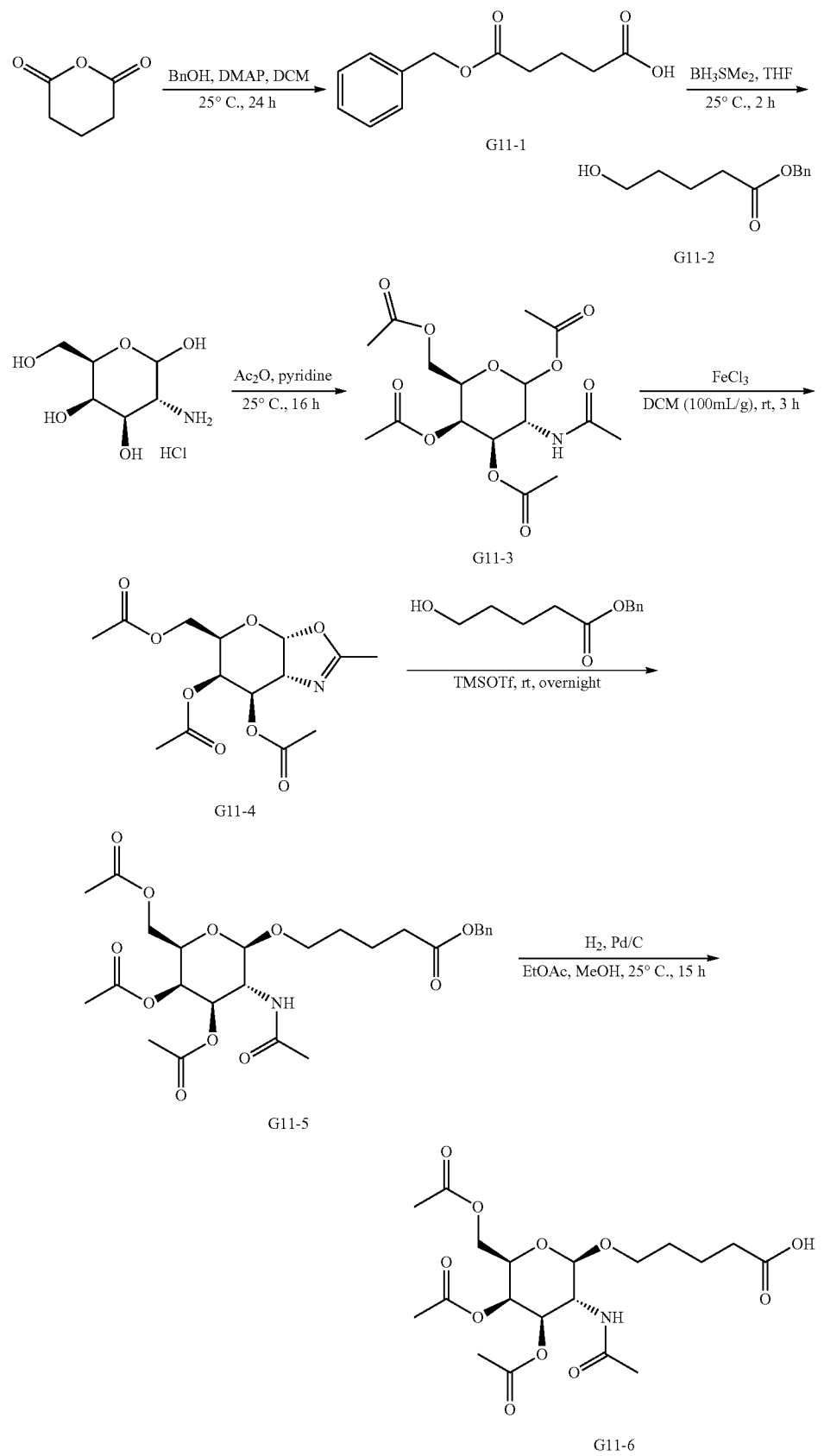

-continued
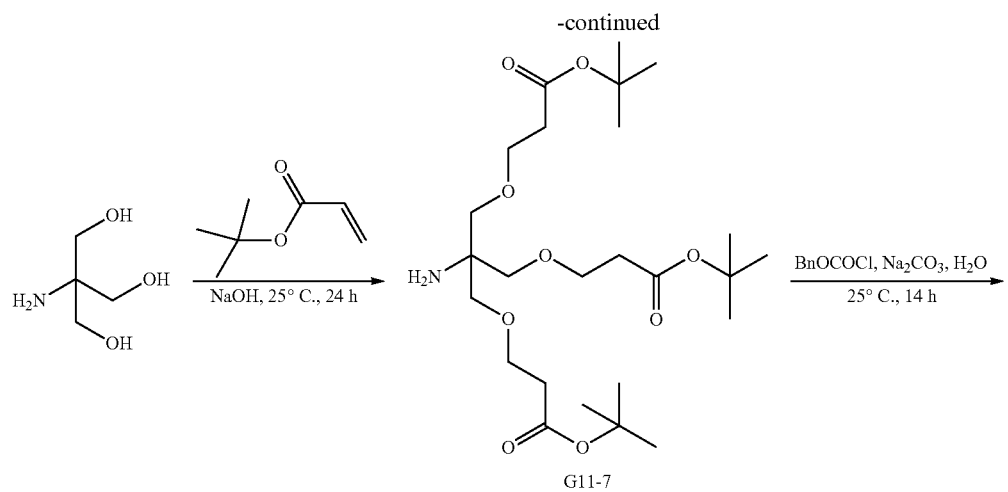
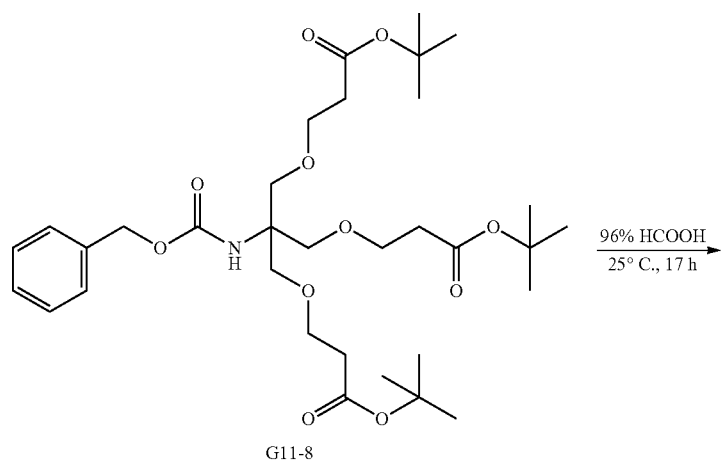
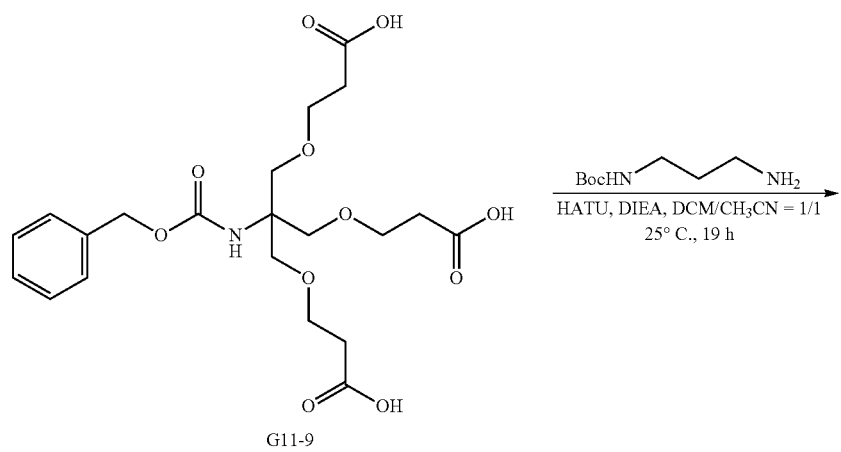

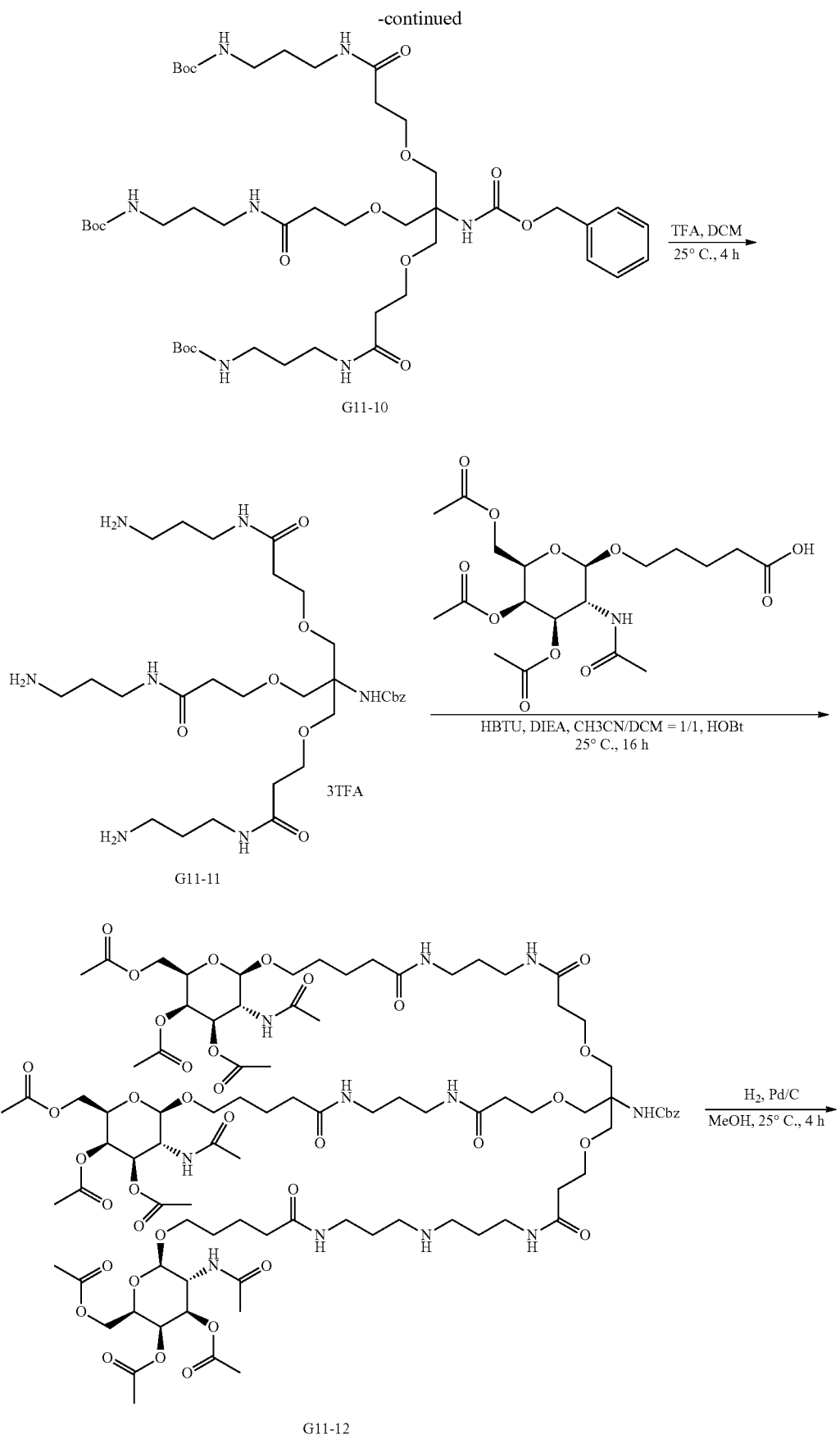

-continued
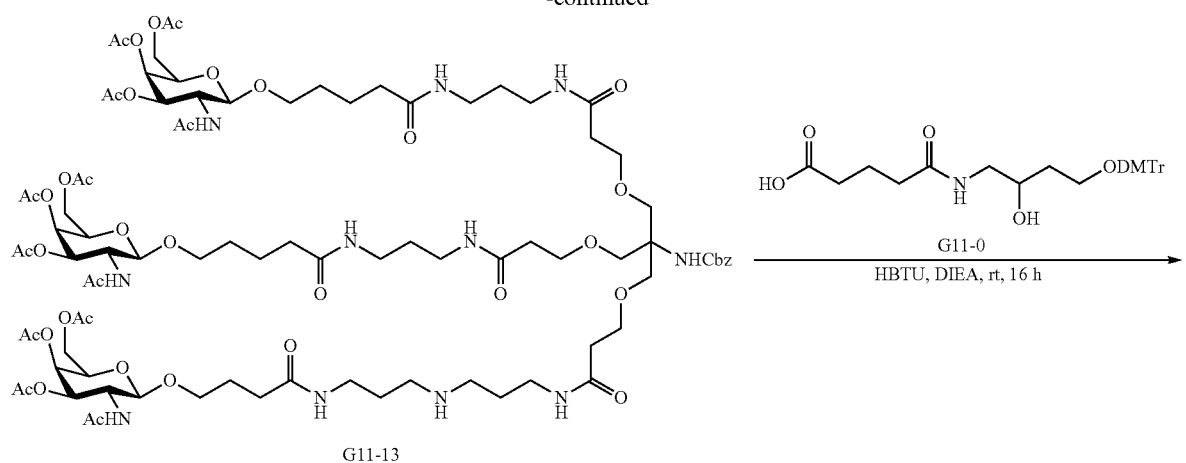
G11-13
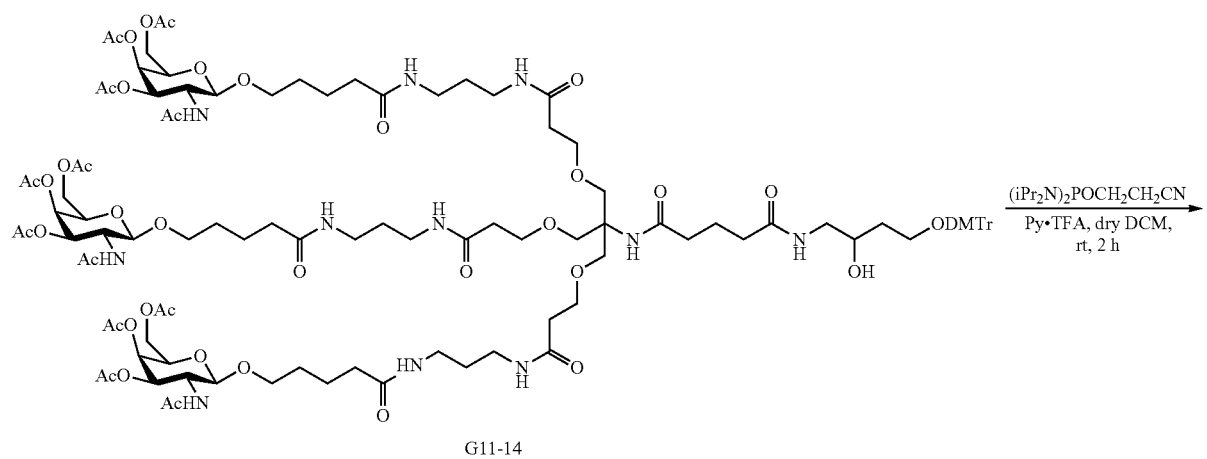
G11-14
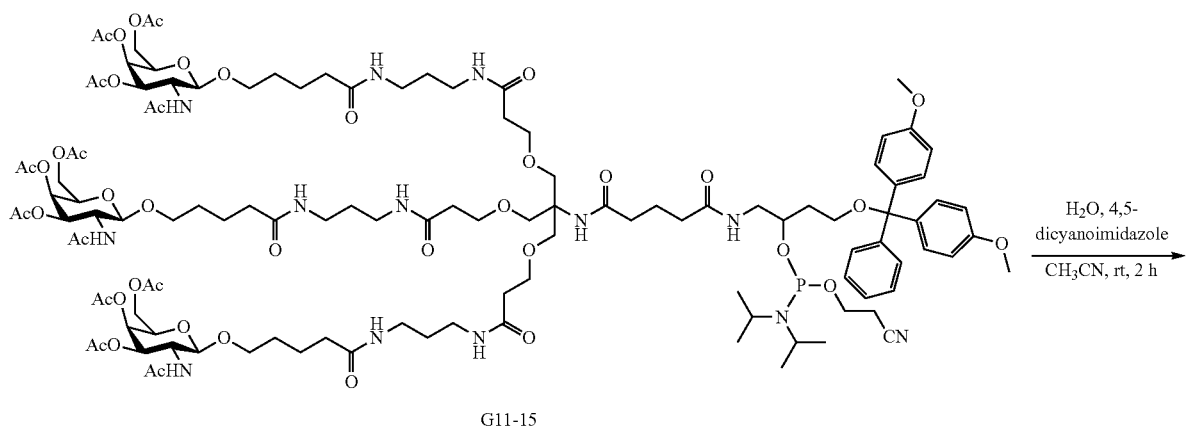
G11-15

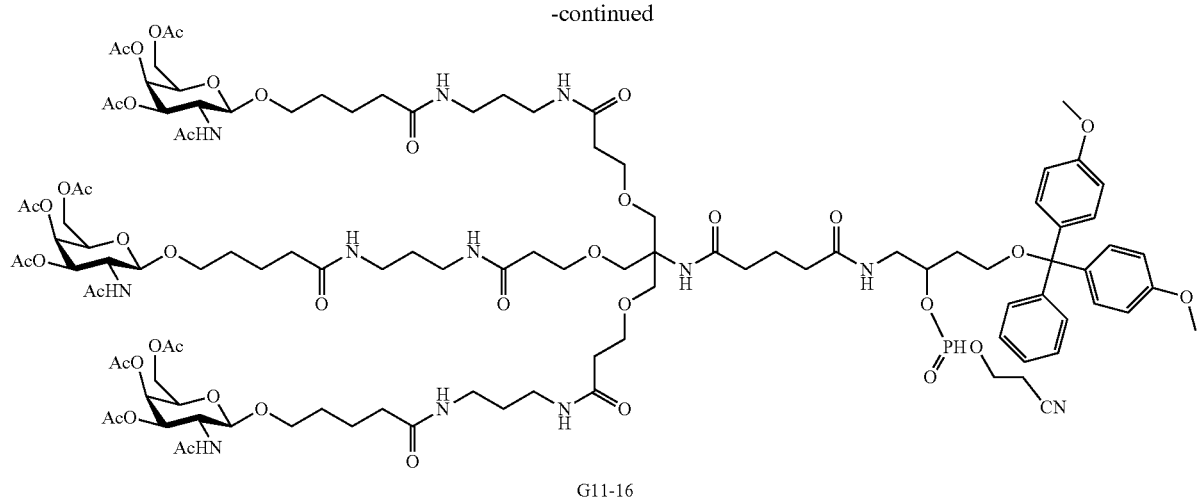

G11-16

To a solution of oxane-2, 6-dione (1000 g, 8.76 mol, 1.00 equiv), 4-dimethylaminopyridine (53.5 g, 437.9 mmol, 0.05 equiv) in dichloromethane (10000 mL) with an inert atmosphere of nitrogen was added phenylmethanol (900 g, 8.32 mol, 0.95 equiv) dropwise with stirring at room temperature. The resulting solution was stirred overnight at room temperature. The resulting mixture was washed with saturated sodium bicarbonate solution. The pH value of the aqueous layers was adjusted to 1 with 10% hydrochloric acid. The resulting solution was extracted with ethyl acetate and the organic layers combined. The resulting mixture was washed with saturated sodium chloride. The organic layer was dried over anhydrous sodium sulfate, filtered, and concentrated under reduced pressure. This resulted in 1240 g (64%) of G11-1 as colorless oil. MS m/z [M+H]+(ESI): 223.

To a solution of G11-1 (500 g, 2.24 mol, 1.00 equiv) in tetrahydrofuran (4000 mL) was added Borane-methyl sulfide complex (270 mL, 1.20 equiv) dropwise with stirring at 0° C. The resulting solution was stirred for 2 h at room temperature. The reaction was then quenched by the addition 200 mL of methanol. The resulting mixture was concentrated under reduced pressure. The residue was applied onto a silica gel column. This resulted in 312 g (67%) of G11-2 as yellow oil. MS m/z [M+H]+(ESI): 209.

To a solution of (3R, 4R, 5R, 6R)-2, 4, 5-trihydroxy-6-(hydroxymethyl) oxan-3-aminium chloride (1000 g, 4.63 mol, 1.00 equiv) in pyridine (10000 mL) was added acetic anhydride (3560 g, 34.9 mol, 7.50 equiv) at room temperature. The resulting solution was stirred overnight at room temperature. The resulting mixture was concentrated under reduced pressure. The crude product was purified by re-crystallization from ice/water. This resulted in 1450 g (80%) of G11-3 as a white solid. MS m/z [M+H]+(ESI): 390.

To a solution of G11-3 (100 g, 256.84 mmol, 1.00 equiv) in dichloromethane (10 L) with an inert atmosphere of nitrogen was added ferric trichloride (125 g, 771.60 mmol, 3.00 equiv) at room temperature. The resulting solution was stirred for 3 h at room temperature. The resulting mixture was washed with water and saturated sodium chloride. The organic layer was dried over anhydrous sodium sulfate, filtered, and concentrated under reduced pressure. This resulted in 52 g (61%) of G11-4 as brown oil. The product was used in the next step directly without further purification.

To a solution of G11-4 (52 g, 157.91 mmol, 1.00 equiv), benzyl 5-hydroxypentanoate (42.7 g, 205.04 mmol, 1.30 equiv) in 1, 2-dichloroethane (500 mL) with an inert atmosphere of nitrogen was added trimethylsilyl trifluoromethanesulfonate (10.5 g, 47.24 mmol, 0.30 equiv) dropwise with stirring at 0° C. The resulting solution was stirred for 1 h at room temperature. The reaction was quenched by the addition of ice/water. The resulting solution was extracted with dichloromethane and the organic layers combined. The resulting mixture was washed with water and saturated sodium chloride. The organic layer was dried over anhydrous sodium sulfate, filtered, and concentrated under reduced pressure. The residue was applied onto a silica gel column. The crude product was purified by Flash-Prep-HPLC. This resulted in 46.4 g (55%) of G11-5 as light yellow oil. MS m/z [M+H]+(ESI): 538.

To a solution of G11-5 (10 g, 18.60 mmol, 1.00 equiv) in ethyl acetate (100 mL), was added 10% Palladium on activated carbon (1 g). The flask was evacuated and flushed five times with hydrogen. The resulting solution was stirred for 3 h at room temperature. The solid was filtered out and washed with methanol and dried under high vacuum overnight. This resulted in 6.82 g (82%) of G11-6 as a white solid.

To a solution of 2-amino-2-(hydroxymethyl) propane-1, 3-diol (300 g, 2.48 mol, 1.00 equiv) in DMSO (500 mL) with an inert atmosphere of nitrogen at 15° C. was added 5.0 M sodium hydroxide (49.5 mL, 0.248mo1, 0.1 eq.). This was followed by the addition of tert-butyl acrylate (1079 g, 8.4mo1, 3.4 eq.) dropwise with stirring. The resulting solution was stirred for 24 h at 25° C. The resulting solution was extracted with 4×3000 mL of ethyl acetate and the organic layers were combined. The resulting mixture was washed with water and saturated sodium chloride. The organic layer was dried over anhydrous sodium sulfate, filtered, and concentrated under reduced pressure. The residue was applied onto a silica gel column. This resulted in 526 g (42%) of G11-7 as light yellow oil. MS m/z [M+H]+(ESI): 506.6.

To a solution of G11-7 (50 g, 99.0 mmol, 1.00 equiv.) in CH$_2$Cl$_2$ (750 mL) was added 365 mL of 25% aqueous Na$_2$CO$_3$ was added while stirring. This was followed by the addition of benzyl chloroformate (50.5 g, 0.297 mol, 3.00 equiv.) dropwise with stirring at room temperature. The resulting solution was stirred overnight at room temperature.

The resulting solution was extracted with dichloromethane and the organic layers were combined. The organic layer was washed with saturated aqueous sodium chloride, dried over anhydrous sodium sulfate, filtered, concentrated under reduced pressure. The residue was applied onto a silica gel column. This resulted in 42.4 g (67%) of G11-8 as light yellow oil. MS m/z [M+H]+(ESI): 640.4.

To a solution of G11-8 (300 g, 468.9 mmol, 1.00 equiv) was added formicacid (3 L, 96%). The resulting solution was stirred 16 h at 25° C. The reaction mixture was concentrated under reduced pressure. The pH value of the solution was adjusted to 12 with sodium hydroxide (1 mol/L). The resulting solution was extracted with 3×6 L of ether and the aqueous layers combined. Hydrogen chloride (2 mol/L) was employed to adjust the pH of the aqueous layers to 4. The resulting solution was extracted with 4 ethyl acetate. The organic layers combined and dried over anhydrous sodium sulfate, filtered and concentrated under reduced pressure. This resulted in 198.96 g (90%) of G11-9 as yellow oil. MS m/z [M+H]+(ESI): 472.

To a solution of G11-9 (264 g, 560.51 mmol, 1.00 equiv) in dichlolomethane/acetonitrile (1400 mL/1400 mL) was added N,N-diisopropylethylamine (578.4 g, 4.484 mol, 8 equiv), O-benzotriazole-N,N,N-etramethyl-uronium-hexafluorophosphate (848 g, 2.231 mol, 4.00 equiv) in order. The resulting solution was stirred for 30 min at 25° C. This was followed by the addition of tert-butyl N-(3-aminopropyl) carbamate (390 g, 2.238 mol, 4.00 equiv) at 25° C. The resulting solution was stirred for 6 h at 25° C. The resulting solution was concentrated under reduced pressure. The residue was diluted with 3000 mL of dichloromethane. The organic layer was washed with saturated sodium bicarbonate solution, saturated ammonium chloride and saturated sodium chloride respectively. The organic layer was dried over anhydrous sodium sulfate, filtered, and concentrated under reduced pressure. The residue was applied onto a silica gel column. This resulted in 336 g (70%) of G11-10 as white foam. MS m/z [M+H]+(ESI): 941.

To a solution of G11-10 (350 g, 372.3 mmol, 1.00 equiv) in dichloromethane (1.4 L) was added trifluoroacetic acid (350 mL). The resulting solution was stirred for 4 h at 25° C. The resulting mixture was concentrated under reduced pressure. This resulted in 470 g (crude) of G11-11 as red oil. MS m/z [M+H]+(ESI): 641.

To a solution of G11-6 (66 g, 147.51 mmol, 3.50 equiv) and N,N-diisopropylethylamine (37 g, 286.29 mmol, 6.78 equiv) in dichlolomethane/acetonitrile (200mL/200mL) with an inert atmosphere of nitrogen was added 1-Hydroxybenzotrizole (24.5 g, 181.48 mmol, 4.30 equiv) and O-Benzotriazole-N,N,N-etramethyl-uronium-hexafluorophosphate (56 g, 147.66 mmol, 3.50 equiv) at room temperature. The resulting solution was stirred for 30 min at room temperature. This was followed by the addition of benzyl G11-11 (41.4 g, 42.20 mmol, 1.00 equiv) at room temperature. The resulting solution was allowed to react, with stirring, overnight at room temperature. The resulting mixture was concentrated under reduced pressure. The resulting solution was diluted with dichloromethane. The resulting mixture was washed with saturated sodium bicarbonate and saturated sodium chloride respectively. The organic layer was dried over anhydrous sodium sulfate, filtered, and concentrated under reduced pressure. The crude was purified by Flash-Prep-HPLC. This resulted in 41.2 g (51%) of G11-12 as a light yellow solid. MS m/z [M/2+H]+(ESI): 965.

To a solution of G11-12 (20 g, 10.37 mmol, 1.00 equiv) in methanol (200 mL), was added 10% Palladium on activated carbon (2 g) at room temperature. The flask was evacuated and flushed five times with hydrogen. The resulting solution was stirred for 4 h at room temperature. The solids were filtered out. The resulting mixture was concentrated under reduced pressure. This resulted in 16.5 g (89%) of G11-13 as a white solid. MS m/z [M/2+H]+(ESI): 898.

To a solution of G11-0 (12.8 g, 24.57 mmol, 1.00 equiv) in N,N-dimethylformamide (500 mL) was added N,N-diisopropylethylamine (9.0 g, 69.64 mmol, 3.00 equiv), O-Benzotriazole-N,N,N-etramethyl-uronium-hexafluorophosphate (9.9 g, 27.03 mmol, 1.10 equiv). The resulting solution was stirred for 2 h at room temperature. Then G11-13 (44 g, 24.57 mmol, 1.00 equiv) was added. The resulting solution was stirred for 16 h at room temperature. The resulting mixture was concentrated under reduced pressure. The crude product was purified by Flash-Prep-HPLC. This resulted in 22 g (41%) of G11-14 as a light yellow solid. MS m/z [M−H]−(ESI): 2295. H-NMR (DMSO, 400 MHz): 7.79-7.83 (m, 6H), 7.70-7.73(m, 4H), 7.33-7.35(m, 2H), 7.26-7.30(m, 2H), 7.19-7.22(m, 5H), 7.01(s, 1H), 6.84-6.87(m, 4H), 5.19-5.20(d, J=4.0 Hz, 3H), 4.93-4.97(m, 3H), 4.58-4.59(d, J=4.0 Hz, 1H), 4.46-4.48(d, J=8.0 Hz, 3H), 3.95-4.04(m, 9H), 3.82-3.89(m, 3H), 3.67-3.71(m, 9H), 3.45-3.61(m, 12H), 3.36-3.41(m, 3H), 2.94-3.09(m, 16H), 2.24-2.27(m, 6H), 2.00-2.08(m, 29H), 1.87(s, 9H), 1.75(s, 9H), 1.63-1.69(m, 3H), 1.41-1.51(m, 19H).

To a solution of G11-14 (2 g, 0.87 mmol, 1.00 equiv) in dichloromethane (20 mL) with an inert atmosphere of nitrogen was added bis(diisopropylamino)(2-cyanoethoxy)phosphine (786.7 mg, 1.62 mmol, 3.00 equiv) at room temperature. This was followed by the addition of pyridine trifluoroacetate (336.3 mg, 1.74 mmol, 2.00 equiv) at room temperature. The resulting solution was stirred for 2 h at room temperature. The resulting mixture was concentrated under reduced pressure. This resulted in 2.0 g (crude) of G11-15 as yellow oil. The product was used in the next step directly without further purification.

To a solution of G11-15 (2 g, 0.80 mmol, 1.00 equiv) in acetonitrile (20 mL) with an inert atmosphere of nitrogen was added water (43 mg, 2.4 mmol, 3.00 equiv) and 4,5-dicyanoimidazole (113 mg, 0.96 mmol, 1.20 equiv) at room temperature. The resulting solution was stirred for 2 h at room temperature. The resulting mixture was concentrated under reduced pressure. The crude was purified by Flash-Prep-HPLC. The product fraction was extracted with dichloromethane. The resulting mixture was washed with saturated sodium chloride. The organic layer was dried over anhydrous sodium sulfate, filtered, and concentrated under reduced pressure. This resulted in 1.025 g (53%) of G11-16 as a white solid. MS m/z [M−H]−(ESI): 2412. 1H NMR (DMSO-$d_6$, 400 Hz): 8.10-7.90 (m, 1H), 7.85-7.7.81 (m, 6H), 7.75-7.72 (m, 3H), 7.35-7.22 (m, 9H), 7.05-7.00 (m, 1H), 6.89-6.87 (m, 4H), 5.21-5.20 (d, J=3.2 Hz, 3H), 4.98-4.95 (m, 3H), 4.50 (s, 1H), 4.47-4.40 (m, 3H), 4.04-4.01 (s, 11H), 3.88-3.85 (m, 3H), 3.73-3.69 (m, 9H), 3.55-3.52 (m, 12H), 3.41-3.39 (m, 3H), 3.20 (s, 2H), 3.04-3.00 (m, 14H), 2.85-2.75 (m, 2H), 2.49-2.29 (m, 6H), 2.10-1.99 (m, 28H), 1.89-1.77 (m, 11H), 1.77-1.70 (m, 9H), 1.70-1.65 (m, 2H), 1.52-1.45 (m, 18H). P NMR (CD30D, 400 Hz): 7.957, 7.927.

Synthesis of GalNAc-12

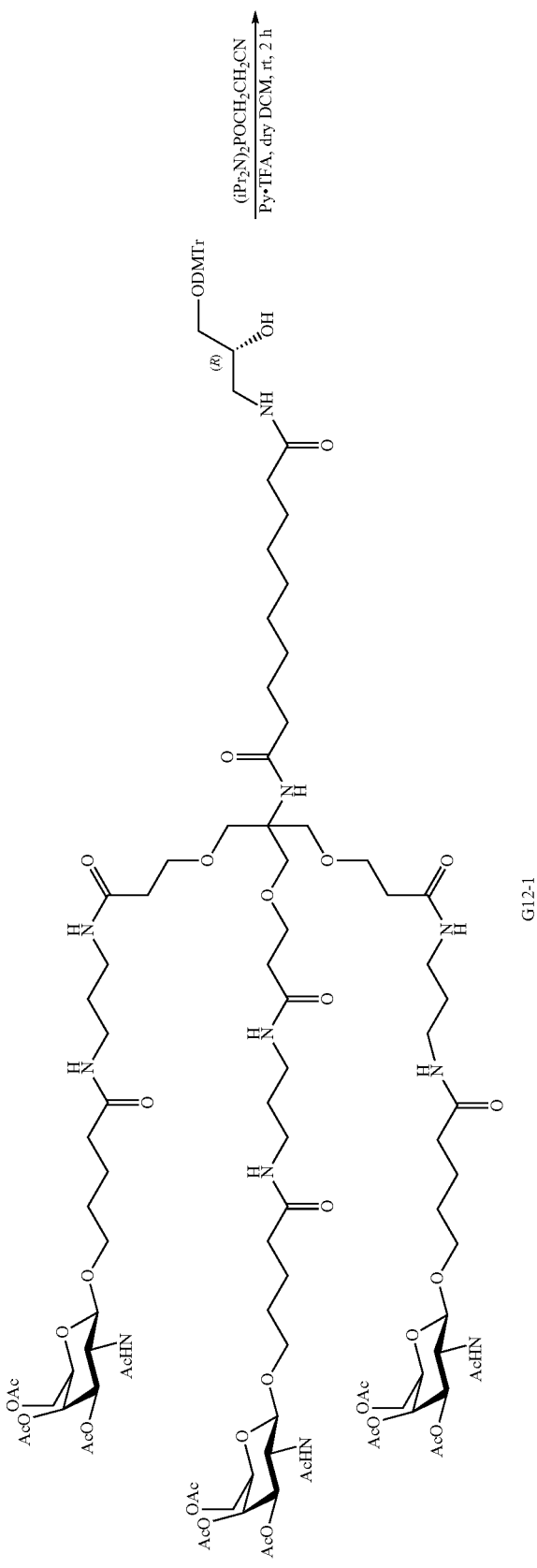

-continued
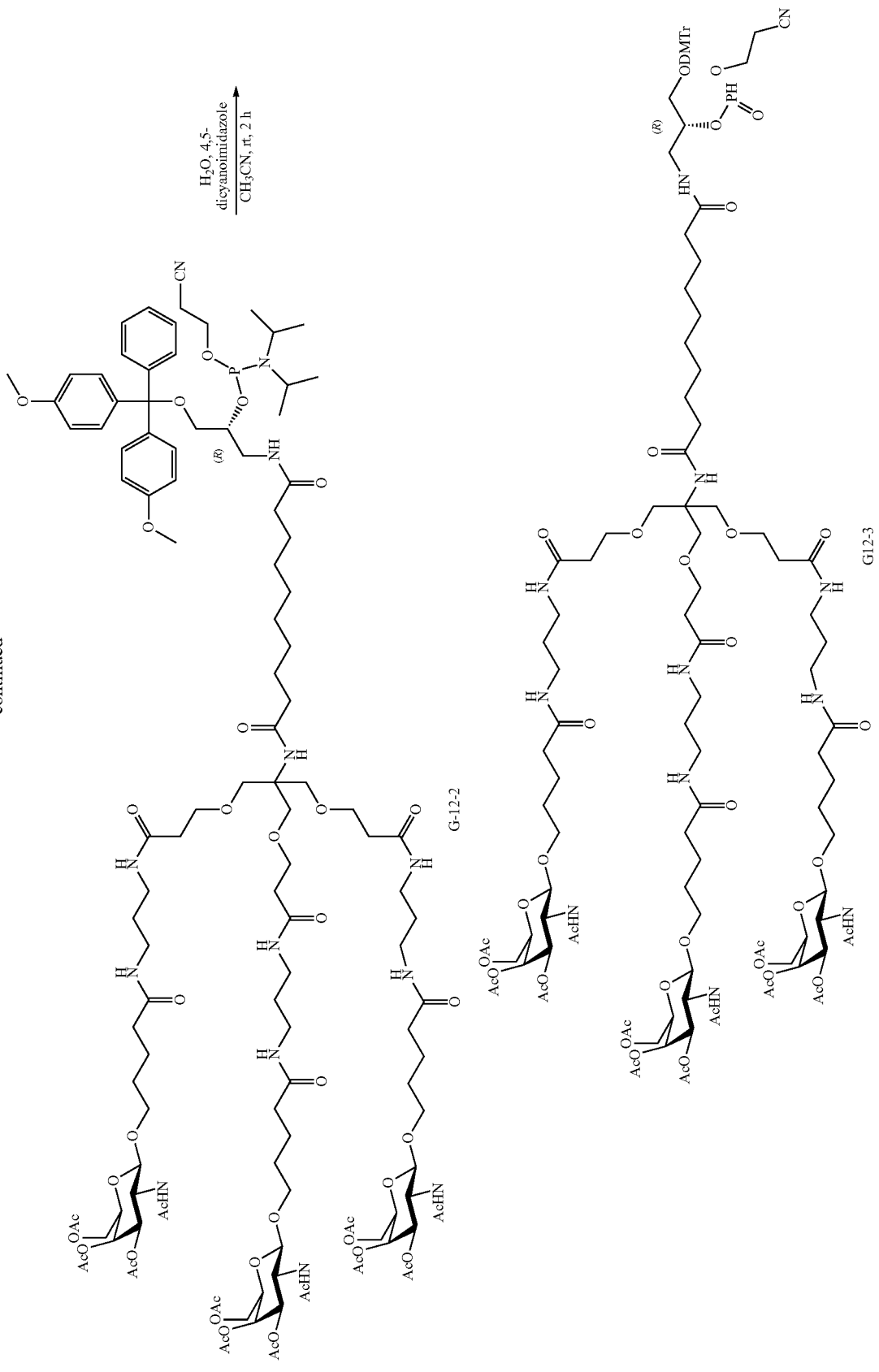

To a solution of G12-1 (4.0 g, 1.70 mmol, 1.00 equiv) in dichloromethane (40 mL) with an inert atmosphere of nitrogen, was added Bis(diisopropylamino)(2-cyanoethoxy)phosphine (922.6 mg, 3.06 mmol, 1.80 equiv) at room temperature. To this was added Pyridine trifluoroacetate (525 mg, 2.72 mmol, 1.60 equiv) at room temperature. The resulting solution was stirred for 1 h at room temperature. The resulting mixture was concentrated under reduced pressure. This resulted in 3.0 g (crude) of G12-2 as yellow oil.

To a solution of G12-2 (3.0 g, 1.18 mmol, 1.00 equiv) in acetonitrile (30 mL) with an inert atmosphere of nitrogen, was added water (166 mg, 9.22 mmol, 7.85 equiv) at room temperature. To this was added 4, 5-dicyanoimidazole (63.4 mg, 0.54 mmol, 0.46 equiv) at room temperature. The resulting solution was stirred for 1 h at room temperature. The resulting mixture was concentrated under reduced pressure. The crude product (2.5 g) was purified by Flash-Prep-HPLC. This resulted in 2.0542 g (71%) of G12-3 as a white solid. MS m/z [M−H]−(ESI): 2468. 1H-NMR (DMSO-$d_6$, 400 Hz): 7.91-7.80 (m, 7H), 7.74-7.71 (m, 3H), 7.38-7.31 (m, 4H), 7.29-7.23 (m, 5H), 6.97 (s, 1H), 6.87-6.81 (m, 4H), 5.21 (s, 3H), 4.98-4.94 (m, 3H), 4.60 (s, 1H), 4.49-4.47 (d, J=8.4 Hz, 3H), 4.25-4.10 (m, 2H), 4.02 (s, 9H), 3.88-3.85 (m, 3H), 3.73-3.68 (m, 9H), 3.55-3.52 (m, 11H), 3.52-3.41 (m, 3H), 3.20 (s, 3H), 3.04-2.92 (m, 13H), 2.90-2.89 (m, 2H), 2.29-2.10 (m, 6H), 2.09-1.99 (m, 28H), 1.89-1.80 (m, 9H), 1.77-1.71 (m, 9H), 1.52-1.37 (m, 23H), 1.19 (s, 9H). P-NMR (DMSO-$d_6$, 400 Hz): 8.456.

Synthesis of GalNAc-13

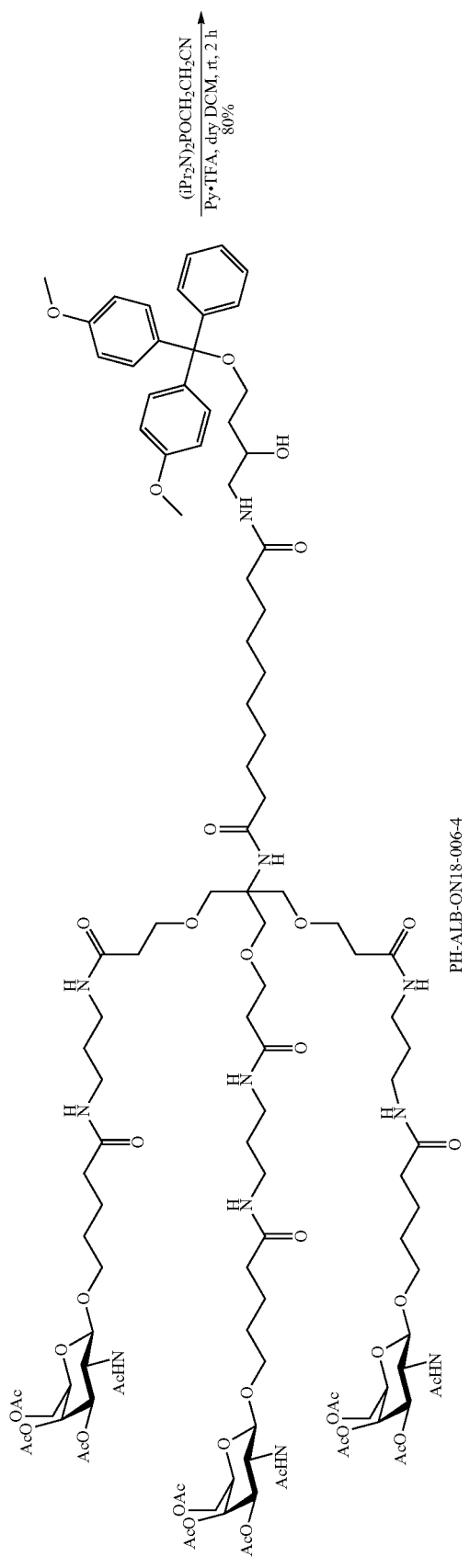
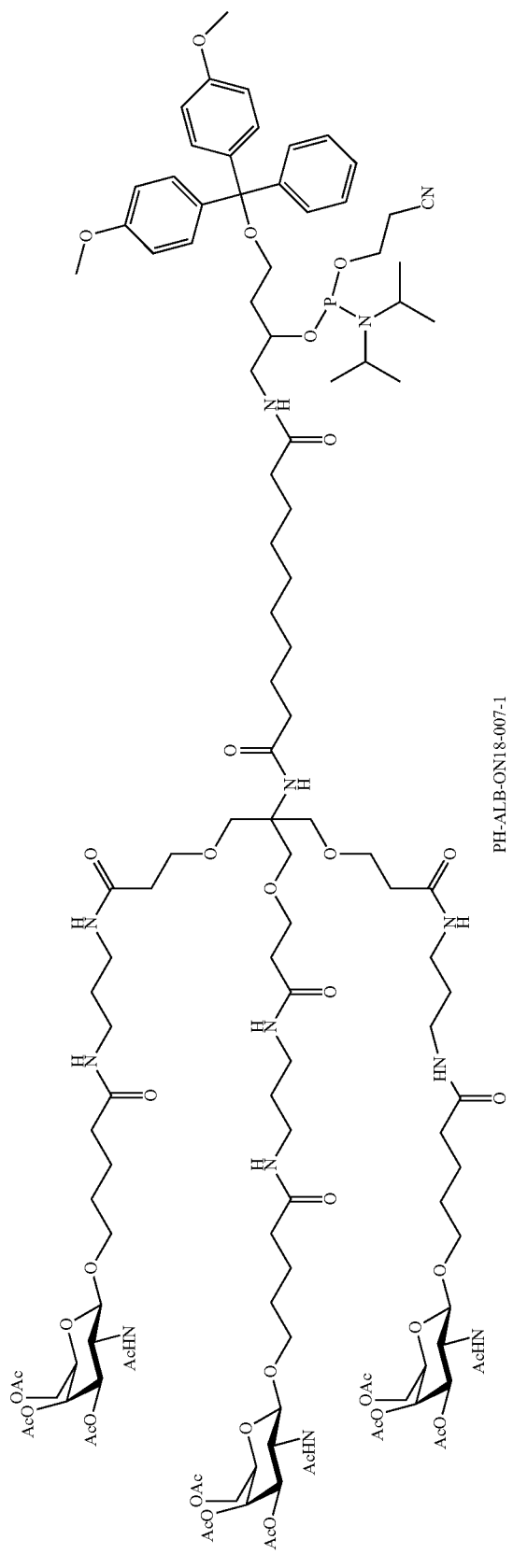

To a solution of G13-1 (4.0 g, 1.70 mmol, 1.00 equiv) in dichloromethane (40 mL) with an inert atmosphere of nitrogen, was added Bis(diisopropylamino)(2-cyanoethoxy) phosphine (690 mg, 2.29 mmol, 1.80 equiv) at room temperature. To this was added Pyridine trifluoroacetate (390 mg, 2.02 mmol, 1.60 equiv) at room temperature. The resulting solution was stirred for 2 h at room temperature.

synthesis of oligoribonucleotide phosphorothioates. The 0.2 M Phenyls acetyl disulfide (PADS) in Lutidine:Acetonitrile (1:1) was used as sulfurizing agent in large-scale synthesis (Akta OP-100). Oligonucleotide-bearing solid supports were heated at room temperature with aqueous ammonia/ Methylamine (1:1) solution for 3 h in shaker to cleavage from support and deprotect the base labile protecting groups.

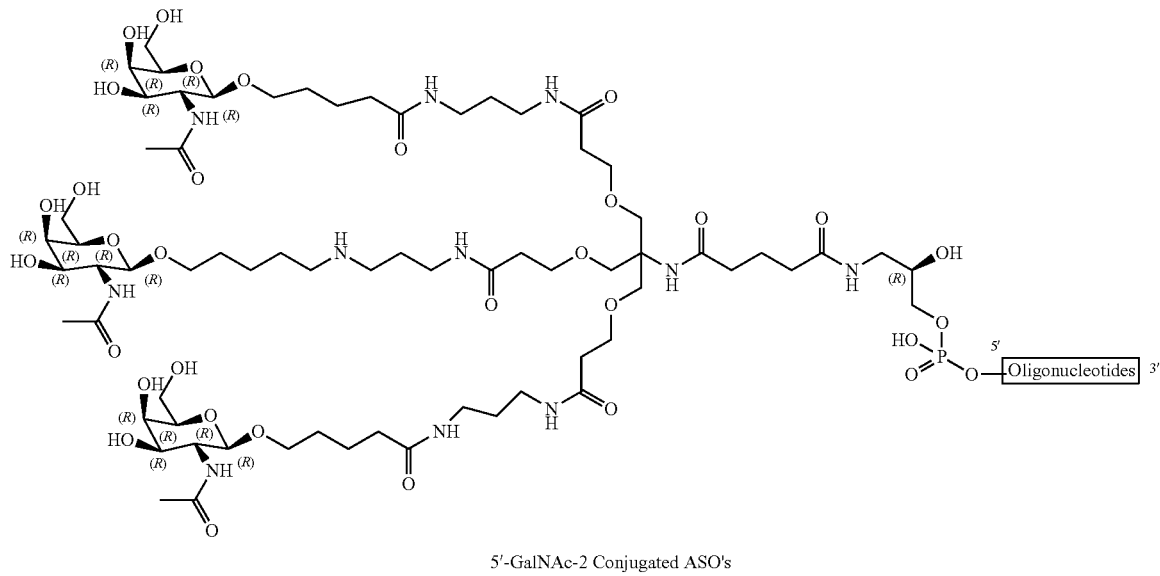

5′-GalNAc-2 Conjugated ASO's

The resulting mixture was concentrated under reduced pressure. This resulted in 2.5 g (crude) of G13-2 as a yellow oil.

To a solution of G13-2 (2.3 g, 0.90 mmol, 1.00 equiv) in acetonitrile (22 mL) and water (50 mg, 2.78 mmol, 3.00 equiv), was added 4, 5-dicyanoimidazole (0.12 g, 101.69 mmol, 1.20 equiv) at room temperature. The resulting solution was stirred for 2 h at room temperature. The resulting mixture was concentrated under reduced pressure. The crude product (2.3 g) was purified by Flash-Prep-HPLC. This resulted in 2.076 g (94%) of G13-3 as an off-white solid. MS m/z [M+Na]+(ESI): 2506. 1H-NMR (DMSO-d6, 300 Hz): 8.05-7.90 (m, 1H), 7.80-7.71 (m, 9H), 7.38-7.22 (m, 9H), 6.95 (s, 1H), 6.89-6.86 (m, 4H), 5.21 (s, 3H), 4.99-4.94 (m, 3H), 4.65-4.40 (m, 4H), 4.02 (s, 11H), 3.88-3.85 (m, 3H), 3.73-3.68 (m, 9H), 3.56-3.51 (m, 12H), 3.42-3.38 (m, 3H), 3.32 (s, 2H), 3.04 (s, 14H), 2.84-2.82 (m, 2H), 2.29-2.22 (m, 6H), 2.10-1.99 (m, 28H), 1.89 (s, 10H), 1.77 (s, 10H), 1.52-1.45 (m, 22H), 1.22 (s, 9H). P-NMR (DMSO-d6, 300 Hz): 7.867.

GalNAc Conjugation

For making the 5′ GalNAc Conjugated oligomer with the following modifications: 2′-F-NPS-PS-2′-F-NPS ; 2′-F-NP-PS-2′-F-NP; 2′-OMe-NP-PS-2′-OMe-NP; 2′-OMe-NPS-DNA-PS-2′-OMe-NPS, 2′-OEt-NPS-DNA-PS-2′-OEt-NPS and 2′-MOE-NPS-DNA-PS-2′-MOE-NPS the synthesis was carried out on a 10 to 200 µM scale in a 5′ to 3′ direction with the 5′-phosphoramidite monomers diluted to a concentration of 0.1 M in anhydrous CH$_3$CN in the presence of 5-(benzylthio)-1H-tetrazole activator (coupling time 2.0-4.0 min) to a GalNAc 2-CPG. The coupling cycle with modified protocols followed by standard capping, oxidation, and deprotection afforded modified oligonucleotides. The stepwise coupling efficiency was more than 98%. The DDTT (dimethylamino-methylidene) amino)-3H-1, 2, 4-dithiazaoline-3-thione was used as the sulfur-transfer agent for the 3′-C6NH2-NPS-PS-NPS-(Precursor) Synthesis For making the 3′ GalNAc Conjugated oligomers with the following modifications: 2′-F-NPS-PS-2′-F-NPS ; 2′-F-NP-PS-2′-F-NP; 2′-OMe-NP-PS-2′-OMe-NP; 2′-0Me-NPS-DNA-PS-2′-0Me-NPS, 2′-OEt-NPS-DNA-PS-2′-OEt-NPS and 2′-MOE-NPS-DNA-PS-2′-MOE-NPS ASOs were synthesized at 10 µmol scale using universal support (Loading 65 µmol/g). The synthesis procedure is same as described above. At the 3′-terminal to introduce C6-NH$_2$ linker the 6-(4-Monomethoxytritylamino)hexyl-(2-cyanoethyl)-(N,N-diisopropyl)-phosphoramidite in 0.1 M Acetonitrile was used with coupling time 10 min. The Oligonucleotide-bearing solid supports were heated at room temperature with aqueous ammonia/Methylamine (1:1) solution for 3 h in shaker to cleavage from support and deprotect the base labile protecting groups. After IEX purification and desalting the C6-NH2 modified ASO's can be used to perform post synthesis conjugation.

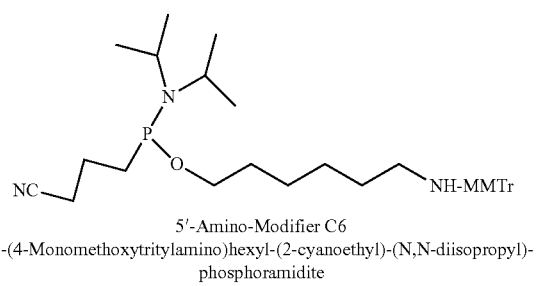

5′-Amino-Modifier C6
6-(4-Monomethoxytritylamino)hexyl-(2-cyanoethyl)-(N,N-diisopropyl)-phosphoramidite 3'-GalNAc NPS-PS-NPS-ASO synthesis (Post Synthesis Conjugation)

The 3'-C6-NH2 modified ASOs were dissolved in 0.2 M Sodium bicarbonate buffer, pH 8.5 (0.015 mM) and 5-7 mol equivalent of GalNAc-6 ester dissolved in DMSO was added. The reaction mixture was stirred at room temperature for 4 h. The sample was analyzed to confirm if any unreacted amino modified ASO's is present. To this aqueous ammonia (28 wt. %) was added (5× reaction volume) and stirred at room temperature for 2-3 h. Reaction mixture concentrated under reduced pressure and residue dissolved in water and purified by HPLC on a strong anion exchange column.

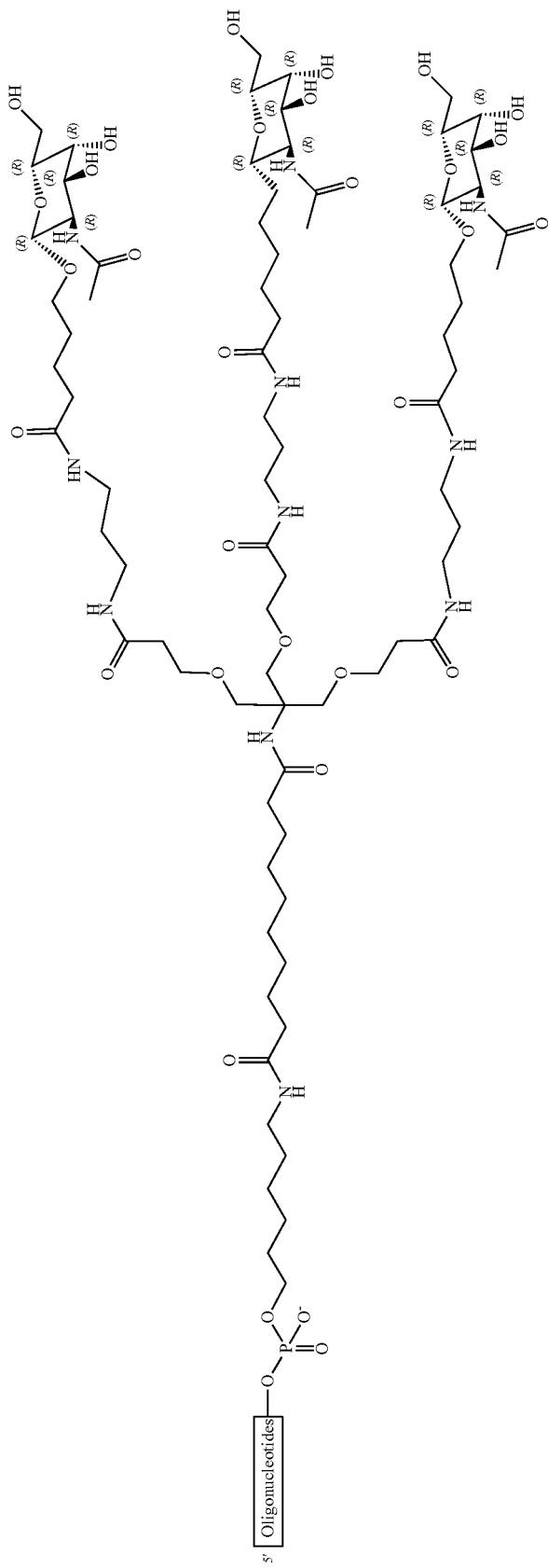
3'-GalNAc-6-Conjugated ASO's

3'-GalNAc6 Conjugation

| Conc. Of Oligo's | Equivalent of GalNAc 6 PFP ester | Temp (° C.) | % Conversion to 3' GalNAc ASO |
|---|---|---|---|
| 0.015 mM | 5 | 25 | 75 |
| 0.0076 mM | 7 | 25 | 80 |
| 0.0076 mM | 4 | 25 | 65 |

Quantitation of Crude Oligomer or Raw Analysis

Samples were dissolved in deionized water (1.0mL) and quantitated as follows: Blanking was first performed with water alone (1.0 mL) 20 ul of sample and 980 µL of water were mixed well in a microfuge tube, transferred to cuvette and absorbance reading obtained at 260 nm. The crude material is dried down and stored at −20° C.

Crude HPLC/LC-MS Analysis

The 0.1 OD of the crude samples were submitted for crude MS analysis. After Confirming the crude LC-MS data then purification step was performed.

HPLC Purification

The Phosphoramidate (NP) and Thiophosphoramidate (NPS) modified oligonucleotides with and without GalNAc conjugates were purified by anion-exchange HPLC. The buffers were 20 mM sodium phosphate in 10% $CH_3CN$, pH 8.5 (buffer A) and 20 mM sodium phosphate in 10% $CH_3CN$, 1.8 M NaBr, pH 8.5 (buffer B). Fractions containing full-length oligonucleotides were pooled, desalted, and lyophilized.

Desalting of Purified Oligomer

The purified dry oligomer was then desalted using Sephadex G-25 M (Amersham Biosciences). The cartridge was conditioned with 10 mL of deionized water thrice. Finally the purified oligomer dissolved thoroughly in 2.5mL RNAse free water was applied to the cartridge with very slow drop wise elution. The salt free oligomer was eluted with 3.5 ml deionized water directly into a screw cap vial.

Stability Testing of Complexed Oligonucleotides

In embodiments, the disclosed oligonucleotides display an increased affinity for a target nucleic acid sequence compared to an unmodified oligonucleotide of the same sequence. For example, in some sequences the disclosed oligonucleotides has a nucleobase sequence that is complementary or hybridizes to a target nucleic acid sequence at a higher affinity than an unmodified oligonucleotide of the same sequence. In embodiments, the disclosed oligonucleotide complexed with a complementary target nucleic acid sequence has a melting temperature T. of >37° C. The complex may be formed under physiological conditions or nearly physiological conditions such as in phosphate-buffered saline (PBS). In embodiments, the Tm of the complex is >50° C. In embodiments, the Tm of the complex is 50-100° C. In embodiments, the Tm of a disclosed oligonucleotide duplexed with a target nucleic acid sequence under physiological conditions or nearly physiological conditions is >50° C.

In certain embodiments, the target nucleic acid sequence may be selected from a nucleic acid sequence of a known viral DNA or RNA sequence such as the HBV genome.

In embodiments, the disclosed oligonucleotides display an affinity for at least one of the following six sequences of the HBV genome or its RNA equivalents and/or display stability complexed to at least one sequence of the HBV genome or its RNA equivalent. In embodiments, the oligonucleotide complexed with a complementary HBV genome sequence has a melting temperature (Tm) of >37° C. The HBV genome may be an RNA sequence such as DR-1 and/or DR-2 RNA sequence. The complex may be formed under physiological conditions or nearly physiological conditions such as in phosphate-buffered saline (PBS). In embodiments, the Tm of the complex is >50° C. In embodiments, the Tm of the complex is 50-100° C. In embodiments, the Tm of a disclosed oligonucleotide duplexed with an HBV RNA under physiological conditions or nearly physiological conditions is >50° C.

In Vitro Testing of Oligonucleotides

Two HBV cell lines were used to assess the in vitro potency of oligonucleotides: HepG2.2.15 (2215) and HepG2.117 (2117). HBsAg reduction in tissue culture supernatant (sup) as well as cytotoxicity was measured using HepG2.2.15 cell. HBV DNA reduction in the sup as well as intracellular fraction was measured in HepG2.117 cell.

HepG2.2.15 cell line is a stable cell line with four integrated HBV genomes. The cells were grown at 37° C. in an atmosphere of 5% $CO_2$ in Dulbecco's modified Eagle's medium supplemented with 10% FCS, 100 IU/ml penicillin, 100 µg/ml streptomycin, and 2% glutamine. The day before the dosing, $2.5 \times 10^4$ cells/well were plated in collagen coated 96 well plates and incubated overnight. On the day of dosing, serially diluted oligomers were transfected into the cells with Lipofectamine RNAiMax (Thermo Fisher, Waltham, Mass.) following manufacturer's protocol. Duplicates were made for each drug concentration and each oligo was set up for both EC50 measurement and CC50 measurement. Three days after transfection, the supernatant (sup) was collected and used in HBsAg ELISA (AutoBio, China) for EC50 calculation. For CC50 measurement, CellTiter-Glo® (Promega, Madison, WI) was used in the assay following manufacturer's instruction.

HepG2.117 is a stable hepatoma cell line harboring an integrated 1.05 copy of the HBV genome (subtype ayw) under regulation of TetOFF (induction of transcription in the absence of tetracycline or its homolog doxycycline). The cells were grown at 37° C. in an atmosphere of 5% $CO_2$ in DMEM/F12 media supplemented with 10% FCS, 100 IU/ml penicillin, 100 µg/ml streptomycin, 2% glutamine, 250 µg/ml G418, and 2 µg/ml Tetracycline. The day before the dosing, the cell media-containing Tetracycline was removed, the cells washed to remove the residual Tetracycline and plated at $2.5 \times 10^4$ cells/well with treatment media (DMEM/F12 containing 2% Tet-system approved FBS 100 IU/ml penicillin, 100 µg/ml streptomycin, and 2% glutamine) in collagen coated 96 well plates. The cells were then incubated overnight. On the day of experiment, serially diluted oligomers were transfected into the cells with Lipofectamine RNAiMax (Thermo Fisher, Waltham, Mass.) following manufacturer's protocol. Duplicates were made for each drug concentration and each oligo was set up for both EC50 measurement and CC50 measurement. Four days after the transfection, the sup was collected to be used in HBV DNA qPCR directly. The HBV DNA from the cells was isolated with MagMAX™ Total Nucleic Acid Isolation Kit (Thermo Fisher) and then applied in qPCR as template. HBV subtype ayw DNA (accession number V01460) sequence was used to design (Primer Express, Thermo Fisher) the forward primer (5'-TTG CCT TCT GAC TTC TTT CCT TCT-3'), reverse primer (5'-TGC CTG AGT GCT GTA TGG TGA G-3') and the fluorogenic TaqMan® probe (5'-TCG GGA AGC CTT AGA GTC TCC TGA-3') labelled with FAM (6-carboxyfluoresceine) in 5' and with TAIVIRA (6-carboxytetramethylrhodamine) in 3'. These primers and probe were used to carry out quantitative real-time PCR with AmpliTaq Gold DNA polymerase (Perkin-Elmer Life Science, Waltham, Mass.). The conditions for this reaction were as follows: 1 cycle, hot-start at 95° C. for 10 min followed by 50 cycles of denaturation (95° C. for 15 s) and annealing/polymerization (59° C. for 1 min).

Infectious HBV System in Primary Human Hepatocyte

Cryopreserved primary human hepatocytes (PHH)were thawed and plated in 24 well plates at 200,000 cells/well. The cells were allowed to recover overnight at 37° C. 5% $CO_2$. The cells were infected O/N (37° C./5% $CO_2$) with HBV at moi 50-100. After infection for overnight, the viral inoculum is removed and the cells are washed three times with prewarmed wash medium. Then refill with fresh PHH culturing medium. The medium is replaced with 450 µl fresh medium. Add 50u1 transfect mixture. Dilute oligomers in Opti-MEM I (Life Technology, Cat#: 31985-070) to 20× of final concentration, mix with equal volume Opti-MEM I containing Lipofectamine RNAiMAX (Invitrogen, Cat#: 13778-150), pipet 3 times and incubate for 10-20 min at room temperature. Add 50 ul oligo:RNAiMAX mixture into the wells, tap the plates a few times with hands. Put the plates back to incubator. On the day of assay, Harvest supernatant for HBsAg and HBeAg ELISA, cell for cell viability. HBsAg ELISA was described in above section. For HBeAg, method from Autobio Diagnostics (CL0312-2) was used.

In Vivo Testing of Oligonucleotides

AAV/HBV is a recombinant AAV carrying replicable HBV genome. Taking advantage of the highly hepatotropic feature of genotype 8 AAV, the HBV genome can be efficiently delivered to the mouse liver cells. Infection of immune competent mouse with AAV/HBV can result in long-term HBV viremia, which mimics chronic HBV infection in patients. The AAV/HBV model can be used to evaluate the in vivo activity of various types of anti-HBV agents. Mice were infected with AAV-HBV on day -28 of the study. The test articles or negative control (PBS) were dosed subcutaneously (unless specified otherwise) three times on days 0, 2 and 4 at the specified dose levels. Or they can be injected as single dose at specified dose levels on day 0. The positive control, entecavir (ETV), for HBV DNA, but not for HBV antigens, was dosed orally every day. Serum HBV S antigen (HBsAg) and E antigen (HBeAg) were assayed through ELISA and HBV DNA through real time PCR. ELISA methods and qPCR method have been described in the in vitro assay sections above.

The following statements describe how the data in Table 1-22 were generated. For all of the in vitro HBsAg Cell line EC50 and CC50 data, the method for HepG2.2.15 was used and accordingly, "2215" was labeled in the columns or rows where the data was shown. For all of the in vitro HBV DNA Cell line EC50 and CC50 data, the method for HepG2.117 was used and accordingly, "2117" was labeled in the columns or rows where the data was shown. For all in vitro HBsAg as well as HBeAg EC50 data tested in HBV/PHH infectious system, PHH method was used and accordingly "PHH" was labeled in the columns or rows where the data was shown. For in vivo AAV-HBV mouse model results, method in in vivo section above was applied. The Maximum HBsAg (or HBeAg) reduction was described as nadir (unit Log reduction) and the nadir was labeled in the columns or rows where the data was shown. Two ASOs were often compared for their nadir. If value other than nadir was compared, they will be indicated in the text.

Method of Treatment

An adult human suffering from HBV infection is administered intravenously a therapeutically effective compound of the present disclosure, for example, a compound selected from Table 1-22. Treatment is continued until one or more symptoms of HBV is ameliorated, or for example, serum HBV S antigen (HBsAg) and/or E antigen (HBeAg) levels are reduced.

An adult human suffering from HBV infection is administered subcutaneously a therapeutically effective compound of the present disclosure, for example, a compound selected from Table 1-22. Treatment is continued until one or more symptoms of HBV is ameliorated, or for example, serum HBV S antigen (HBsAg) and/or E antigen (HBeAg) levels are reduced.

TABLE 1

| Sequence | $T_m$ (° C.) | Max HBsAg Reduction (nadir) 3 × 10 mg/kg | Max HBeAg Reduction (nadir) 3 × 10 mg/kg |
|---|---|---|---|
| 258 | 77.2 | 3.4 log | 2.7 log |
| 259 | 69.9 | 2.4 log | 1.9 log |
| Improvement | 7.3 | 1 log | 0.8 log |

| # | Sequence (5'-3') | Mol Wt. |
|---|---|---|
| 258 | 5'-mGnpsmoeCnpsmoeAnpsmGnpsmoeAnpsGpsGpsTpsGpsApsApsGpsCpsGpsApsmoeAnpsmGnpsmoeUnpsmGnpsmoeCnp-C6-NH-GalNAc6-3' | 8862.97 |
| 259* | 5'-moeGps(5me)moeCpsmoeApsmoeGpsmoeApsGpsGpsTpsGpsApsApsGps(5me)CpsGpsApsmoeApsmoeGpsmoeTpsmoeGps(5me)moeC-po-GalNAc2-3' | 9008.93 |

*Sequences 260 and 261 were also tested and provided similar results.

TABLE 2

| Sequence | $T_m$ (° C.) | Max HBsAg Reduction (nadir) 3 × 10 mg/kg | Max HBeAg Reduction (nadir) 3 × 10 mg/kg |
|---|---|---|---|
| 262 | 77.3 | 3.1 log | 2.5 log |
| 263 | 69.9 | 2.4 log | 1.9 log |
| Improvement | 7.4 | 0.7 log | 0.6 log |

| # | Sequence (5'-3') | Mol Wt. |
|---|---|---|
| 262* | 5'-GalNAc2-moeGnpsmoeCnpsmoeAnpsmoeGnpsmoeAnpsGpsGpsTpsGpsApsApsGpsCpsGpsApsmoeAnpsmoeGnpsmoeUnpsmoeGnpsmoeCn 3' | 8941.00 |
| 263 | 5'-moeGps(5me)moeCpsmoeApsmoeGpsmoeApsGpsGpsTpsGpsApsApsGps(5me)CpsGpsApsmoeApsmoeGpsmoeTpsmoeGps(5me)moeC-GalNAc2-3' | 9008.93 |

*5'-GalNac2-moeGnpsmoeCnpsmoeAnpsmoeGnpsmoeAnpsGpsGpsTpsGpsApsApsGps(5m)CpsGpsApsmoeAnpsmoeGnpsmoeUnpsmoeGnpsmoeCn-3' and
5'-GalNac1-moeGnpsmoeCnpsmoeAnpsmoeGnpsmoeAnpsGpsGpsTpsGpsApsApsGpsCpsGpsApsmoeAnpsmoeGnpsmoeUnpsmoeGnpsmoeCn-3' were also tested and provided similar results.

TABLE 3

| Sequence | Max HBsAg Reduction (nadir) 3 × 5 mg/kg | Max HBeAg Reduction (nadir) 3 × 5 mg/kg |
|---|---|---|
| 266 | 2.3 log | 2.1 log |
| 267 | 2.2 log | 1.9 log |
| Improvement | 0.1 log | 0.2 log |

| # | Sequence (5'-3') | Mol Wt. |
|---|---|---|
| 266* | 5-GalNAc2-mGnpsmCnpsmAnpsmGnps mAnpsGpsGpsTpsGpsApsApsGps(5m) CpsGpsApsmoeAnpsmoeGnpsmoeUnps moeGnpsmoeCn-3 | 8736.73 |
| 267 | 5'-GalNac6-NH-C6-moeGps(5m)moe CpsmoeApsmoeGpsmoeApsGpsGpsTps GpsApsApsGps(5m)CpsGpsApsmoeAp smoeGpsmoeTpsmoeGps(5m)moeC-3' | 9105.14 |

*5'-GalNAc2-mGnpsmCnpsmAnpsmGnpsmAnpsGpsGpsTpsGpsApsApsGps (5m)CpsGpsApsmAnpsmGnpsmUnpsmGnpsmCn-3' was also tested and provided similar results.

As can be seen above, the MOE NPS oligomers were more active than MOE PS in vivo and OMe NPS is as active as MOE PS oligomers.

Two oligonucleotides, the first containing OEt NPS substitution and the second having MOE NPS were tested in vitro and in vivo. The following Table 4 summarizes the results of the testing.

TABLE 4

| Sequence | Max HBsAg Reduction (nadir) 3 × 5 mg/kg | Max HBeAg Reduction (nadir) 3 × 5 mg/kg |
|---|---|---|
| 269 | 1.9 log | 1.7 log |
| 270 | 1.9 log | 1.8 |
| Difference | 0 log | -0.1 log |

| # | Sequence (5'-3') |
|---|---|
| 269 | 5'-GalNAc2-etoGnps(5m)etoCnpsetoAnpsetoGnp setoAnpsGpsGpsTpsGpsApsApsGps(5m)CpsGpsAps etoAnpsetoGnpsetoTnpsetoGnps(5m)etoCn-3' |
| 270 | 5-GalNAc2- moeGnpsmoeCnpsmoeAnpsmoeGnpsmoeAnpsGpsGpsT psGpsApsApsGps(5m)CpsGpsApsmAnpsmGnpsmUnps mGnpsmCn-3 |

As can be seen above, the MOE NPS oligomers had similar activity to the OEt NPS oligomers.

Four oligonucleotides, the first containing MOE PS substitution, the second having MOE NPS substitution, the third having OME PS substitution, the fourth having OME NPS were tested in vitro. The following Table 5 summarizes the results of the testing.

TABLE 5

| Sequence | 2215 HBsAg EC50 (nM) | $T_m$ (° C.) |
|---|---|---|
| 271 | 5 | 69.9 |
| 272 | 0.7 | 77.3 |
| 273 | 5 | 70.7 |
| 274 | 0.9 | 75.5 |

| # | Sequence (5'-3') | MW |
|---|---|---|
| 271 | 5'-moeGpsmoemCpsmoeApsmoeGpsmoeAps GpsGpsTpsGpsApsApsGps5mCpsGpsApsmo eApsmoeGpsmoeTpsmoeGpsmoemC 3' | 7344.19 |
| 272 | 5'moeGnpsmoeCnpsmoeAnpsmoeGnpsmoeA npsGpsGpsTpsGpsApsApsGpsCpsGpsApsm oeAnpsmoeGnpsmoeUnpsmoeGnpsmoeCn3' | 7276.27 |
| 273 | 5'-mGps5mmCpsmApsmGpsmApsGpsGpsTps GpsApsApsGps5mCpsGpsApsmApsmGpsmUp smGps5mmC-3' | 6889.64 |
| 274 | 5'-mGnpsmCnpsmAnpsmGnpsmAnpsGpsGps TpsGpsApsApsGpsCpsGpsApsmAnpsmGnps mUnpsmGnpsmCn-3' | 6837.71 |

Two oligonucleotides, the first containing 5'GalNAc-2'-MOE NPS substitution, the second having 5'-GalNAc-6: MOE PS substitution was tested in vivo. The following Table 6 summarizes the results of the testing.

TABLE 6

| # | Sequence (5'-3') | MW |
|---|---|---|
| 275 | 5'-GalNAc2-moeGnpsmoeCnpsmoeAnps moeGnpsmoeAnpsGpsGpsTpsGpsApsAps Gps(5m)CpsGpsApsmoeAnpsmoeGnpsmo eUnpsmoeGnpsmoeCn-3' | 8957.00 |
| 276 | 5'-GalNac6-NH-C6-moeGps(5m)moeCp smoeApsmoeGpsmoeApsGpsGpsTpsGpsA psApsGps(5m)CpsGpsApsmoeApsmoeGp smoeTpsmoeGps(5m)moeC-3' | 9105.14 |

| Dose | Improvement of HBsAg Max Reduction (nadir) |
|---|---|
| 3 × 5 mg/kg | 0.4 Log (2.5 times) |
| 1 × 5 mg/kg | 0.5 log (3.2 times) |

Two oligonucleotides, the first containing 3'-GalNAc-2'-MOE NPS substitution, the second having 3'-GalNAc2'-MOE PS substitution was tested in vivo. The following Table 7 summarizes the results of the testing.

TABLE 7

| # | Sequence (5'-3') | MW |
|---|---|---|
| 277 | 5'moeGps(5m)moeCpsmoeApsmoeGpsmoeApsGpsGpsTpsGpsApsAps Gps(5m)CpsGpsApsmoeApsmoeGpsmoeTpsmoeGps(5me)moeC-GalNAc2-3' | 9008.93 |
| 258 | 5'-mGnpsmoeCnpsmoeAnpsmGnpsmoeAnpsGpsGpsTpsGpsApsApsGps CpsGpsApsmoeAnpsmGnpsmoeUnpsmGnpsmoeCnp-C6-NH-GalNAc63' | 8862.97 |

| Sequence | 277 | 258 | Improvement |
|---|---|---|---|
| $T_m$ (° C.) | 69.9 | 77.2 | 7.3 |
| 2215 HBsAg In vitro EC50 (nM) | 5 | 0.7 | 7.1-fold |
| Max HBsAg Reduction (nadir)3 × 10 mg/kg | 2.4 log | 3.4 log | 1 log (10 times) |
| Max HBeAg Reduction (nadir) 3 × 10 mg/kg | 1.9 log | 2.7 log | 0.8 log (6.3 times) |

TABLE 10-continued

| # | Chemistry | Sequence (5'-3') | MW |
|---|---|---|---|
| 281 | MOE NPS | 5'-moeGnpsmoeCnpsmoeAnpsmoeGnpsmoeAnpsGpsGpsTpsGps ApsApsGps(5m)CpsGpsApsmoeAnpsmoeGnpsmoeUnpsmoeGnp smoeCnp-C6-NH-GalNAc6-3' | 9053.85 |
| 282 | MOE NPS | 5'-GalNAc2-moeGnpsmoeCnpsmoeAnpsmoeGnpsmoeAnpsGpsGp sTpsGpsApsApsGps(5m)CpsGpsApsmoeAnpsmoeGnpsmoeUnps moeGnpsmoeCn-3' | 8957.00 |

The following sequences were tested in the HBV mouse model. The values in the right column show max HBsAg reduction in LOG dosed at 3×10 mg/kg Days 0, 2, 4.

TABLE 11

| # | Chemistry | Sequence 5'-3' | Max HBsAg reduction (nadir) | MW |
|---|---|---|---|---|
| 283 | Deoxy NPS | 5'-GalNAc1-GnpsCnpsAnpsGnpsAnpsGpsGpsTpsGps ApsApsGpsCpsGpsApsAnpsGnpsTnpsGnpsCn-3' | 1.1 | 8312.38 |
| 265 | MOE NPS | 5'-GalNAc1-moeGnpsmoeCnpsmoeAnpsmoeGnpsmoeAn psGpsGpsTpsGpsApsApsGpsCpsGpsApsmoeAnpsmoe GnpsmoeUnpsmoeGnpsmoeCn-3' | 3.1 | 9037.17 |

The following sequences were tested in the HBV mouse model. The values in the right column show max HBsAg reduction in LOG dosed at 3×10 mg/kg Days 0, 2, 4.

TABLE 12

| No. | Targeted HBV Region | Chemistry | Sequence 5'-3' | Max HBsAg reduction (nadir) in log | MW |
|---|---|---|---|---|---|
| 283 | DR2 #1 | Deoxy NPS | 5'-GalNAc1-GnpsCnpsAnpsGnpsAnpsGps GpsTpsGpsApsApsGpsCpsGpsApsAnpsGnps TnpsGnpsCn-3' | 1.1 | 8312.38 |
| 284 | DR2 #1 | OME NPS | 5'-GalNAc1-mGnpsmCnpsmAnpsmGnpsmAnps GpsGpsTpsGpsApsApsGpsCpsGpsApsmAnpsm GnpsmUnpsmGnpsmCn-3' | 2.1 | 8598.62 |
| 285 | DR2 #1 | F NPS | 5'-GalNAc1-fGnpsfCnpsfAnpsfGnpsfAnps GpsGpsTpsGpsApsApsGpsCpsGpsApsfAnpsf GnpsfUnpsfGnps-3nh2-fC-3' | 2.5 | 8478.26 |
| 286 | DR2 #1 | Ara F NPS | 5'-GalNAc1-afGnpsafCnpsafAnpsafGnpsa fAnpsGpsGpsTpsGpsApsApsGpsCpsGpsApsa fAnpsafGnpsafTnpsafGnpsafCn-3' | 0.5 | 8492.29 |
| 287 | DR2 #2 | Deoxy NPS | 5'-GalNAc1-dTnpsGnpsCnpsAnpsGnpsAps GpsGpsTpsGpsApsApsGpsCpsGpsAnpsAnps GnpsTnps-3nh2-G-3' | 1.1 | 8327.29 |
| 288 | DR2 #2 | OME NPS | 5'-GalNAc1-mUnpsmGnpsmCnpsmAnpsm GnpsApsGpsGpsTpsGpsApsApsGpsCpsGpsm AnpsmAnpsmGnpsmUnpsmGn-3' | 2.1 | 8599.60 |
| 289 | DR2 #2 | F NPS | 5'-GalNAlc-fUnpsfGnpsfCnpsfAnpsfGnps ApsGpsGpsTpsGpsApsApsGpsCpsGpsfAnpsf AnpsfGnpsfUnps-3nh2-fG-3' | 2.4 | 8479.24 |
| 290 | Pre-PolyA | OME NPS | 5'-GalNAc1-mGnpsmCnpsmUnpsmCnpsmCnps ApsApsApsTpsTps5MeCpsTpsTpsTpsApsm UnpsmAnpsmAnpsmGnpsmGnpsmGn-3' | 1.1 | 8807.84 |

TABLE 12-continued

| No. | Targeted HBV Region | Chemistry | Sequence 5'-3' | Max HBsAg reduction (nadir) in log | MW |
|---|---|---|---|---|---|
| 291 | Pre-PolyA | MOE NPS | 5'-GalNAc1-moeGnpsmoeCnpsmoeUnpsmoe CnpsmoeCnpsApsApsApsTpsTps5MeCpsTps TpsTpsApsmoeUnpsmoeAnpsmoeAnps-moeGnps moeGnpsmoeGn-3' | 2.0 | 9292.42 |

TABLE 14

| No. | Chemistry | MW | Sequence |
|---|---|---|---|
| 294 | F NPS with OPO link to 3'GalNac | 8507.3 | 5'-fGnps(5m)fCnpsfAnpsfGnpsfAnpsGpsGpsTpsGpsAps ApsGpsCpsGpsApsfAnpsfGnpsfTnpsfGnpsfC-C6-NH-GalNac6-3' |
| 295 | F NPS with NPO link to 3'GalNac | 8492.29 | 5'-fGnpsfCnpsfAnpsfGnpsfAnpsGpsGpsTpsGpsApsAps Gps(5m)CpsGpsApsfAnpsfGnpsfUnpsfGnpsfCnp-C6-NH-GalNAc6-3' |

TABLE 15

| No. | Chemistry | MW | Sequence |
|---|---|---|---|
| 296 | OME NPS with NPO linkage to 3'GalNac | 8614.39 | 5-mGnpsmCnpsmAnpsmGnpsmAnpsGpsGpsTpsGpsApsAps Gps(5m)CpsGpsApsmAnpsmGnpsmUnpsmGnpsmCnp-C6-NH-GalNAc6-3 |
| 297 | OME NPS with OPO linkage to 3'GalNac | 8614.43 | 5-mGnpsmCnpsmAnpsmGnpsmAnpsGpsGpsTpsGpsApsAps Gps(5m)CpsGpsApsmAnpsmGnpsmUnpsmGnpsmC-C6-NH-GalNAc6-3 |

TABLE 16

| No. | Chemistry | MW | Sequence |
|---|---|---|---|
| 298 | MOE NPS with NPO linkage to 3'GalNac | 9054.52 | 5'-moeGnpsmoeCnpsmoeAnpsmoeGnpsmoeAnpsGpsGpsTps GpsApsApsGps(5m)CpsGpsApsmoeAnpsmoeGnpsmoeUnpsmoe GnpsmoeCnp-C6-NH-GalNAc6-3' |
| 299 | MOE NPS with OPO linkage to 3'GalNac | 9069.62 | 5'-moeGnpsmoeCnpsmoeAnpsmoeGnpsmoeAnpsGpsGpsTps GpsApsApsGps(5m)CpsGpsApsmoeAnpsmoeGnpsmoeUnpsmoe Gnps(5m)moeC-C6-NH-GalNAc6-3' |

TABLE 17

| No. | Chemistry | MW | Sequence |
|---|---|---|---|
| 300 | 5' GalNac MOE NPS | 8955.48 | 5-GalNAc2-moeGnpsmoeCnpsmoeAnpsmoeGnpsmoeAnpsGps GpsTpsGpsApsApsGps(5m)CpsGpsApsmoeAnpsmoeGnpsmoe UnpsmoeGnpsmoeCn-3 |

TABLE 17-continued

| No. | Chemistry | MW | Sequence |
|---|---|---|---|
| 301 | 5' GalNac OEt NPS | 8697.6 | 5-GalNAc2-etoGnpseto(5m)CnpsetoAnpsetoGnpsetoAnps GpsGpsTpsGpsApsApsGps(5m)CpsGpsApsetoAnpsetoGnpse toTnpsetoGnpseto(5m)Cn-3' |

TABLE 18

| No. | Sequence 5'-3' | Modification | MW | 2215 HBsAg EC50 (uM) | 2215 HBsAg CC50 (uM) |
|---|---|---|---|---|---|
| 302 | 5-mGnpsmCnps2-4-OCH$_2$AnpsmGnpsmAnps GpsGpsTpsGpsApsApsGpsCpsGpsAps2-4-OCH$_2$AnpsmGnpsmUnpsmGnps3-NH$_2$mC-3 | Anti-DR-1 with x2 3'-NH-LNA-A | 6835.3 | 0.0008 | 0.0148 |
| 303 | 5-mGnpsmCnps2-4-OCH$_2$CH$_2$AnpsmGnpsm AnpsGpsGpsTpsGpsApsApsGpsCpsGpsAps2-4-OCH$_2$CH$_2$AnpsmGnpsmUnpsmGnps3-NH$_2$mC-3 | Anti-DR-1 with x2 3'-NH-ENA-A | 6862.0 | 0.00067 | 0.0256 |
| 304 | 5-mGnpsmCnps2-4-OCH$_2$CH$_2$AnpsmGnps2-4OCH$_2$CH$_2$AnpsGpsGpsTpsGpsApsApsGpsCps GpsAps2-4-OCH$_2$CH$_2$AnpsmGnpsmUnpsmGnps 3-NH$_2$mC-3 | Anti-DR-1 with x3 3'-NH-ENA-A | 6874.7 | 0.0009 | 0.0214 |
| 305 | 5-mGnpsmCnpsmAnpsmGnps2-4-OCH$_2$CH$_2$Anps GpsGpsTpsGpsApsApsGpsCpsGpsAps2-4-OCH$_2$CH$_2$AnpsmGnpsmUnpsmGnps3-NH$_2$mC-3 | Anti-DR-1 with x2 3'-NH-ENA-A | 6863.3 | 0.00029 | 0.0226 |
| 306 | 5-mGnpsmCnpsmUnpsmCnpsmCnps2-4-OCH$_2$ CH$_2$AnpsApsApsTpsTpsCpsTpsTpsTpsmAnpsmx2 UnpsmAnps2-4-OCH$_2$CH$_2$AnpsmGnpsmGnps3-NH$_2$mG-3 | Pre Poly A with 3'-NH-ENA-A | 7116.0 | 0.0005 | >1.00 |
| 307 | 5-mGnpsmCnpsmUnpsmCnpsmCnps2-4-OCH$_2$ CH$_2$AnpsApsApsTpsTpsCpsTpsTpsTps2-4-OCH$_2$CH$_2$AnpsmUnpsmAnps2-4-OCH$_2$CH$_2$Anpsm GnpsmGnps3-NH$_2$mG-3 | Pre Poly A with x3 3'-NH-ENA-A | 7128.6 | 0.00055 | >1.00 |
| 308 | 5-mGnpsmCnpsmUnpsmCnpsmCnps2-4-OCH$_2$ CH$_2$AnpsApsApsTpsTpsCpsTpsTpsTps2-4-OCH$_2$CH$_2$AnpsmUnps2-4-OCH$_2$CH$_2$AnpsmAnpsm GnpsmGnps3-NH$_2$mG-3 | Pre Poly A with x3 3'-NH-ENA-A | 7127.9 | 0.0006 | >1.00 |

TABLE 19

| No. | Oligonucleotides (5'-3') | Modification | 2215 HBsAg EC50 (uM) | 2215 HBsAg CC50 (uM) |
|---|---|---|---|---|
|  | 5-mGnpsmCnpsmAnpsmGnpsmAnpsGpsG psTpsGpsApsApsGpsCpsGpsApsmAnps mGnpsmUnpsmGnps3-NH$_2$mC-3 | Control | — | — |
| 309 | 5-2-4 OCH$_2$CH$_2$GnpsmCnpsmAnpsmGnpsmAnps GpsGpsTpsGpsApsApsGpsCpsGpsApsm AnpsmGnpsmUnps2-4OCH$_2$CH$_2$Gnps3-NH$_2$mC-3 | DR-1 with 3'-NH-ENA-G(1 + 1) | 0.0013 | 0.0553 |
| 310 | 5-2-4 OCH$_2$CH$_2$GnpsmCnpsmAnps2-4OCH$_2$CH$_2$ GnpsmAnpsGpsGpsTpsGpsApsApsGps CpsGpsApsmAnps2-4OCH$_2$CH$_2$Gnpsm Unps2-4OCH$_2$CH$_2$Gnps3-NH$_2$mC-3 | DR-1 with 3'-NH-ENA-G 2 + 2 3'-NH-ENA-G | 0.0006 | 0.0230 |

TABLE 19-continued

| No. | Oligonucleotides (5'-3') | Modification | 2215 HBsAg EC50 (uM) | 2215 HBsAg CC50 (uM) |
|---|---|---|---|---|
| 311 | 5-2-4 OCH$_2$CH$_2$GnpsmCnps2-4-OCH$_2$CH$_2$Anpsm GnpsmAnpsGpsGpsTpsGpsApsApsGps CpsGpsApsmAnpsmGnpsmUnpsmGnps3-NH$_2$mC-3 | DR-1 with 3'-ENA-G & 3'-ENA A (1 + 1) Asymmetric | 0.00078 | 0.0305 |
| 312 | 5-2-4 OCH$_2$CH$_2$GnpsmCnpsmUnpsmCnpsmCnps2-4-OCH$_2$CH$_2$ApsApsApsTpsTpsCpsTpsTp sTps mAnpsmUnpsmAnps2-4-OCH$_2$CH$_2$An psmGnpsm2-4OCH$_2$CH$_2$Gnps3-NH$_2$mG-3 | Pre Poly A with 1 + 1/1 + 1 3'-NH-ENA-G + A | 0.0015 | >1.00 |
| 313 | 5-2-4 OCH$_2$CH$_2$GnpsmCnpsmUnpsmCnpsmCnpsm AnpsApsApsTpsTpsCpsTpsTpsTpsmAnps mUnpsmAnpsmAnpsmGnpsm2-4OCH$_2$CH$_2$ Gnps3-NH$_2$mG-3 | Pre Poly A with 3'-NH-ENA-G 1 + 1 | 0.0017 | >1.00 |

TABLE 20

| No. | Found MW: | Oligonucleotides (5'-3') | Modification | HPLC Purity | 2215 HBsAg EC50 (uM) | 2215 HBsAg CC50 (uM) |
|---|---|---|---|---|---|---|
| 314 | 6838.8 | 5-mGnpsmCnpsmAnpsmGnpsmAnpsGps GpsTpsGpsApsApsGpsCpsGpsApsmAn psmGnpsmUnpsmGnps3-NH$_2$mC-3 | Control | 86% | — | — |
| 315 | 6902.9 | 5-mGnps2-4 OCH$_2$CH$_2$(5me)Cnpsm Anps2-4OCH$_2$CH$_2$GnpsmAnpsGpsGps TpsGpsApsApsGpsCpsGpsApsmAnpsm Gnps2-4OCH$_2$CH$_2$TnpsmGnps3-NH$_2$mC-3 | DR-1 2 + 1 | 83% | 0.0033 | >1.00 |
| 316 | 6914.8 | 5-2-4 OCH$_2$CH$_2$GnpsmCnps2-4OCH$_2$CH$_2$Anpsm GnpsmAnpsGpsGpsTpsGpsApsApsGps CpsGpsApsmAnpsmGnps2-4 OCH$_2$CH$_2$ TnpsmGnps2-OCH$_2$CH$_2$3-NH$_2$ (5me)C-3 | DR-1 2 + 2 | 94% | 0.0043 0.0025 | >1.00 |
| 317 | 7169.0 | 5-2-4 OCH$_2$CH$_2$GnpsmCnps2-4OCH$_2$CH$_2$Tnpsm CnpsmCnpsmAnpsApsApsTpsTpsCps TpsTpsTpsmAnps2-4OCH2CH2Tnpsm AnpsmAnpsmGnps2-4OCH2CH2Gnps3-NH$_2$mG-3 | Pre Poly A 2 + 2 | 84% | 0.0025 | >1.00 |
| 318 | 7182.2 | 5-mGnps2-4 OCH$_2$CH$_2$(5me)Cnpsm Unps2-4 OCH$_2$CH$_2$(5me)CnpsmCnpsm AnpsApsApsTpsTpsCpsTpsTpsTpsm Anps2-4OCH$_2$CH$_2$TnpsmAnpsmAnps2-4OCH$_2$CH$_2$GnpsmGnps3-NH$_2$mG-3 | Pre Poly A 2 + 2 | 95% | 0.0051 | >1.00 |

Three oligonucleotides containing F NPS chemistry were tested in vivo. The first one as a triGalNac moiety at the 5' end, the second one has two triGalNac moieties, one at the 5' end and the other one at the 3' end. The third oligonucleotide has a triGalNac moiety at the 5' end and monoGalNac at the 3' end. The following Table 21 summarizes the results of the testing.

TABLE 21

| No. | Targeted HBV Region | Chemistry | Sequence 5'-3' | Max HBsAg reduction (nadir) in log | MW |
|---|---|---|---|---|---|
| 319 | DR2 #1 | F NPS | 5'-GalNac-fGnpsfCnpsfAnpsfGnpsf AnpsGpsGpsTpsGpsApsApsGpsCpsGps ApsfAnpsfGnpsfUnpsfGnps-3nh2- fCn-3' | 2.0 | 8478.26 |
| 320 | DR2 #1 | F NPS | 5'-GalNac2-fGnps5mfCnpsfAnpsfGn psfAnpsGpsGpsTpsGpsApsApsGps CpsGpsApsfAnpsfGnpsfTnpsfGnpsfC- C6NH--GalNac6-3' | 2.6 | 10172.08 |
| 321 | DR2 #1 | F NPS | 5'-GalNac2-fGnps5mfCnpsfAnpsf GnpsfAnpsGpsGpsTpsGpsApsApsGps CpsGpsApsfAnpsfGnpsfTnpsfGnps fC-C6NH-GalNac7-3' | 2.3 | 8893.59 |

At 3×5 mkp GalNac conjugation at both 5' and 3' ends clearly outperformed conjugation at only 5' end with in vivo activity 0.6 log better at certain time points.

Two oligonucleotides where tested in vivo at a dose of 3×10 mpk one containing a triGalNac moiety at the 5' end and the second one containing a triGalNac moiety at 5' and a tocopherol moiety at the 3' end.

TABLE 22

| No. | Targeted HBV Region | Chemistry | Sequence 5'-3' | Max HBsAg reduction (nadir) in log | MW |
|---|---|---|---|---|---|
| 322 | DR2 #1 | OMe NPS | 5'-GalNAc2-mGnpsmCnpsmAnpsm GnpsmAnpsGps GpsTpsGpsAps ApsGps CpsGpsApsmAnpsm GnpsmUnpsmGnps-3nh2-mC-3 | 2.6 | 8502.47 |
| 323 | DR2 #1 | OMe NPS | 5'-GalNac1-mGnpsmCnpsmAnpsm GnpsmAnpsGpsGpsTpsGpsApsAps GpsCpsGpsApsmAnpsmGnpsmUnpsm GnpsmC-Toco-3' | 2.2 | 9202.34 |

In some embodiments, the oligonucleotide of the present disclosure also include an oligonucleotide that is selected from the nucleobase sequence listed in Tables 1-43, independent of the modifications of the sequences listed in Tables 1-43. Oligonucleotides of the present disclosure also include an oligonucleotide comprising a sequence that is at least 90% identical to a nucleobase sequence selected from the sequences listed in Tables 1-43, independent of the modifications of the sequences listed in Tables 1-43. In some embodiments, 1, 2, 3, 4, 5 nucleobases are different from the sequences listed in Tables 1-43, independent of the modifications of the sequences listed in Tables 1-43.

In some embodiments, the oligonucleotides of the present disclosure also include an oligonucleotide that is selected from the nucleotide sequences listed in Tables 1-43, independent of the nucleobases of the sequences listed in Tables 1-43. Oligonucleotides of the present disclosure also include an oligonucleotide comprising a sequence that is at least 90% identical to a nucleotide sequence selected from the sequences listed in Tables 1-43, independent of the nucleobases of the sequences listed in Tables 1-43. In some embodiments, 1, 2, 3, 4, 5 nucleobases are different from the sequences listed in Tables 1-43, independent of the modifications of the sequences listed in Tables 1-43.

What is claimed is:

1. A compound having the structure of Formula (I) or (II):

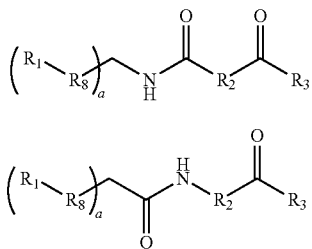

wherein
R₁ is

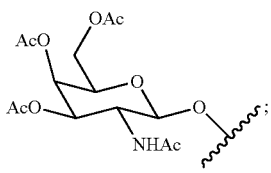 [SMILES: *OC1OC(COC(C)=O)C(OC(C)=O)C(OC(C)=O)C1NC(C)=O]

$R_8$ is a $C_3$-$C_{10}$ alkyl moiety, a $C_3$-$C_{10}$ alkyloxide moiety having 1-5 oxygen atoms, or

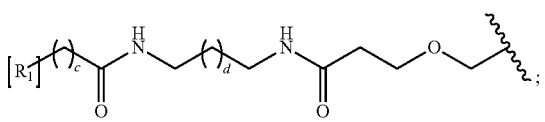

$R_2$ is a $C_3$-$C_{10}$ alkyl moiety or a $C_3$-$C_{10}$ alkyloxide moiety having 1-5 oxygen atoms;
$R_3$ is

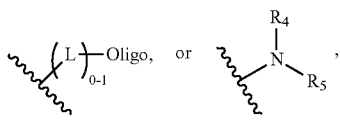

$R_4$ and $R_5$ together form a pyrrolidine or piperidine ring, wherein the ring carbon atoms of the pyrrolidine or piperidine ring are unsubstituted, or wherein one of the ring carbon atoms of the pyrrolidine or piperidine ring is substituted with one —CH₂OPG group and all other ring carbon atoms are unsubstituted;

PG is selected from the group consisting of tert-butyldimethylsilyl (TBMDS), tert-butyldiphenylsilyl (TBDPS), triisopropylsilyl (TIPS), monomethoxytrityl (MMTr), 4,4'-dimethoxytrityl (DMTr), and tritolyl;

a is 1 or 3;

c is 4, 5, 6, or 7; and d is 0, 1, 2, 3, or 4.

2. The compound of claim 1, wherein $R_2$ is a $C_3$, $C_4$, $C_5$, $C_6$, $C_7$, $C_8$, $C_9$ or $C_{10}$ alkyl moiety, and wherein $R_8$ is a $C_3$-$C_{10}$ alkyloxide moiety that comprises 2-5 ethyleneoxide moieties.

3. The compound of claim 1, wherein a is 3.

4. The compound of claim 1, wherein $R_8$ is:

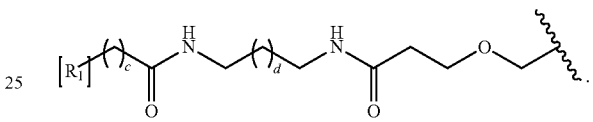

5. The compound of claim 1, wherein $R_4$ and $R_5$ together form a pyrrolidine ring, wherein one of the ring carbon atoms of the pyrrolidine ring is substituted with one —CH₂OPG group and all other ring carbon atoms are unsubstituted.

6. The compound of claim 5, wherein PG is 4,4'-dimethoxytrityl (DMTr).

7. The compound of claim 1, wherein $R_4$ and $R_5$ together form a piperidine ring, wherein one of the ring carbon atoms of the piperidine ring is substituted with one —CH₂OPG group and all other ring carbon atoms are unsubstituted.

8. The compound of claim 7, wherein PG is 4,4'-dimethoxytrityl (DMTr).

9. The compound of claim 1, wherein R4 and Rs together form a pyrrolidine ring, wherein the ring carbon atoms of the pyrrolidine ring are unsubstituted.

10. The compound of claim 1, wherein R4 and Rs together form a piperidine ring, wherein the ring carbon atoms of the piperidine ring are unsubstituted.

* * * * *

UNITED STATES PATENT AND TRADEMARK OFFICE
CERTIFICATE OF CORRECTION

PATENT NO. : 12,503,698 B2  Page 1 of 1
APPLICATION NO. : 16/647377
DATED : December 23, 2025
INVENTOR(S) : Sergei Gryaznov et al.

It is certified that error appears in the above-identified patent and that said Letters Patent is hereby corrected as shown below:

In the Claims

In Claim 1, at Column 139, Lines 40-47: Change " 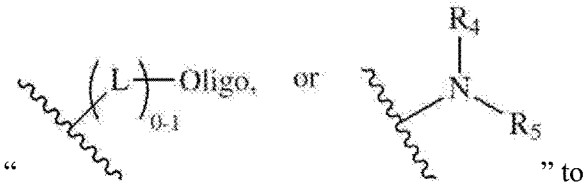 " to

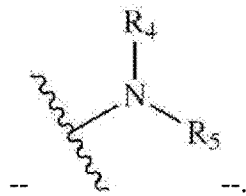 --.

In Claim 1, at Column 140, Line 13: Change "dis 0, 1, 2, 3, or 4." to --d is 0, 1, 2, 3, or 4.--.

Signed and Sealed this
Twenty-seventh Day of January, 2026

John A. Squires
*Director of the United States Patent and Trademark Office*

SEQUENCE LISTING

<160> NUMBER OF SEQ ID NOS: 61

<210> SEQ ID NO 1
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence: Synthetic primer"

<400> SEQUENCE: 1
ttgccttctg acttctttcc ttct                                          24

<210> SEQ ID NO 2
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 2
tgcctgagtg ctgtatggtg ag                                            22

<210> SEQ ID NO 3
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 3
tcgggaagcc ttagagtctc ctga                                          24

<210> SEQ ID NO 4
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 4
gcagaggtga agcgaagugc                                               20

<210> SEQ ID NO 5
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 5
gcagaggtga agcgaagtgc                                               20

<210> SEQ ID NO 6
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

```
<400> SEQUENCE: 6
gcagaggtga agcgaagugc                                          20

<210> SEQ ID NO 7
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 7
gcagaggtga agcgaagtgc                                          20

<210> SEQ ID NO 8
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 8
gcagaggtga agcgaagugc                                          20

<210> SEQ ID NO 9
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 9
gcagaggtga agcgaagugc                                          20

<210> SEQ ID NO 10
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 10
gcagaggtga agcgaagugc                                          20

<210> SEQ ID NO 11
<211> LENGTH: 20
<212> TYPE: DNA
<213> ORGANISM: Artificial Sequence
<220> FEATURE:
<221> NAME/KEY: source
```

```
<223> OTHER INFORMATION: /note="Description of Artificial Sequence:
      Synthetic oligonucleotide"

<400> SEQUENCE: 11
gcagaggtga agcgaagtgc                                                   20

<210> SEQ ID NO 12
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 12
gcagaggtga agcgaagugc                                                   20

<210> SEQ ID NO 13
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 13
gcagaggtga agcgaagtgc                                                   20

<210> SEQ ID NO 14
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 14
gcagaggtga agcgaagugc                                                   20

<210> SEQ ID NO 15
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 15
gcagaggtga agcgaagtgc                                                   20

<210> SEQ ID NO 16
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
```

```
                                Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 16
gcagaggtga agcgaagugc                                                      20

<210> SEQ ID NO 17
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 17
gcagaggtga agcgaagugc                                                      20

<210> SEQ ID NO 18
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 18
gcagaggtga agcgaagugc                                                      20

<210> SEQ ID NO 19
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 19
gcagaggtga agcgaagugc                                                      20

<210> SEQ ID NO 20
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 20
gcagaggtga agcgaagtgc                                                      20
```

```
<210> SEQ ID NO 21
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 21
gcagaggtga agcgaagugc                                                 20

<210> SEQ ID NO 22
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 22
gcagaggtga agcgaagugc                                                 20

<210> SEQ ID NO 23
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 23
gcagaggtga agcgaagugc                                                 20

<210> SEQ ID NO 24
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 24
gcagaggtga agcgaagtgc                                                 20

<210> SEQ ID NO 25
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
```

```
                                 Molecule: Synthetic oligonucleotide"

<400> SEQUENCE: 25
gcagaggtga agcgaagugc                                                    20

<210> SEQ ID NO 26
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 26
gcagaggtga agcgaagugc                                                    20

<210> SEQ ID NO 27
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 27
gcagaggtga agcgaagugc                                                    20

<210> SEQ ID NO 28
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 28
gcagaggtga agcgaagtgc                                                    20

<210> SEQ ID NO 29
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 29
tgcagaggtg aagcgaagtg                                                    20

<210> SEQ ID NO 30
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

```
<220> FEATURE:
<221> NAME/KEY: source
<223> OTHER INFORMATION: /note="Description of Combined DNA/RNA
      Molecule: Synthetic oligonucleotide"

<400> SEQUENCE: 30
ugcagaggtg aagcgaagug                                                20

<210> SEQ ID NO 31
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 31
ugcagaggtg aagcgaagug                                                20

<210> SEQ ID NO 32
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 32
gcuccaaatt ctttauaagg g                                              21

<210> SEQ ID NO 33
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 33
gcuccaaatt ctttauaagg g                                              21

<210> SEQ ID NO 34
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 34
gcagaggtga agcgaagtgc                                                20

<210> SEQ ID NO 35
```

```
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 35
gcagaggtga agcgaagugc                                               20

<210> SEQ ID NO 36
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 36
gcagaggtga agcgaagugc                                               20

<210> SEQ ID NO 37
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 37
gcagaggtga agcgaagugc                                               20

<210> SEQ ID NO 38
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 38
gcagaggtga agcgaagugc                                               20

<210> SEQ ID NO 39
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

<400> SEQUENCE: 39
gcagaggtga agcgaagtgc                                          20

<210> SEQ ID NO 40
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 40
gcagaggtga agcgaagugc                                          20

<210> SEQ ID NO 41
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 41
gcagaggtga agcgaagugc                                          20

<210> SEQ ID NO 42
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 42
gcagaggtga agcgaagugc                                          20

<210> SEQ ID NO 43
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 43
gcagaggtga agcgaagugc                                          20

<210> SEQ ID NO 44

```
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 44
gcuccaaatt ctttauaagg g                                              21

<210> SEQ ID NO 45
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 45
gcuccaaatt ctttauaagg g                                              21

<210> SEQ ID NO 46
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 46
gcuccaaatt ctttauaagg g                                              21

<210> SEQ ID NO 47
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 47
gcagaggtga agcgaagugc                                                20

<210> SEQ ID NO 48
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

```
<220> FEATURE:
<221> NAME/KEY: source
<223> OTHER INFORMATION: /note="Description of Combined DNA/RNA
      Molecule: Synthetic oligonucleotide"

<400> SEQUENCE: 48
gcagaggtga agcgaagugc                                                      20

<210> SEQ ID NO 49
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 49
gcagaggtga agcgaagugc                                                      20

<210> SEQ ID NO 50
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 50
gcagaggtga agcgaagugc                                                      20

<210> SEQ ID NO 51
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 51
gcuccaaatt ctttauaagg g                                                    21

<210> SEQ ID NO 52
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 52
```
gcuccaaatt ctttauaagg g                                              21

<210> SEQ ID NO 53
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 53
gcagaggtga agcgaagtgc                                                20

<210> SEQ ID NO 54
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 54
gcagaggtga agcgaagtgc                                                20

<210> SEQ ID NO 55
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 55
gctccaaatt ctttataagg g                                              21

<210> SEQ ID NO 56
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 56
gcuccaaatt ctttataagg g                                              21

<210> SEQ ID NO 57
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: source
<223> OTHER INFORMATION: /note="Description of Combined DNA/RNA
      Molecule: Synthetic oligonucleotide"

<400> SEQUENCE: 57
gcagaggtga agcgaagugc                                                20

<210> SEQ ID NO 58
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 58
gcagaggtga agcgaagtgc                                                    20

<210> SEQ ID NO 59
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 59
gcagaggtga agcgaagtgc                                                    20

<210> SEQ ID NO 60
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 60
gcagaggtga agcgaagugc                                                    20

<210> SEQ ID NO 61
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"
<220> FEATURE:
<221> NAME/KEY: source
<223> OTHER INFORMATION: /note="Description of Combined DNA/RNA
    Molecule: Synthetic oligonucleotide"

<400> SEQUENCE: 61
gcagaggtga agcgaagugc                                                    20